(12) United States Patent
Espig

(10) Patent No.: US 9,193,306 B2
(45) Date of Patent: Nov. 24, 2015

(54) ROOF BOX, MOTOR VEHICLE ROOF COMPRISING A ROOF BOX, AND MOTOR VEHICLE COMPRISING A ROOF BOX

(71) Applicant: SEs Solutions GmbH, Freital (DE)

(72) Inventor: Serle Espig, Hamburg (DE)

(73) Assignee: SEs Solutions GmbH, Freital (DE)

( * ) Notice: Subject to any disclaimer, the term of this patent is extended or adjusted under 35 U.S.C. 154(b) by 0 days.

(21) Appl. No.: 14/157,204

(22) Filed: Jan. 16, 2014

(65) Prior Publication Data

US 2014/0132022 A1     May 15, 2014

Related U.S. Application Data

(63) Continuation of application No. PCT/EP2012/064038, filed on Jul. 17, 2012.

(30) Foreign Application Priority Data

| Jul. 17, 2011 | (DE) | 10 2011 051 891 |
| Oct. 25, 2011 | (DE) | 10 2011 054 802 |
| Nov. 21, 2011 | (DE) | 10 2011 055 543 |
| Nov. 29, 2011 | (DE) | 10 2011 055 847 |
| Nov. 29, 2011 | (DE) | 10 2011 055 848 |
| Jul. 6, 2012  | (DE) | 10 2012 106 103 |

(51) Int. Cl.
*B60R 5/00*     (2006.01)
*B60R 9/055*    (2006.01)
*B60J 7/16*     (2006.01)

(52) U.S. Cl.
CPC .............. *B60R 9/055* (2013.01); *B60J 7/1657* (2013.01); *B60J 7/1671* (2013.01); *B60J 7/1692* (2013.01)

(58) Field of Classification Search
CPC ....... B60R 9/055; B60J 7/1657; B60J 7/1671; B60J 7/1692
USPC ......... 296/37.5, 37.7, 26.06, 26.07, 160, 163, 296/165; 224/309, 320, 327
See application file for complete search history.

(56) References Cited

U.S. PATENT DOCUMENTS

| 3,479,079 | A | * | 11/1969 | Coursault | 296/26.06 |
| 3,596,977 | A | * | 8/1971 | Bunger | 296/160 |
| 3,879,080 | A | * | 4/1975 | Freeman | 296/26.06 |
| 3,924,889 | A | * | 12/1975 | Gogush | 296/176 |
| 4,345,706 | A | * | 8/1982 | Benit | 224/327 |

(Continued)

FOREIGN PATENT DOCUMENTS

| DE | 27 17 516 A1 | 10/1978 |
| DE | 30 36 100 A1 | 5/1982 |

(Continued)

OTHER PUBLICATIONS

Corresponding International Search Report with English Translation dated Feb. 22, 2013 (eight (8) pages.

*Primary Examiner* — Lori L Lyjak
(74) *Attorney, Agent, or Firm* — Crowell & Moring LLP

(57) ABSTRACT

A roof box is provided for motor vehicles for forming a useful interior space. In order to obtain a roof box which is comfortable to handle by a user, offers the greatest possible storage space and simultaneously reduces vehicle noises and fuel consumption, the roof box includes the use of volume changing means for changing the volume of the interior space, the roof box being designed such that it can be integrated into the roof of a motor vehicle.

26 Claims, 39 Drawing Sheets

(56) References Cited

U.S. PATENT DOCUMENTS

| | | | |
|---|---|---|---|
| 7,699,372 B2 * | 4/2010 | Adams et al. | 296/26.07 |
| 7,845,699 B2 * | 12/2010 | Leopold | 296/26.04 |
| 2005/0116510 A1 | 6/2005 | Leroy et al. | |
| 2012/0242104 A1 * | 9/2012 | Babbage et al. | 296/26.06 |

FOREIGN PATENT DOCUMENTS

| | | |
|---|---|---|
| DE | 60 2005 002 301 T2 | 5/2008 |
| DE | 10 2007 042 345 B3 | 4/2009 |
| EP | 1 514 734 A2 | 3/2005 |
| GB | 2 050 962 A | 1/1981 |

\* cited by examiner

ROOF BOX, MOTOR VEHICLE ROOF COMPRISING A ROOF BOX, AND MOTOR VEHICLE COMPRISING A ROOF BOX

CROSS REFERENCE TO RELATED APPLICATIONS

This application is a continuation of PCT International Application No. PCT/EP2012/064038, filed Jul. 17, 2012, which claims priority under 35 U.S.C. §119 from German Patent Application No. 10 2011 051 891.6, filed Jul. 17, 2011, German Patent Application No. 10 2011 054 802.5, filed Oct. 25, 2011, German Patent Application No. 10 2011 055 543.9, filed Nov. 21, 2011, German Patent Application No. 10 2011 055 847.0, filed Nov. 29, 2011, German Patent Application No. 10 2011 055 848.9, filed Nov. 29, 2011, and German Patent Application No. 10 2012 106 103.3, filed Jul. 6, 2012, the entire disclosures of which are herein expressly incorporated by reference.

TECHNICAL FIELD OF THE INVENTION

The invention relates to a roof box for motor vehicles for forming a useful interior space, a motor vehicle roof with a roof box, as well as a motor vehicle with a roof box.

BACKGROUND OF THE INVENTION

Known roof boxes are closed or respectively sealable containers for storing luggage that enable the additional transportation of luggage, such as ski equipment, with a motor vehicle outside of conventional storage spaces such as the luggage compartment. They are mounted on the roof of the motor vehicle, generally on a roof rack or on roof rails provided by the manufacturer for this purpose. A roof box increases the fuel consumption of a motor vehicle since they increase the weight and air resistance of the motor vehicle. In addition, the vehicle noise increases, and the achievable or permissible maximum speed of the vehicle is reduced. If the additional luggage compartment of the roof box is not required, the roof box must be removed and stored somewhere else. A significant amount of space is required to store the roof box which is especially disadvantageous when no suitable garage or storage area is available.

A motor vehicle roof body part of a motor vehicle is known from DE 60 2005 002 301 T2 and is designed as a container that delimits a storage space, wherein this container is equipped with a flap accessible from the outside of the motor vehicle. This container is therefore designed integrated into the roof of the motor vehicle and therefore does not have to be mounted or removed. This also reduces fuel consumption and vehicle noise. A disadvantage is, however, that the container only provides an extremely limited storage space since the height of the container is restricted to the thickness of the motor vehicle roof.

SUMMARY OF THE INVENTION

The object of the invention is therefore to propose a roof box that is comfortably handled by the user, offers the greatest possible storage space, and simultaneously reduces vehicle noise and fuel consumption.

This object is achieved with a roof box for motor vehicles for forming a useful interior space in that the roof box is designed so that It can be integrated in the roof of a motor vehicle, and that volume changing means for changing the volume of the interior space is provided.

The integrative arrangement of the roof box in the vehicle roof is such that the roof box is not mounted as a separate container by means of a support device on the vehicle roof; instead, the roof box is arranged in the vehicle roof and forms part of the vehicle roof, in particular as the vehicle is visually perceived. Given the integrative arrangement of the roof box in the vehicle roof, the user is no longer required to mount or remove it. Instead, the roof box permanently remains in the vehicle roof as an integrative component of the vehicle roof and is always available to the user. This makes the roof box more comfortable to handle by the user. The roof box is always designed as an independent, in particular coherent container, and is in particular only accessible from the outside and not from the interior of the motor vehicle.

Providing the volume changing means makes it possible to change the volume of the interior space of the roof box and hence vary the size of the roof box. In particular, the roof box can usefully be moved by means of the volume changing means between an extended state in which the interior space has a maximum volume, and a retracted state in which the interior space has a minimum volume. If the storage space of the roof box is required, the user changes the roof box into the extended state. After the stowage of objects in the roof box has ended, the roof box can be moved back into the retracted state. This enables the roof box to only possess its maximum volume or respectively its maximum size when it is actually used by the user. When the roof box is not used, it is retracted and then has less air resistance, which in turn results in reduced vehicle noise and reduced fuel consumption. In a retracted state, the roof box is not visually perceptible or is at least not very conspicuous. By integrating the roof box in the vehicle roof, the air resistance of the motor vehicle when the roof box is retracted is not impaired, or at least not significantly, in comparison to other motor vehicles without a roof box. The minimum volume (in the retracted state) of the roof box is preferably less than 50%, preferably less than 25%, particularly preferably less than 10%, and most preferably less than 5% of the maximum volume (in the extended state) of the roof box. This ensures that there is minimal air resistance when the roof box is not being used and is in the retracted state. The roof box can be in the extended state and of course in the retracted state as well, both while parking the motor vehicle as well as while driving.

In the present context, the term "roof box" is understood to mean a container provided in or on the roof of a motor vehicle that, at least in the extended state, offers a useful interior space, i.e., a storage space, for arranging or storing objects. The interior space is the storage space within the roof box that is enclosed by the walls of the roof box. The walls of the roof box are preferably composed of a plurality of wall elements. The wall elements can for example comprise a floor element, a cover element, a rear wall and/or one or more side walls. In the present context, the term "motor vehicle" is understood to mean any motorized, non-railbound land vehicle, wherein the motor vehicles that are appropriate for using the present invention must of course have a vehicle roof. This includes in particular passenger cars, trucks, convertibles, etc. It is furthermore preferable for the rear wall and/or side walls, and/or the cover element to lie on the floor element or border the floor element in any state of the roof box, and in particular both in the retracted and extended state.

At least one of the wall elements, or least parts of one of the wall elements of the roof box, is/are usefully formed by the roof of a motor vehicle. This simplifies the structure of the roof box on the one hand, and promotes the integrative formation of the roof box in the vehicle roof on the other hand. It can in particular be useful to form a floor element of the roof box as a component of the vehicle roof. In particular, all of the wall elements of the roof box can be designed as components of the vehicle roof. It is frequently useful to fixedly anchor the roof box in the roof so that it is designed stationery. Alternately, the roof box can be fixedly attached to a support element, roof luggage carrier or the like, wherein the support element or respectively the roof luggage carrier can be movable if applicable to make it easier for a user to load the roof box.

In order to be able to change the volume of the roof box as desired or respectively needed or respectively move the roof box between the retracted and extended state, it is useful to provide activation means by which the volume changing means can be activated or actuated. The activation means can for example comprise electric motors, in particular servomotors, springs, pneumatically controllable gas cushions, in particular air cushions, magnets and/or electromagnets as well as combinations thereof. The activation means usefully furthermore have a suitable control device in order to activate the motors or respectively air cushions and electromagnets. The roof box can thereby be automatically moved between the retracted state and the extended state. It is in particular advantageous to use air cushions since they increase the rigidity of the roof box in the extended state, can offer cushioning for objects to be transported, require no or little storage volume when the roof box is in the retracted state and, when arranged on the side of volume changing means facing the interior space of the roof box, serve as protection against damage or scratching. The shape of the gas cushions can be adapted to the respective conditions. In particular, they can have openings, recesses, dips, etc. in order to adapt the air cushions to the components against which they lie. These components can for example be wall elements, pivoting means, or frames as well, or respectively other support elements. The gas cushions can have a plurality of chambers which can be optionally controlled by means of corresponding valves and a control device. Accordingly at a given time, only certain areas of the gas cushion can be inflated or deflated.

In one preferred embodiment of the invention, the volume changing means comprise pivoting means. With the assistance of the pivoting means, individual or a plurality of wall elements, and/or segments of wall elements, can be pivoted. In particular shutting of individual wall elements, or folding of wall elements on each other, or segments of wall elements on each other, can be realized due to the pivotability of the individual wall elements thus realized. By pivoting the wall elements, the roof box can also be collapsed in the retracted state or possibly also folded together. The rear wall, cover element and/or the side walls are preferably provided with pivoting means or respectively are designed to be pivotable. In particular, these wall elements can be connected to the floor element by the pivoting means. The rear wall and/or the side walls can additionally or alternatively be pivotably connected to the cover element.

The pivoting means can comprise any suitable means known from the prior art for pivoting wall elements. In particular, the pivoting means comprise one or more articulations that can preferably be designed as hinges. Additionally or alternatively, the pivoting means can comprise an elastically and/or plastically deformable material section. This material section is then usefully designed integrated in the wall element to be pivoted. In particular, an entire wall element, or an entire segment of a wall element, can be designed from elastically and/or plastically deformable material. Such a material can in particular also be suitable for folding a wall element, wherein a fold is preferably provided in the material section or respectively in the wall element so that folding can be performed repetitively in the same manner, or respectively on the same fold. Activation means are preferably arranged in the region of at least some of the pivoting means so that the activation means can be connected to the pivoting means. In this manner, the pivoting of a specific wall element can be triggered by the activation means at any desired time. Depending on the design of the activation means, it can also be useful to provide the activation means in the region of the wall elements. When the activation means are provided in the region of the pivoting means, in particular hinges, it is in particular preferable to provide a (return) spring, a magnet, an electromagnet and a gas cushion, especially an air cushion, at a pivoting means. The spring is in a relaxed state in the retracted state of the roof box. By inflating the air cushion, the pivoting means pivots, and the spring is pretensioned. Once the extended state is reached, the electromagnet is activated and locks the pivoting means in its swung out position. To swing back (into a retracted state), the electromagnet is deactivated or respectively unlocked, and the pretensioned spring causes the pivoting means to swing back. The air cushion thereby deflates. In addition, the air cushion can also be actively deflated by means of pumps or the like. The air cushion serves not just to pivot the pivoting means but also offers protection against damage or scratching when it is correspondingly arranged, in particular on the inside of the pivoting means.

In some embodiments of the invention, the volume changing means for moving wall elements, or respectively sections of wall elements, do not have a rod assembly and/or an electromechanical or respectively mechanical cylinder. This is advantageous in that rod assemblies and cylinders that are used to fold or pivot the wall elements, in particular in the folded state, require a great deal of space, thereby necessitating roof boxes to be larger in a retracted state than a roof box without such components. The structure of such systems also frequently is complicated and reduces the storage space in the roof box in the extended state.

The roof box is preferably formed by two side walls, one rear wall, one floor element, and one cover element. In particular, a separate front side wall, or respectively front wall, is not provided that, for example, is aligned approximately parallel to the rear wall in known roof boxes and closes the roof box at the front. Instead, the cover element of the roof box according to the invention advantageously runs downward at an angle viewed in the longitudinal direction, and its front edge lies directly on the floor element. In particular, the surface of the cover element segment abutting the floor element has an average angle relative to the surface of the vehicle roof that is a maximum of 60 degrees, preferably a maximum of 45 degrees, and particularly preferable a maximum of 40 degrees. This yields an aerodynamic roof box shape, and a separate front wall is avoided.

The rear wall, the (two) side walls and/or the cover element each preferably have at least two segments, i.e., two rear wall segments, two side wall segments and/or two cover segments. In particular, the entire respective wall element can be formed by the at least two segments. Each of the at least two segments can preferably comprise one top segment and one bottom segment. The at least two segments are furthermore connected to each other by the pivoting means so that the two segments can be swung relative to each other, or respectively folded onto each other. It is furthermore in particular preferable for the at least two rear wall segments and/or the at least two side wall segments to be inwardly foldable, i.e., toward the interior space. The roof box is thereby designed foldable since the effective height of the rear wall or the side wall is reduced when the rear wall segments or the side wall segments are folded in. Since the cover element is usefully connected to the rear wall and the two side walls by a (top) pivoting means, the cover element lowers when the segments are folded which, overall, causes the roof box to fold up. Since the cover element has two or more cover segments that are each movably connected by one or more pivoting means, the overall curvature of the motor vehicle roof can be partially matched so that, when in a folded state, the roof box has a smaller space requirement.

It is preferable in particular for the pivoting means that connect the two side wall segments, and/or the two rear wall segments, and/or the two cover segments, to each other, to have a pivot axis about which the two segments pivot relative to each other, wherein the pivot axis is oriented in a substantially horizontal manner. The substantially horizontal alignment of the pivot axis enables individual segments or wall elements to fold toward each other and on the surface of the vehicle roof since the roof is generally curved but is nonetheless oriented in a substantially horizontal manner.

In some embodiments, it is preferable for in particular the two side walls each have at least two, and preferably precisely two, side wall segments. Furthermore, it is frequently preferable for a first of the two side wall segments to extend to a front region of the side wall viewed in the longitudinal direction of the side wall. When the roof box is in a mounted state on a motor vehicle, this front region faces the front side of said motor vehicle and forms the front termination of the side wall. In particular, the front region of the side wall runs from the bottom edge of the side wall to a top edge of the side wall with reference to the height of the side wall, i.e., over the entire height of the side wall in the front region. It is furthermore preferable for the second side wall segment to not extend into this front region of the side wall. In other words, the front region of the side wall is exclusively formed by the first side wall segment. It is in particular preferable when the front region of the side wall, when viewed in the longitudinal direction of the side wall from back to front, to begin approximately in the region in which the roof surface of the motor vehicle starts to curve outward when viewed from above when the roof box is in the mounted state on a motor vehicle. In general, roof surfaces of modern motor vehicles are not rectangular; rather, the side edges in particular of the roof surface start to (slightly) curve outward at a specific point. In the rear region of the roof surface up to a middle region, there may be an inward curvature of the side roof edges.

Given the outward curvature of the front region of the side wall edges, it is useful to only form the front region of the side wall with the first side wall segment since, when the front region of the side wall is divided into two segments, the two side wall segments, with their curved surfaces with opposite directions of curvature in the front region of the side wall, would lie on each other when the roof box is collapsed or respectively folded together and accordingly enclose a type of cavity. This would lead to an increased space requirement for the side wall segments in a folded state which is undesirable. When the front region of the side wall is exclusively formed by the first side wall segment, its curved surface folds onto the roof surface in a folded state. The roof surface itself is also curved in this region since the roof in the front region is not only outwardly curved but also slopes downward under a set curvature toward the front of the motor vehicle. In this case, the surface curvature of the motor vehicle roof and the curvature of the first side wall segment in the region of the front region of the side wall run in the same direction so that the two curved surfaces lie on each other in a type of form fit, thus yielding only a slight space requirement.

Viewed in the longitudinal direction of the side wall from front to back, the front region of the side wall usefully abuts a middle region of the side wall, wherein the middle region in turn abuts a rear region of the side wall. The side wall is usefully composed of the front region, the middle region, and the rear region, i.e., these three regions together form the entire side wall to the exclusion of additional parts. It is also preferable for the second side wall segment that preferably is not arranged in the front region, to be arranged in the middle region and/or in the rear region. In a particularly preferable manner, the second side wall segment is arranged exclusively in the middle region. The first side wall segment that is arranged in the front region and by itself forms the front region is furthermore arranged in the middle region and/or in the rear region, wherein this first side wall segment is preferably arranged in all three regions, i.e., in the front, middle and rear region.

The middle region preferably runs in a region of the side wall in which the roof edge of the vehicle roof on which the roof box is mounted runs substantially straight. In the region of the rear region, the roof edge can also run substantially straight or run curved inward viewed from back to front. This depends on the shape of the vehicle roof of the respective motor vehicle model. In the region of the middle region of the side wall that runs substantially straight, it is therefore useful for both the first side wall segment as well as a second side wall segment to be arranged there since, given the straight configuration with reference to their surfaces, they have no or only a slight curvature and can be easily folded on each other when the roof box is in a folded state without producing an excessively large space requirement. If the rear region of the side wall, or respectively the roof shape in this region, has a curvature, it is also useful for only the first side wall segment to be arranged there, too, or respectively for just this first side wall segment to form said rear region of the side wall. This yields the same advantages as depicted above with reference to the front region of the side wall.

In particular, it is useful for the second side wall segment that is preferably arranged in the middle and/or in the rear region of the side wall, and in particular preferably only in the middle region of the side wall, to have the shape of a polygon with at least three and preferably four corners. In particular, it can be preferable for the second side wall segment to have the shape of a trapezoid. One of the edges of the second side wall segment designed as a polygon furthermore forms a section of a bottom edge of the side wall. It is alternately possible for an edge of the side wall segment to form a section of a top edge of the side wall. All other edges of the second side wall segment formed as a polygon preferably lie on or respectively abut the first side wall segment when the roof box is in an extended state. This embodiment is useful in particular when the second side wall segment is exclusively arranged in the middle region of the side wall. When viewing the side wall from above, the front and rear regions of the side wall arranged on the right and left adjacent to the middle region are exclusively formed by the first side wall segment so that the edges of the second side wall segment in these regions abut the first side wall segment. Likewise, a region above or below the second side wall segment is formed by a first side wall segment so that the edges of the two segments also border each other at this location. This yields an optimum design of the side wall segments for a plurality of roof shapes of known motor vehicles in regard to a flattest possible folded or retracted state of the roof box.

In another preferred embodiment, the pivoting means are designed so that, in addition to the pivoting movement, they permit or respectively enable a translatory movement between the wall elements or respectively the wall segments that they connect to each other. It is in particular preferable for the translatory movement to be in the direction of the pivot axis of the pivoting means. The additional translatory function can either be realized by correspondingly designing the pivoting means, or by providing sufficient play within the pivoting means. If the pivoting means are for example designed as a hinge, play can be provided between the bushings of the two hinge parts that enables a translatory movement of the two wall elements connected by the hinge along the pivot axis of the hinge. Furthermore, additional suitable bearings are possible that permit both a longitudinal as well as a rotary or pivoting movement such as a slide pivot bearing. In this embodiment, it is in particular preferable for in particular the pivoting means to be formed between the side walls and cover element in the above-described manner and permit an additional translatory movement. In this case, the side walls are designed to be shiftable along their top edges relative to the cover element. This is advantageous so that the cover element can move to the rear in relation to the side walls when the roof box is folded together in order to prevent tension in the roof box.

In another preferred exemplary embodiment, a (bottom) frame is provided for the roof box which preferably comprises at least one, in particular preferably two, cross members and two longitudinal members. The frame is usefully connected by at least one pivoting means to the rear wall, or by at least one pivoting means to each of the two rear walls. The cover element is furthermore usefully connected to the frame, preferably by at least one front cover element hinge. The frame is advantageously connected by at least one pivoting means to the floor element and can accordingly be folded up or down together with the side walls, the rear wall and the cover element in order to open or close the roof box. The frame, the rear wall, the cover element and the side walls hence together form a top part that forms a cover for the roof box and can pivot relative to a bottom part that for example is formed by the floor element when the roof box is in an extended state, whereby the roof box can be opened and closed. Alternately, the frame can also form a bottom part together with the rear wall, the side walls and the floor element, wherein the cover element (which then forms the top part by itself) is similarly designed to pivot relative to the bottom part to open and close the roof box. It is also possible for only one or more cover segments to be designed to swing upward and hence open the roof box. In this case, only one section of the cover element would then form a cover for the roof box.

Furthermore, a raising device can usefully be provided by means of which the top part can be opened to load the roof box, and then closed. Accordingly, the top part can move between an open position and closed position of the roof box by means of the raising device. The raising device can for example be designed as a lifting device which then comprises suitable lifting cylinders and the like. Alternately, the raising device can also be designed as a manual raising device and enable manual opening and closing of the top part. Corresponding handles, holders and/or fastening devices are to be provided for this. Furthermore, fixing means can be provided by means of which the top part can be fixed in the open position and only be brought into the closed position when the fixing means are released. The top part can be connected by pivoting means to the bottom part, or respectively the floor element that frequently forms the bottom part, and pivot about a pivot axis. It is furthermore useful to provide a seal between the top part and the bottom part. It is in particular useful to provide the raising device when the top part is to be laterally pivotable or respectively openable since the raising device can then make it easier or improve the pivoting of the top part on a projecting edge of the floor element in comparison to manual pivoting.

In order to prevent unauthorized opening of the roof box, it is furthermore useful to provide fastening means to fasten the roof box in the closed position. This can in particular prevent an unsanctioned opening of the top part (cover) of the roof box. The fastening means can in principle be designed as a separate component. It is preferably, however, also possible for a pivoting means to be able to concomitantly execute the additional function of fastening and thereby simultaneously form the fastening means. The pivoting means in this case are in particular the pivoting means that are designed to pivot the top part.

It is furthermore useful for the top part to have an interior volume of at least 40%, preferably at least 60%, and particularly preferably at least 80% of the overall interior volume of the roof box. Larger interior volumes of the top part such as at least 85%, at least 90%, or at least 95% of the overall interior volume of the roof box can, in principle, also be achieved. Such an embodiment is preferable since the bottom part, when in an open state, is basically left with no, or only a relatively low, peripheral upwardly projecting edge or the like, and the bottom part is basically designed thoroughly flat. This makes the roof box more comfortable for a user to load and unload since objects do not have to be lifted any higher than the relatively flat bottom part. The interior volume of the top part is enclosed by an imaginary line or respectively plane that lies on the bottom edge of the top part. Alternately, it can be useful for the aforementioned reasons for the top part to have a height of at least 50%, preferably at least 65%, and particularly preferably at least 80% of the overall height of the roof box. The aforementioned percentages are usefully determined when the roof box is in the extended state.

Both side walls taper in height toward the front side of the roof box, i.e., toward the front and, together with the curved cover element arranged thereupon, thereby form an approximately wedge-like aerodynamic shape corresponding to the respective roof shape of the motor vehicle, which inherently yields relatively favorable air resistance of the roof box in the extended state. This aerodynamic shape is achieved in particular when the front region of the cover element directly abuts the floor element, and no additional front wall or the like is provided as, for example, is the case with conventional roof boxes that are mounted separately on the vehicle roof. Instead, the cover element runs obliquely to the rear from its connecting point to the floor element to achieve an aerodynamic shape overall.

In another preferred embodiment of the invention, the volume changing means comprise deformation means for reversibly, i.e. repeatedly, changing the shape of a wall element, or respectively a section of a wall element. The deformation means can in particular be provided in or respectively on the respective wall element or section to be deformed. In particular, this wall element or respectively this section can be deformable between a first predetermined deformation state corresponding to a retracted state of the roof box, and a second deformation state corresponding to an extended state of the roof box, such that the wall element or respectively the section can be converted from the first deformation state into the second deformation state and vice versa. An activation device is furthermore provided to trigger the changes in shape. This can specifically control the wall element, or respectively the section, or respectively the deformation means in order to achieve a change in shape, or respectively a desired deformation state, at the desired time. In particular, it can be useful with this embodiment to not provide any additional pivoting means. With this embodiment, it can furthermore be sufficient to only design a single wall element to be deformable in order to bring the roof box from a retracted state into an extended state, or vice versa. The deformation means can, for example, be provided in the cover element, and the entire roof box can furthermore be formed by only one floor element and one cover element. This yields a particularly simple roof box construction. In order to ensure a specific deformation of the roof box between the retracted and extended state, it can furthermore be useful to provide guide means on the wall element to be deformed, or on wall elements adjacent thereto, by means of which the wall element to be deformed is held in the desired position during the deformation process. The wall element can be entirely formed from the same material. Alternately, a composite design consisting of different materials is possible, wherein the section is preferably formed from a different material than the rest of the wall elements.

With this embodiment, it is particularly preferable for the wall element to be deformed, or respectively the section of the wall element to be deformed, to have shape memory alloys or shape memory polymers. These materials can actively deform into predetermined states by supplying energy, and then deform back into the original state. Such materials are generally also termed "mechanically active materials". By supplying (thermal) energy, these can be converted from an original state into a deformed state. It is in principle also possible for the wall element to assume intermediate states depending on the level of supplied energy.

Alternately, the wall element, or the section of the wall element, can comprise expandable material, in particular a preferably water resistant stretch material, wherein the deformation means are then designed so that they can change the wall element, or respectively the section of the wall element, from an unstretched state into a stretched state and vice versa. In other words, in order to achieve a stretched state, the deformation means exert force on the expandable material so that expansion occurs. By means of the expansion, a storage space arises within the roof box which can then be filled with items to be transported. It can furthermore be useful to design the wall element or the section of the wall element in multiple layers, wherein the outer layer is then preferably formed by the expandable material. The inner layer can be formed by a different, preferably stable and/or flexible material in order to ensure sufficient stability of the roof box despite the use of the expandable material. In the retracted state, the inner layer can be folded together, and the outer layer consisting of expandable material lies tightly on the inner layer to yield a visually smooth surface of the roof box. In the extended state of the roof box, the outer layer is stretched, and the inner layer is unfolded to yield a loadable interior space. A smooth outer surface of the roof box also results in this state.

With this embodiment, it can be furthermore useful to provide one or more designated bending lines, or designated bending sites, in the wall element or respectively the section of the wall element, in the regions in which the shape change, i.e. the bending of the material of the wall element or respectively the section of the wall element, occurs. There is no bending in the other regions of the wall element that lie outside of the range of influence of the designated bending sites or respectively designated bending lines. It is accordingly not essential to use flexible material in this case; instead, it is possible to use normal body sheet metal, conventional metal panels, etc. This enables a specific deformation to be easily predetermined and repeated as often as desired. Furthermore, it can be useful for the wall element to increase in rigidity viewed from back to front in the longitudinal direction of the roof box. This can be achieved by different material thicknesses, the use of different materials in different regions of the wall element, etc. This is in particular useful in those cases in which the amount of bending of the wall element decreases from back to front viewed in the longitudinal direction of the roof box.

With this embodiment, it is furthermore in particular preferable for the deformation means to comprise one or more piezoelements. The piezoelements are preferably arranged integrated in the at least one wall element to be deformed. The activation device usefully comprises current transmitters that are electrically connected to the piezoelements so that the piezoelements can be activated or deactivated and thereby convert the wall element into different deformation states. The deformation means can also comprise electrical contacts by means of which a current can be applied to the wall element, or respectively to heating means such as heating wires incorporated in the wall element, in order to supply (thermal) energy to the wall element. This is in particular useful for mechanically active or shape memory materials. Another possibility for forming activation means is to provide mechanical adjusting means such as lifting cylinders, telescoping rods, pivotable rod assemblies, etc. Such an embodiment is in particular preferable when using expandable material.

In another preferred embodiment, the floor element has a peripheral floor wall that is peripherally arranged on the edge of the floor element like a peripheral frame and projects upward. The height of the floor wall can in a particular be dimensioned so that the roof box can be collapsed or respectively folded together in the retracted state within the space enclosed by the floor wall so that a flush terminating surface results at the top. Furthermore, the floor wall creates a terminating edge when the floor box is in an extended and open state which prevents objects stored in the roof box from unintentionally sliding out of the roof box or the like.

In another preferred embodiment, the volume changing means comprise shifting means, wherein individual wall elements can be shifted thereby relative to each other. In particular, some wall elements, or segments of wall elements, can be shifted among other wall elements in a retracted state which yields a particular compact and space saving structure. The reason for this is in particular that the surfaces of the walls are frequently curved and do not form flat surfaces when they are adapted to the basic shape of the roof surface. Depending on the roof shape, it can be advantageous to shift two walls or wall sections with surfaces that are curved in a similar direction and extent so that one surface lies on the other since the curvature of one surface can then mate with the curvature of the other surface and the roof box is therefore as flat as possible in the retracted state. The rear wall is preferably designed shiftable under the cover element, in particular under its rear cover segment. This can in particular be advantageous when integrating the roof box in coupes and similar motor vehicle shapes. The shifting means can comprise any device known from the prior art and suitable for the present purpose such as guide rails, stops and the like. Furthermore, the shifting means can be combined with the pivoting means so that an individual device has both a shifting function and a pivoting function.

In an additional preferred embodiment, support elements are provided that are arranged on one or more of the wall elements. With the assistance of the support elements, the wall elements can be supported against each other when the roof box is in the extended state, thus yielding a reinforced structure. Support means provided on a wall element are designed in particular to support wall elements adjacent to this one wall element. The support elements can for example be designed as brackets, bent sheet metal sections of the wall segments, etc. Furthermore, it is preferable for the support elements to simultaneously offer a stop for the wall segments when pivoting.

Furthermore, locking means are usefully provided by means of which the individual wall elements can be locked in a specified position when the roof box is in the retracted and/or extended state. This prevents the individual wall elements from unintentionally pivoting or moving in some other manner. It is particularly preferable for the locking means to be arranged on the support elements, in particular when they are designed in the form of brackets. For example, the locking means can comprise electromagnets, electromagnetically shiftable latches and the like.

In an additional preferred embodiment, means are provided in the interior space of the roof box to fix the position of objects to be transported. This ensures that the load does not shift during transport. These means for positional fixation can for example be cushions filled with gas, especially air, holders, or padding shaped to correspond with the load. The means for positional fixation and in particular the gas cushions can have recesses, openings, or other seats for specific objects. For example, a gas cushion arranged flat on the floor element can have recesses for skis or the like. The gas cushions can comprise a plurality of chambers which can be optionally controlled by means of corresponding valves and a control device. Thus at a given time, only certain areas of the gas cushion can be inflated or deflated. This allows the gas cushion to be adapted or modified to accommodate different objects.

In an additional preferred embodiment, one or more sensor elements are provided to determine a retracted or extended state of the roof box, and/or to determine the position (open position or closed position) of the roof box, and/or to determine the state of fullness of the roof box. Alternately or in addition, lighting means can be provided to illuminate the interior space of the roof box, wherein the lighting means are preferably actuated on the basis of an evaluated signal, or respectively an input from the sensor element. Accordingly, for example, the lighting means can be actuated when a control device that is connected to the sensor and to the lighting means recognizes by means of the sensor element that the roof box is in an open position.

In another preferred embodiment, at least one wall element, and/or at least one segment of a wall element, is designed substantially transparent. This transparent design can in particular be desirable when the user of the motor vehicle desires the light to penetrate from above through the transparent wall element, or respectively the segment of the transparent wall element, into the interior of the motor vehicle. Glass in particular can be used to create a transparent design of the wall element or respectively segment of the wall element. Furthermore, color state changing means can be provided to change the state of the color of the at least one wall element and/or the at least one segment of a wall element. With the assistance of the color state changing means, the at least one wall element and/or the at least one segment of a wall element can be changed from the transparent state into a colored state and vice versa. It is useful in particular for the color state changing means to be provided in the at least one wall element and/or in the at least one segment of a wall element. This can be for example thermal paints or the like.

Furthermore, when a transparent wall segment is provided in the floor element, and/or in the cover element of the roof box, it is useful to preferably provide a complementary opening in the cover element when the transparent wall segment is provided in the floor element, the complimentary opening in particular preferably comprising covering means or, when the transparent wall segment is provided in the cover element, a complementary opening is preferably provided in the floor element that in particular preferably comprises covering means. The covering means are advantageously designed stable so that they are suitable for accommodating objects to be transported, wherein the covering means have in particular supporting means, preferably support rods and/or support ribs.

It is furthermore preferable for the base surface of the floor element to not form a polygon and in particular to not form a rectangle, and/or for the shape of the base surface of the floor element to correspond to the shape of the roof surface of the respective vehicle on which the roof box is to be installed. In conventional roof boxes known from the prior art, the base surface of the floor element is generally designed rectangular. The roof surface of modern motor vehicles however, when viewed from above, is normally not designed rectangular; instead, the side edges of the roof surfaces have curves. In particular, the roof surface frequently widens toward the front, wherein the front region of the side edges of the roof surfaces then runs outward under a radius of curvature. Accordingly on the one hand, roof boxes with a rectangular base surface do not optimally exploit the roof surface and, on the other hand, they strongly contrast visually with the non-rectangular base surface of the roof, and a visually integrated overall impression is not formed. These disadvantages are overcome with the present embodiment. The base surface of the floor element preferably has at least one curved side edge, and in particular preferably, a plurality or all of the side edges can run curved. With reference to the roof surface, this creates a maximum space for the roof box with a changeable volume, and an integrative overall impression arises, in particular when the base surface of the floor element assumes the shape of the roof surface. It is in particular preferable when the dimensions of the base surface of the floor element substantially correspond to those of the roof surface.

In another preferred embodiment, the volume changing means have at least one rod assembly and in particular at least one swivel bow, wherein the rod assembly is designed to move the roof box between the retracted state and the extended state, and usefully vice versa as well. A swivel bow preferably has articulations at its two ends by means of which it is usefully fastened to the floor element of the roof box. In particular, the at least one rod assembly can be arranged perpendicular to the roof box or respectively the motor vehicle. In the retracted state, the bow lies flat on the roof or respectively the floor element of the roof box. To establish an extended state of the roof box, the swivel bow is swung up on both its articulations, for example by an angle of 60° to 120°, and preferably 70° to 100°. By pivoting the rod assembly or respectively the swivel bow, wall elements arranged above the rod assembly such as cover elements, or side walls as well, are erected, and the roof box unfolds. In an in particular preferred embodiment, the cover element is designed in three parts, and the roof box furthermore has one rear wall, two side walls and one floor element. When the swivel bows are in an erected state, they lie substantially parallel to the joints between the two outer and middle cover segments and abut the joints on the inside of the cover element. The side walls are preferably designed as a single part or respectively unit and can only be pivoted as a whole relative to the floor element. In particular, the side walls grip around an edge region of the cover element with a flange section or the like, and are also erected when the rod assembly is swung up since the cover element is accordingly thereby swung up. In particular, the side walls do not have to be vertically aligned when the roof box is in an extended state; instead, they are slightly oblique to a vertical line when the roof box is in the extended state. It is furthermore useful to provide latching means on the rod assembly that snap into corresponding counterparts on the wall elements when the roof box is in an extended state to thus obtain a stable roof box in the extended state. In particular, the latches can be formed by projections or the like that project from the rod assembly and snap into corresponding recesses in the wall elements. The edges can also comprise a frame that forms a top part together with the rear wall, the cover element and the side walls, wherein the aforementioned wall elements all border the frame and/or are connected, especially pivotably, thereto. The at least one rod assembly can be pivotably mounted on the frame instead of the floor element. The top part formed by the frame, side walls, rear wall and cover element can be pivoted relative to the floor element when the roof box is in an extended state in order to open the roof box.

It is furthermore useful when a sealing element is provided between at least two components of the roof box that can move relative to each other and are arranged adjacent to each other, in particular between neighboring wall elements and/or between neighboring segments of wall elements, and/or between a frame and a wall element, wherein the sealing element is preferably arranged in an overlapping region of the two components of the roof box. This prevents the penetration of moisture, dust and other undesirable particles into the interior of the roof box. In order to establish an overlap between two components, it is useful to provide a recess or another bent or beveled region to thereby establish the overlap. The sealing element is then to be arranged between the two overlapping sections of the two components.

The object underlying the invention is further achieved by a roof of a motor vehicle, wherein an above-described roof box is arranged integrated in the roof. Such a roof can usefully have a roof recess to accommodate the roof box. The roof recess is preferably designed such that an upper terminating surface of the roof box, when in the retracted state, terminates flush with the unrecessed part of the roof.

The roof box is preferably designed such that it covers at least 80%, preferably at least 90%, in particular preferably at least 95%, and most preferably 100% of the entire roof surface of the roof of the motor vehicle. This can optimally gain space for a very large storage surface and integrate the roof box in the roof in a visually attractive manner. The coverage in terms of the indicated percentages can apply to the retracted or the extended state of the roof box. Both options are hereby expressly included in this embodiment. It is also sufficient in this context for the provided surface to only be covered by one of the wall segments.

In another preferred embodiment, the motor vehicle roof is designed as a roof of a motor vehicle designed as a coupe or sports car, or a motor vehicle with a hatchback. In particular in the region of the rear or respectively hatchback, the roof has a guide on which the roof box can be moved. This makes it possible to move the roof box when in an extended or retracted state from a driving position in the top region of the roof to a loading position further below and closer to the rear of the motor vehicle. This makes it more comfortable for a user to load the roof box in the loading position than in the driving position where the roof box is located at the highest point of the roof of the motor vehicle. In particular, the guide has one or more rails for this that each comprise profiles, advantageously in the form of grooves or the like, wherein profile counterparts are formed on the roof box in order to engage in the profiles of the rails, especially in a form fit.

Furthermore, corresponding drives or the like can preferably be provided to automatically move the roof box.

Furthermore, the object underlying the invention is achieved by a motor vehicle which has a roof with a roof box integrated therein, wherein the roof box is designed as described above.

Examples of preferred embodiments of the invention are described with reference to the drawing, and additional advantageous details of the figures can be found in the drawing.

BRIEF DESCRIPTION OF THE DRAWINGS

Functionally equivalent parts are provided with the same reference numbers. The figures of the drawing schematically show:

FIG. 5 A perspective rear view of the roof box with a rear wall that is partially folded in;

DETAILED DESCRIPTION OF THE DRAWINGS

Figure 1:
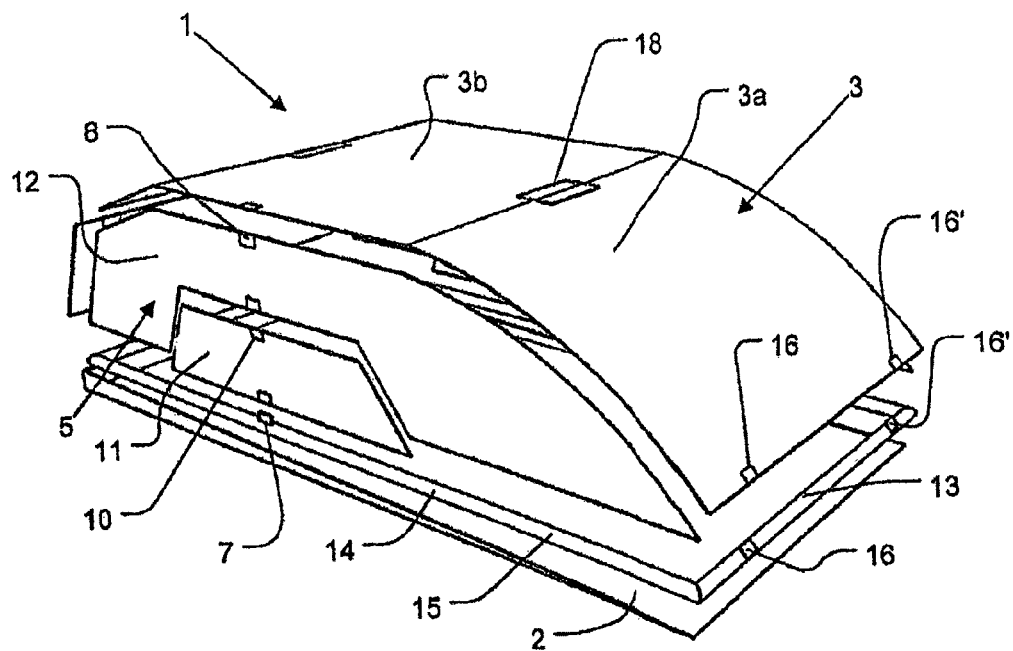
FIG. 1 A front view of a perspective exploded view of the roof box.
Figure 2:
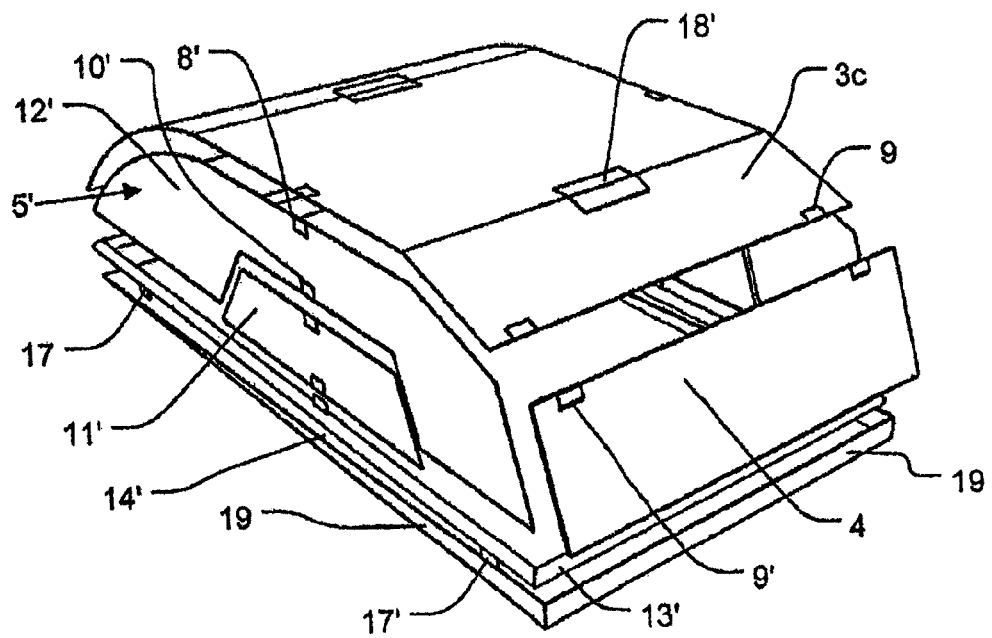
FIG. 2 A rear view of a perspective exploded view of the roof box.

FIG. 1 shows a front, perspective exploded view of the roof box 1, and FIG. 2 shows a rear, perspective exploded view of the roof box 1. To be understood as an exploded view is that some elements of the roof box 1 are displayed "floating" over each other for reasons of clarity. Because of the exploded view, some hinges are shown as two separate parts floating above each other even though a hinge is to be understood as a joint that connects and fastens two parts in a movable manner at the region of its edges.

For a base, the roof box 1 has a bottom floor element 2 that is designed as an approximately rectangular panel with a rear edge and two side edges having a floor wall 19. In order to adapt to conventional shapes of vehicle roofs, the floor element 2 can be wider toward the front in the shape of a trapezoid and/or have a curvature. An approximately rectangular frame 15 is arranged on the floor element 2 with two longitudinal supports 14, 14' and two transverse supports 13, 13'. The outer dimensions of the frame 15 are chosen to be slightly less than the inner dimensions of the floor wall 19 so that the frame 15 within the floor wall 19 can lie on the floor element 2. The frame 15 is articulated on a transverse support 14' to the floor element 2 by means of a front 17 and rear frame hinge 17'. This allows the frame 15 to be swung up together with the elements arranged thereupon. Two side walls 5, 5' are arranged on the frame 15. The two side walls 5, and 5' each have a bottom approximately trapezoidal side wall segment 11, 11', and a top side wall segment 12, 12' that are connected to each other by means of a middle hinge 10. The bottom side wall segments 11, 11' of the side walls 5, 5' are each connected by means of a bottom side wall hinge 7 to a longitudinal support 14, 14' of the frame 15. A cover element 3 is arranged on the two side walls 5, 5' and the front transverse support. The top side wall segments 12, 12' of the side walls 5 are fastened to the cover element 3 by means of top side wall hinges 8, 8'. The side walls 5, 5' are designed to be shiftable relative to the cover element 3 along their top edges, i.e., in the direction of the longitudinal supports 14, 14'. To this end, the top side wall hinges 8, 8' can be shiftably arranged on the cover element 3 or on the side walls 5, 5', for example by means of a rail (not shown). An additional option is to design the hinges 8, 8' per se with play in a longitudinal direction so that the cover 3 and side walls 5, 5' are shiftable relative to each other in a longitudinal direction.

The cover element 3 has a front 3a, a middle 3b and a rear cover segment 3c that are connected to each other by means of cover segment hinges 18, 18'. The front cover segment 3a is additionally connected to the frame 15 by means of front cover element hinges 16, 16'.

The height of both side walls 5 or respectively both side wall segments 12, 12' narrows toward the front. The cover element 3 is hence correspondingly curved, in particular in the region of the front cover segments 3a. The roof box 1 consequently has an approximately wedge-like aerodynamic shape.

Both side walls 5 also narrow in a rear section on which the cover segment 3c is arranged. A rear wall 4 is connected by two rear wall hinges 9, 9' to this cover section 3c.

The two parts of the roof box 1 can consist of plastic, metals—especially aluminum and titanium—carbon, or composite materials. The frame can for example be made of aluminum tubes. The hinges can be designed as multiple or single parts, for example as metal hinges or flexible film hinges. They can be fastened or molded onto the corresponding parts. Seals are provided for the roof box 1 in the region of edges such that the interior space 6 (see FIG. 4) is protected against wetness and contaminants.

When the supports 13, 14 of the frame 15 are hollow profiles, electrical power supply and control lines or pneumatic compressed air lines can be run in their interior (not shown).

Figure 3:
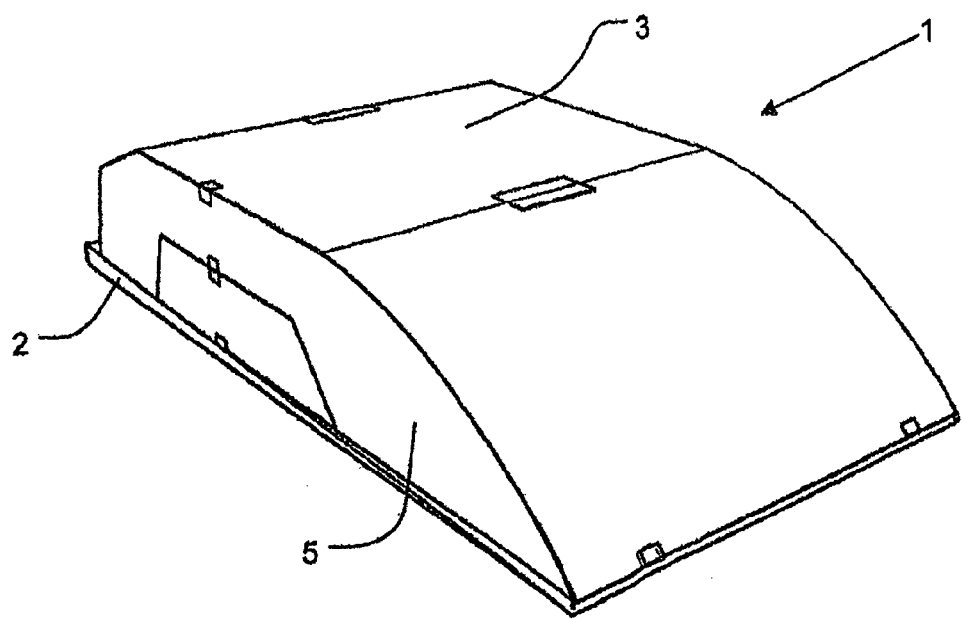
FIG. 3 A perspective front view of the roof box.

FIG. 3 shows a perspective front view of the roof box 1 in the unfolded, closed state with the floor element 2, a side wall 5 and the cover element 3. The floor element 2 additionally has means (not shown) for attaching the cover box 1 to the roof of a motor vehicle.

Figure 4:
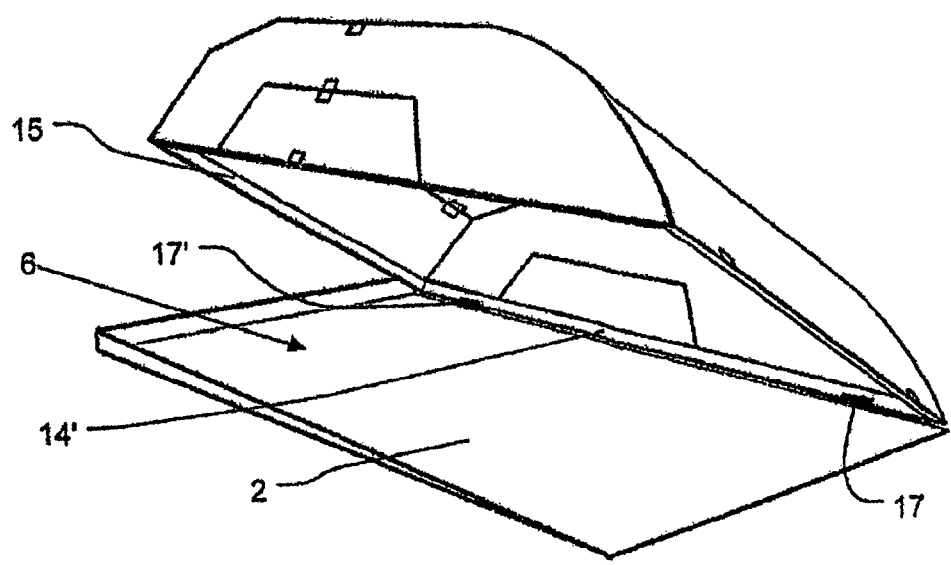
FIG. 4 A perspective front view of the roof box in the open state.

FIG. 4 shows a perspective front view of the roof box 1 in a laterally open state; The useful interior space 6 formed by the roof box 1 is shown.

On one of its two longitudinal supports 14', the frame 15 has two frame hinges 17, 17' by means of which it is connected to the floor element 2. Since the side walls 5, the rear wall 4 and the cover element 3 are arranged on the frame 15, these elements can be folded up or down together with the frame 15 in order to open or close the roof box 1. In addition, one or more frame hinges (not shown) can also be provided on the opposite longitudinal support 14, and they are arranged or designed so that the roof box 1 can be opened both from one side as well as from the other side as needed.

A fastener (not shown) is also provided by means of which the roof box 1 can be secured against being opened when in a closed state.

Figure 5:
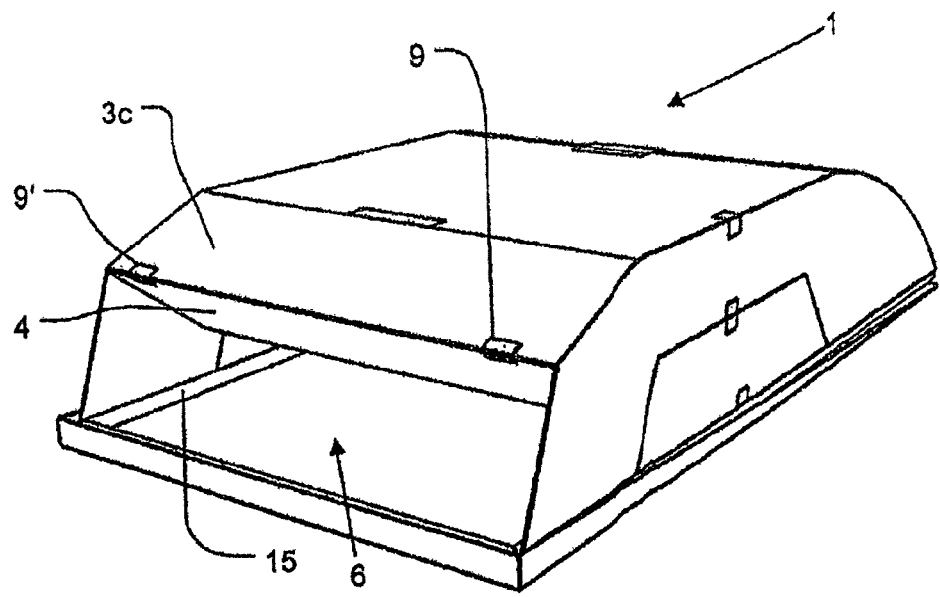

FIG. 5 shows a perspective rear view of the roof box 1 with a rear wall 4 that is partially folded in. If the roof box 1 is to be folded up, first the rear wall 4 is folded inward in a first step by means of the rear wall hinges 9, 9', i.e., into the interior space 6. To this end, the rear wall 4 has a fastener (not shown) that is previously opened. FIG. 5 shows the partially folded in, substantially rectangular rear wall 4; when in a completely folded in state, it lies completely against the substantially rectangular rear roof segment 3c. To enable this, the rear wall 4 and the rear roof segment 3c have approximately the same dimensions, i.e., the surfaces of both parts are nearly congruent.

Figure 6:
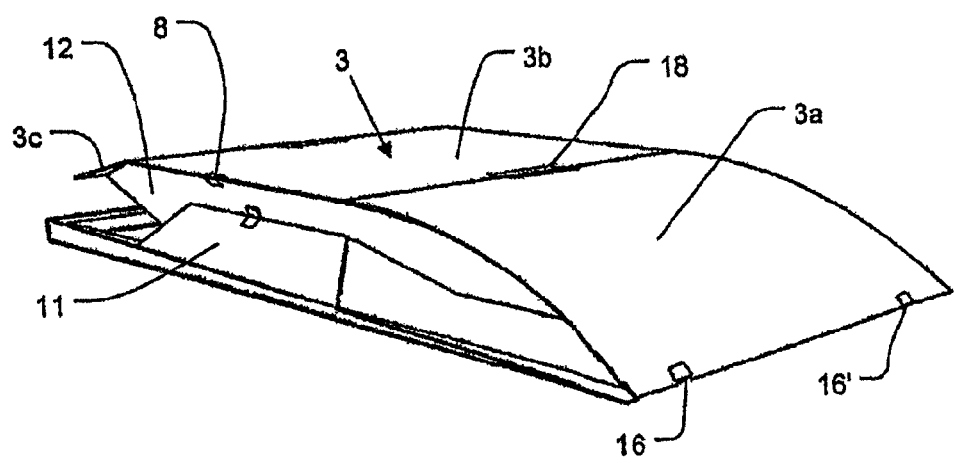
FIG. 6 A perspective front view of the roof box in the partially folded state.

FIG. 6 shows a perspective front view of the roof box 1 in a partially folded state; The rear wall 4 is already completely folded inward and lies against the rear wall roof segment 3c (not shown). In the next step, the bottom 11, 11' and the top side wall segments 12, 12 are jointly folded inward until the bottom side wall segments 11, 11' lie against the floor segment 2, and the top side wall segments 12 lie against the cover element 3. When the side wall segments 11, 11', 12, 12' are folded in, the middle cover segment 3b also lowers since it lies on the top side wall segments 12, 12' and is connected to them by the top side wall hinges 8, 8'. To enable the side wall segments 11, 11' to be completely folded inward, the side wall hinges 8, 8' can for example be designed as elastic film hinges so that the side wall segments 11, 11' can be easily lowered when folding in compared to the middle roof segment 3b.

Since the front cover segment 3a is connected to the frame 15 at the front edge by means of the front cover element hinges 16, 16', and to the middle cover segment 3b at the rear edge by means of the cover segment hinge 18, the front cover segment 3a pivots downward toward the floor element 2 about a pivot axis that lies in the region of the cover element hinges 16, 16'. By pivoting the front cover segment 3a, it slides to the rear with the middle 3b and rear cover segment 3c along the top side wall segments 12, 12' when lowering. In order to enable this movement in the longitudinal direction, the hinges 8, 8' can for example be shiftably attached by means of a rail (not shown), or designed so that they have play in the longitudinal direction.

The roof box 1 can be manually opened or closed or folded or unfolded in the described manner. In a preferred embodiment, electromagnets (not shown) and/or air cushions, and/or servomotors controlled by an electronic sequential control can be provided on the hinges and/or movable parts. In order to coordinate the sequential control, sensors can be provided for the roof box 1 that transmit the state of the moving parts. The opening/closing and/or folding/unfolding can be fully automated, for example by means of remote control or radio remote control. For this, the roof box 1 can be connected to the power system and/or data bus of the motor vehicle. The roof box can also have inner and/or outer lighting with brake lights. The power can also be supplied by means of an integrated solar module (not shown) with an energy storage unit that is arranged on the cover element 3. In order to keep the movable parts in a specific folded or unfolded position, magnets or electromagnets can be provided, for example on the rear wall 4 and on the cover element 3. In addition, appropriate sensors can be provided that inform the driver about the state of the roof box 1 and/or emit warning signals, for example if the permissible height is exceeded by the roof box 1 when entering a parking garage, or if objects arranged within the roof box are not secured with the provided safety devices such as belts. Additional sensors can display the weight of the load, or if the roof box 1 is closed or open. Furthermore, e.g. a camera can be provided that monitors the interior space 6 of the roof box 1 during travel. By means of the connection to the data bus of the motor vehicle, all data can be displayed and monitored on the instrument cluster, including fuel consumption. An integrated GPS tracking system with a transmitter is also possible in order to locate the position of the roof box 1 in case of theft.

Figure 7:
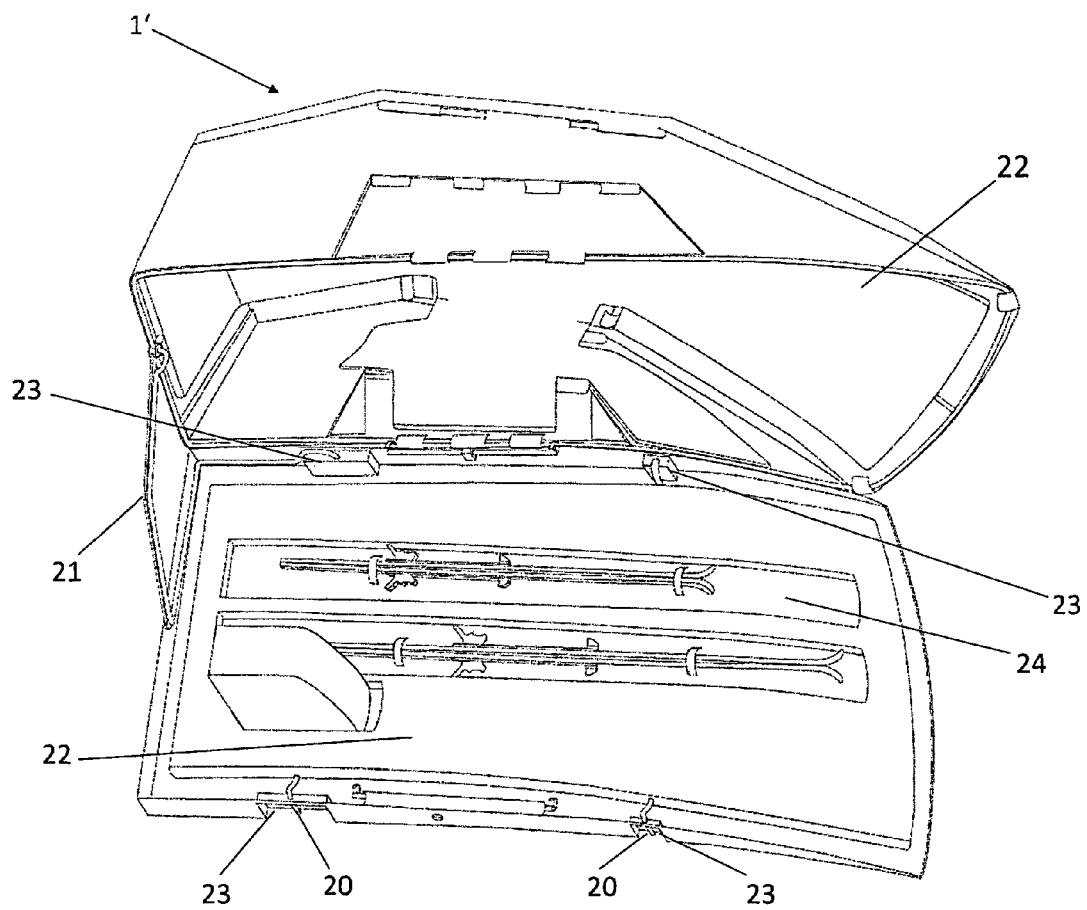
FIG. 7 A perspective view of another embodiment of the roof box.

FIG. 7 shows a perspective view of another embodiment of the roof box V. This is particularly suitable for a movable roof luggage rack. It accordingly has attaching means 20 by means of which the roof box 1' can be attached to a (movable) roof luggage rack or support frame (not shown). With these attaching means 20 or other suitable connections, the roof box 1' can also be supplied with power or compressed air and connected to the onboard computer 25.

Figure 12:
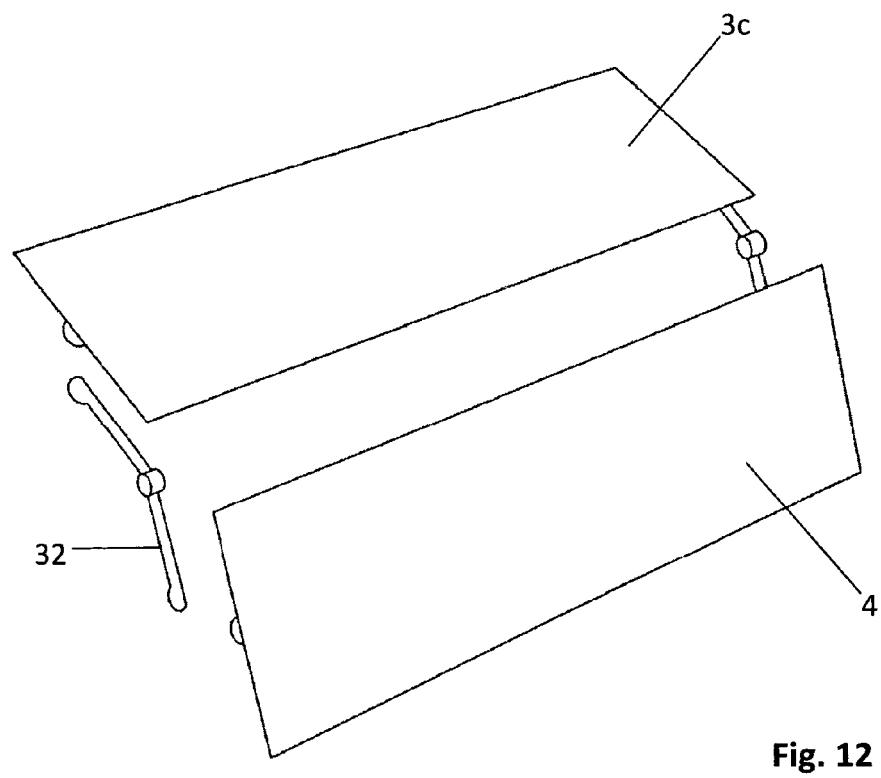
FIG. 12 Another embodiment of the cover element with an unfolded rear wall.

The roof box 1' can preferably be opened from both sides. This can for example be enabled by providing two, i.e., a total of four, hinge fasteners 23 on each side of the roof box 1'. In a closed state, the hinge fasteners 23 lock the roof box 1', for example by snapping into place. If they are opened on one side, the opposing hinged fasteners 23 function as hinges as shown in FIG. 12. Alternately or in addition, a swivel joint 21 can be provided. Another option (not shown in the present case) is to provide two overlapping frames, wherein the bottom frame can pivot by pivoting means relative to the floor element to one side of the roof box which opens the roof box. In the case in which the roof box is to be opened towards the other side, the top frame is connected to the bottom frame by pivoting means. In this case, the bottom frame remains unpivoted, and only the top frame is pivoted relative to the bottom frame. The pivoting means between the two frames is arranged on the opposite side of the pivoting means between the bottom frame and floor element.

Furthermore, air cushions 22 are provided that have recesses 24 for the objects to be transported. As described above, the air cushions 22 can also be pneumatically controlled in order to unfold or fold the roof box 1'. For controlling, pressure sensors (not shown) can be provided that can also measure the weight of the objects in the roof box 1' and display the weight by the onboard computer.

In the longitudinal direction, the floor element 2 is slightly curved in order to adapt to the roof shape of a motor vehicle.

Figure 8:
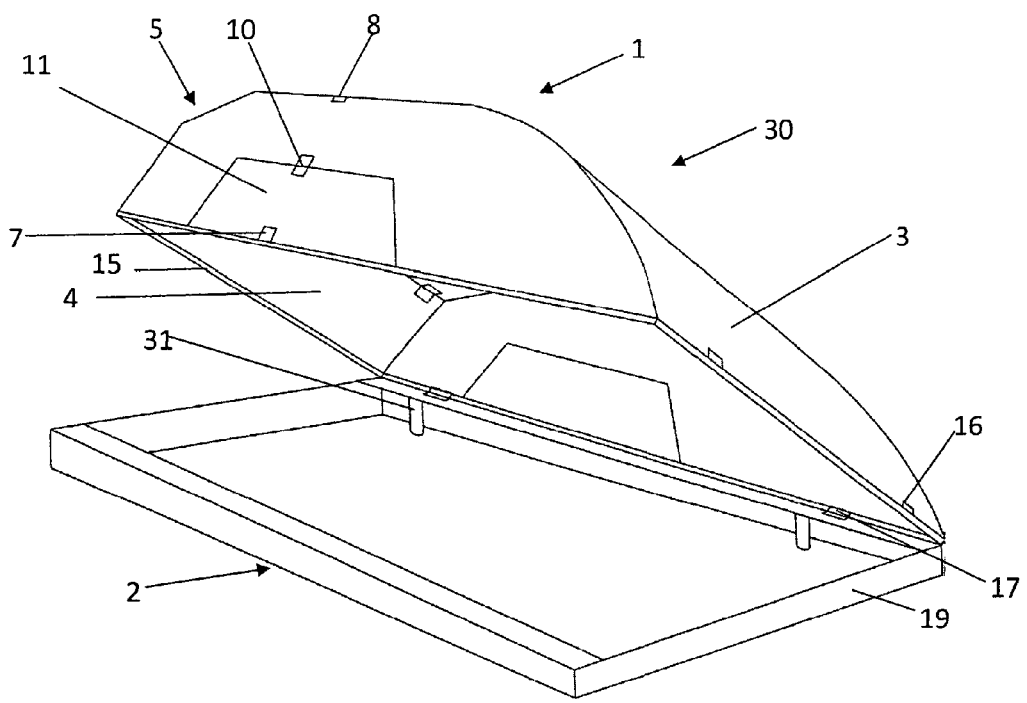
FIG. 8 A perspective front view of the another embodiment of the roof box in the open state.

FIG. 8 shows the roof box 1 which has a bottom floor element 2 as a base that is designed as an approximately rectangular panel with a rear edge, front edge and two side edges having a floor wall 19. In order to adapt to conventional shapes of vehicle roofs, the floor element 2 can be wider toward the front in the shape of a trapezoid and/or have a curvature. An approximately rectangular frame 15 is arranged on the floor element 2 with two longitudinal supports and two transverse supports. The outer dimensions of the frame 15 are chosen to be slightly less than the inner dimensions of the floor wall 19 so that the frame 15 has space within the floor element 2.

Two side walls 5 are arranged on the frame 15. The two side walls 5 each have a bottom, approximately trapezoidal side wall segment 11, and a top side wall segment 12 that are connected to each other by means of a middle hinge 10. The bottom side wall segments 11 of the side walls 5 are each connected by means of a bottom side wall hinge 7 to the frame 15. A cover element 3 is arranged on the two side walls 5 and the front frame 5. The top side wall segments 12 of the side walls 5 are fastened to the cover element 3 by means of top side wall hinges 8. The cover element 3 is additionally connected to the frame 15 by means of front cover element hinges 16. In addition, the rear wall 4 is also foldably arranged on the cover element 3. This allows the top part 30 to fold up. So that the folded top part 30 can be accommodated within the height of the floor wall 19 of the floor element 2, a lifting device 31 is provided for the floor element 2 to lift and lower the top part 30. In an unfolded state, the lifting device 31 is in a lifted state together with the top part 30 arranged thereupon, and the top part 30 is flush with the top edge of the floor wall 19. The frame 15 provided on the lifting device 31, which in turn is fastened to the floor element 2, is articulated to the floor element by means of frame hinges 17. The frame 15 can thus be folded upward (on the side) with the entire top part 30. Particularly in the case of such roof boxes which can be opened on the side, the lifting device 31 is advantageous. In the case of roof boxes that can be opened by lifting the rear region of the roof box on a front articulation, it is preferable to not provide a lifting device.

Figure 9:
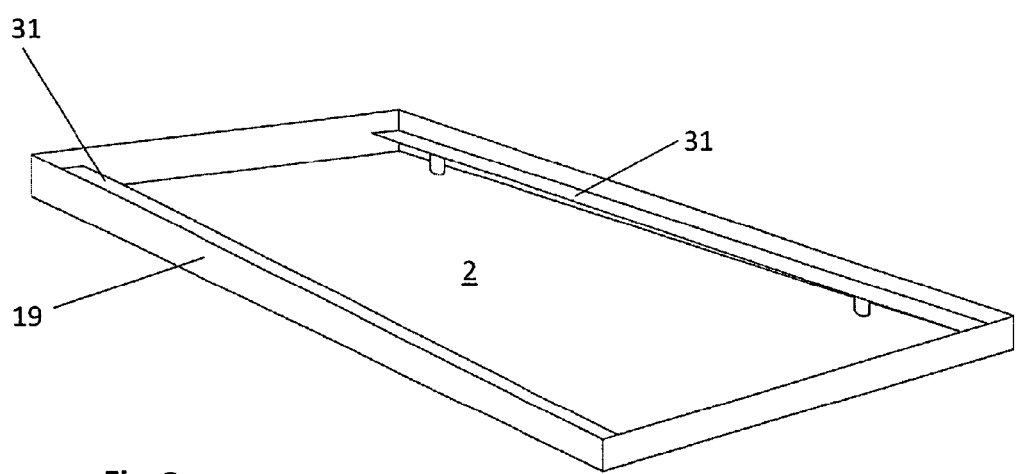
FIG. 9 A perspective view of the floor element with a lifting device (for laterally opening the roof box)

By way of comparison, FIG. 9 shows a perspective view of the floor element 2 with a partially lowered lifting device 31. By lowering the lifting device 31 and the folded top part 30, the top part is accommodated within the floor element 2 with the floor wall 19. In the longitudinal direction, the floor element 2 is slightly curved in order to adapt to the roof shape of a motor vehicle.

Figure 10:
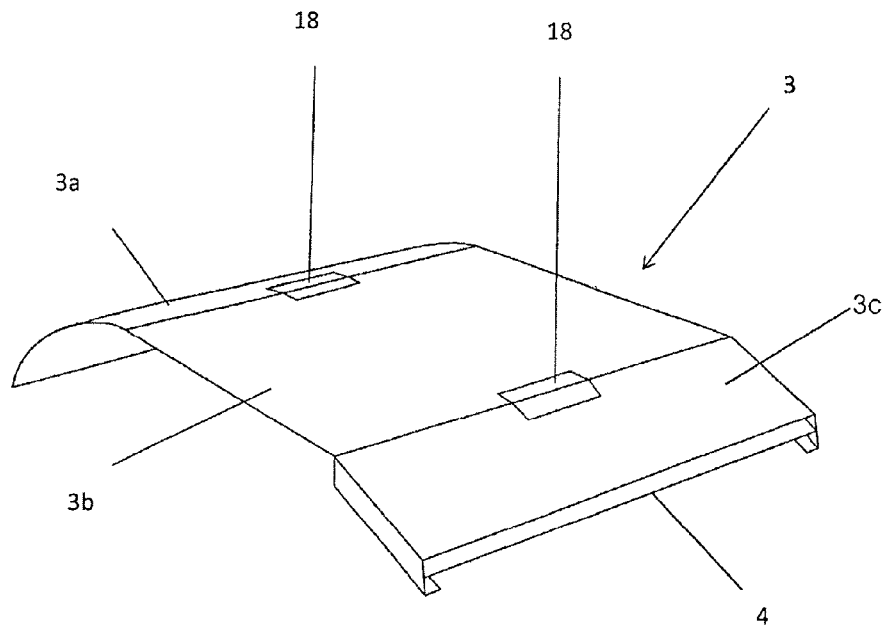
FIG. 10 A perspective rear view of the cover element.

FIG. 10 shows a perspective rear view of the cover element 3 that has a front 3a, a middle 3b, and a rear cover segment 3c. These segments are connected to each other by means of cover segment hinges 18. A movable rear wall 4 is arranged under the rear cover segment 3c. The rear wall 4 can be moved out of the cover segment 3c to the rear and then folded downward (this state is shown in FIG. 8). When the cover segment 3c and/or the rear wall 4 has/have a curvature, a particularly compact arrangement of both elements is advantageously possible when the roof box 1 is in a folded state.

Figure 11:
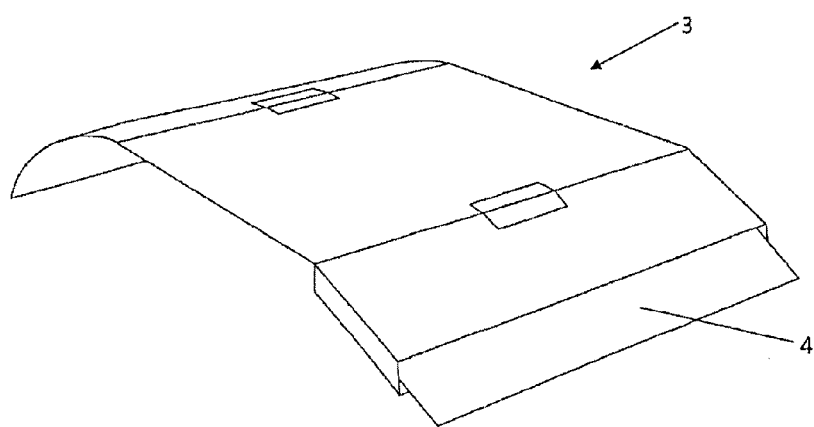
FIG. 11 A perspective rear view of the cover element with a partially extended rear wall.

FIG. 11 shows a perspective rear view of the cover segment 3c as in FIG. 10 with the rear wall 4 that is partially extended to the rear.

FIG. 12 shows another embodiment of the cover segment 3c with an unfolded rear wall 4. For the sake of illustration, the elements are depicted floating above each other. The cover segment 3c and the rear wall 4 are connected by means of an articulation 32. The articulation 32 is designed such that it allows the rear wall 42 to be shifted to the rear in an approximately horizontal plane, and then allows the rear wall 4 to fold down when unfolding the roof box 1. When folding up the roof box 1, the rear wall 4 is first folded down into a horizontal position and then shifted under the cover segment 3c in the driving direction of the motor vehicle. This is particularly advantageous when the surface of the rear wall 4 and the surface of the cover element 3, or the surface of the region of the side wall 5 which abuts the rear wall when the roof box is in a retracted state, have the same direction and degree of curvature since then the curved surfaces engage in each other in a space saving manner.

Figure 13:
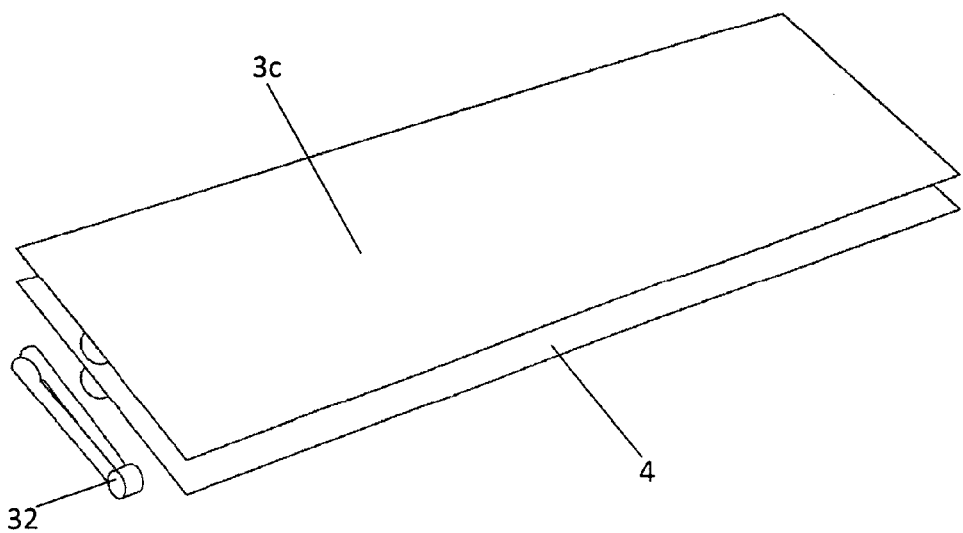
FIG. 13 The cover element as in FIG. 12 with a retracted rear wall.

FIG. 13 shows the cover element 3 as in FIG. 5. The rear wall 4 is retracted and arranged in a space saving manner under the cover segment 3c.

Figure 14A:
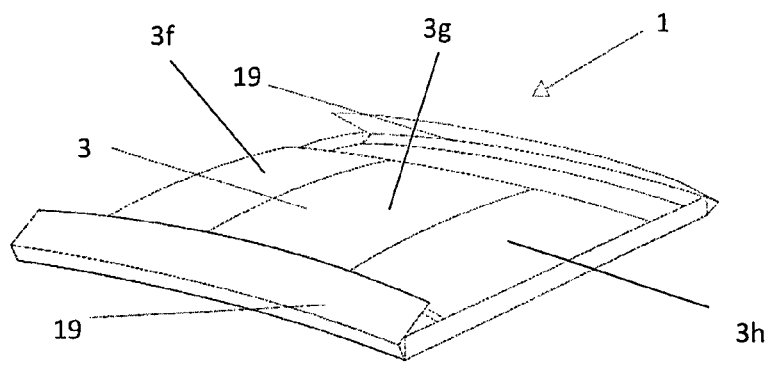
FIG. 14*a-c* Another embodiment of the roof box in an unfolding sequence.
Figure 14B:
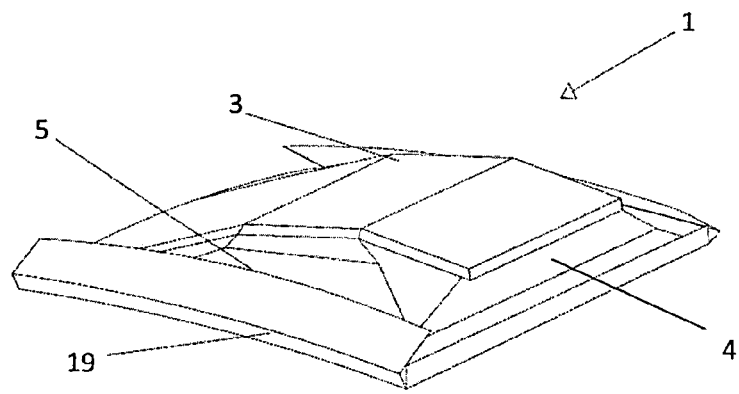
Figure 14C:
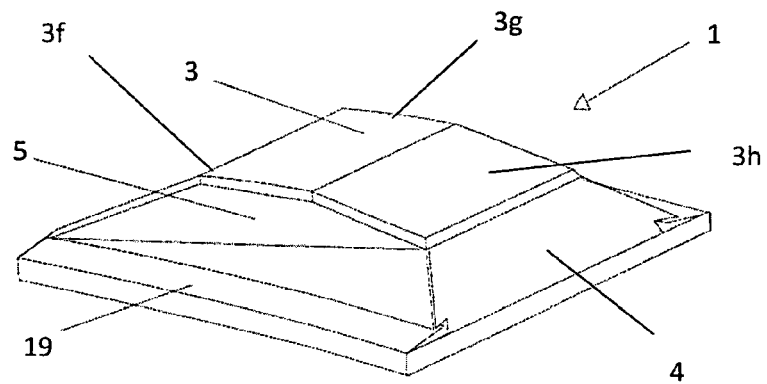

FIGS. 14a, 14b and 14c each show a perspective view of another embodiment of a roof box 1. FIGS. 14a, 14b and 14c show the unfolding process in a sequence. The roof box 1 comprises a cover element 3 that comprises three cover segments 3f, 3g, 3h which are connected to each other and arranged sequentially viewed in the longitudinal direction of the roof box 1. The front cover segment 3f as well as the middle cover segment 3g are made of glass. In the floor element of the roof box 1 and/or in the roof of the vehicle, there are also corresponding segments and/or openings (not shown) made of glass or another transparent material. In the case of the motor vehicle roof, these elements can in particular be formed by a sunroof. In FIG. 14a, the floor walls 19 are partially unfolded. FIG. 14b shows an intermediate step with unfolded floor walls 19, partially unfolded side walls 5, and unfolded roof walls 3. FIG. 14c shows the completely unfolded roof box 1. When the roof box 1 is in the extended state, the side walls 5 run inward at a slant viewed from bottom to top.

Figure 15:
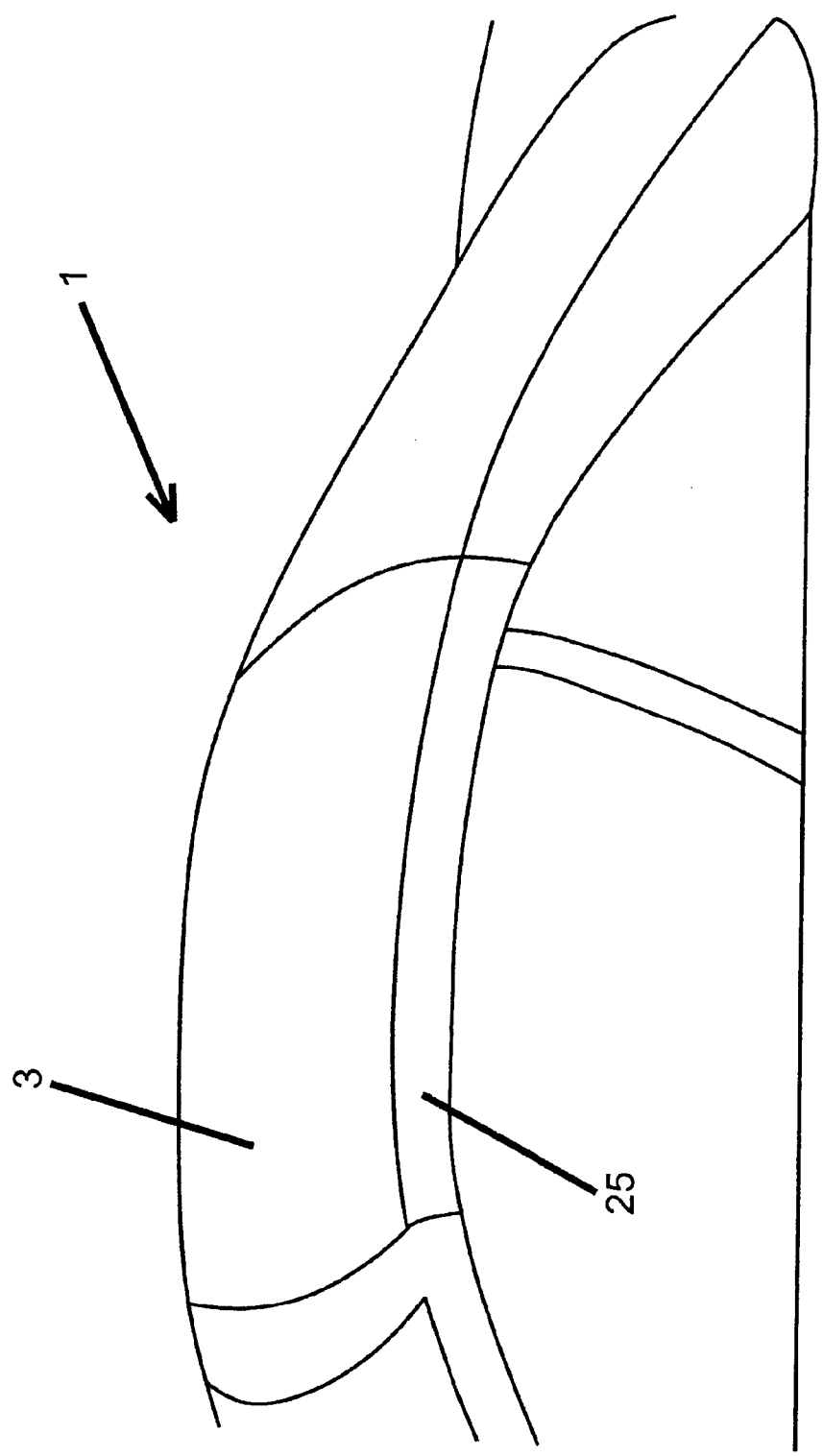
FIG. 15 Another embodiment of a roof box installed on a convertible in a retracted state.

FIG. 15 shows the upper region of a convertible with a folding roof 25 made of metal. Such folding roofs 25 are used today as an alternative to fabric roofs. When in a completely folded state, the roof box 1 is located on the folding roof 25 and is therefore not visually discernible. Only the cover element 3 is visible, but it is not obtrusive.

Figure 16:
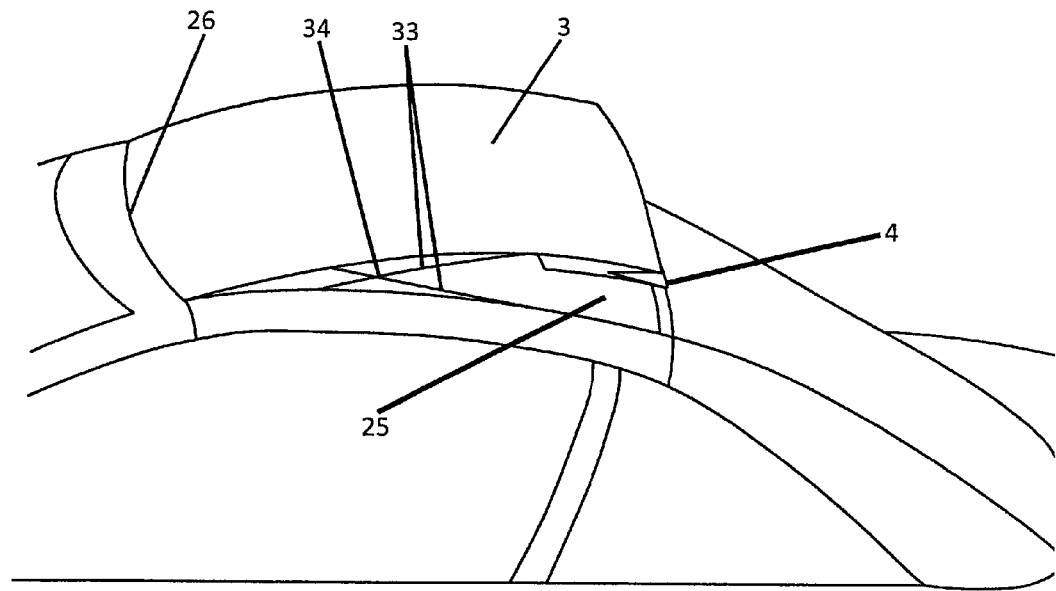
FIG. 16 The roof box from FIG. 15 in a partially extended state.
Figure 17:
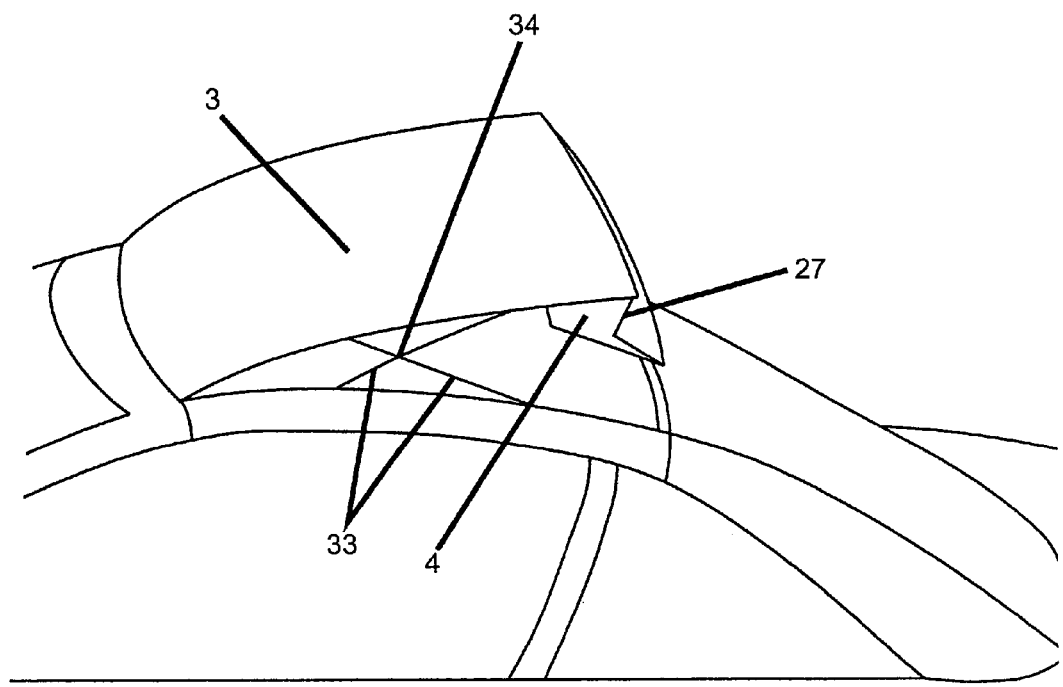
FIG. 17 The roof box from FIG. 15 in a partially extended state.
Figure 18:
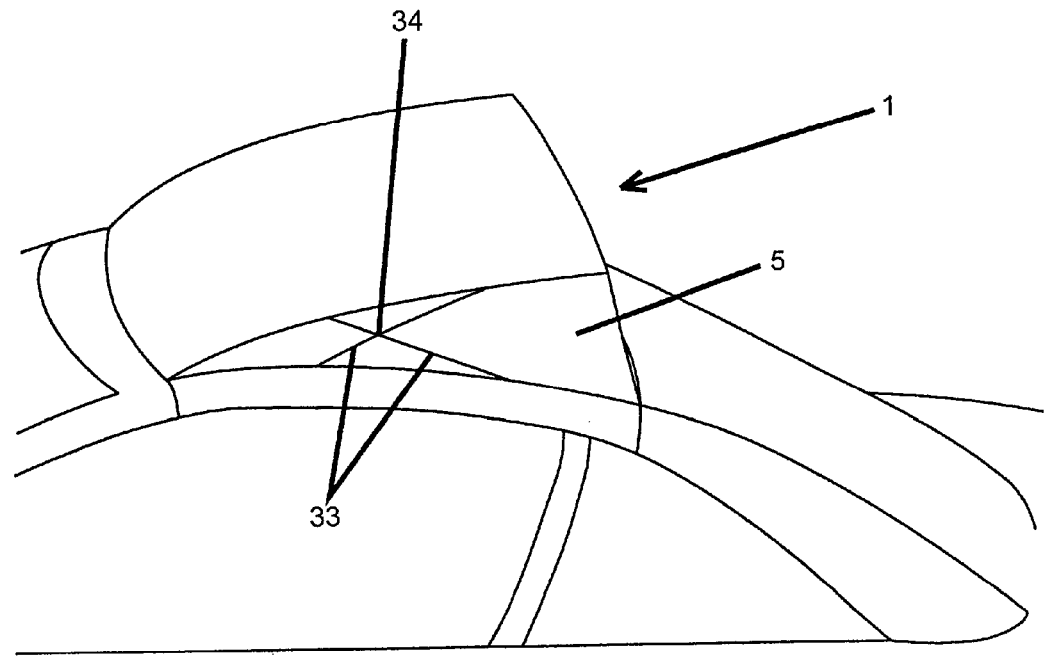
FIG. 18 The roof box from FIG. 15 in a completely extended state.

FIGS. 16 to 18 show the unfolding of the roof box 1. First the cover element 3 is folded upward. This is done by means of two rods 33 arranged crosswise which are arranged in the region of the two side walls of the roof box. The rods 33 are articulated to each other at a common articulation point 34. The ends of the rods are each movably attached to the cover element 3 or the floor element that is formed by the roof surface 28 so that pivoting the rods 33 relative to each other about the articulation point 34 causes the roof box 1 to unfold or fold. The side walls are manufactured out of a soft or deformable material such as fabric, in particular fabric such as that conventionally used for manufacturing convertible roofs which, in the present case, is not shown for the sake of clarity. The cover element 3 is attached to the folding roof 25 by means of a front articulation 26. The rear wall 4 is still arranged under the cover element 3 and lies against it.

FIG. 17 shows that the cover element 3 is folded further upward in order to unfold it, and the rear wall 4 extends below the cover element 3. As shown in FIG. 18, the rear wall then folds downward 4. This is enabled by a suitable rear articulation 27. The rear wall 4 can be fabricated from a hard material such as metal, or also a fabric-like deformable material, especially the same material as the side walls.

FIGS. 16 to 18 also show that the two side walls 5 can be unfolded. Overall, a roof box 1 is thereby formed with a closed, useful interior space that is delimited by a cover element 3, the two side walls 5, and the rear wall 4. A frame 15 borders the bottom side of the two side walls 5 and the rear wall 4. This makes it possible for the roof box 1 to be folded upward in the unfolded state about the articulation 26, i.e., toward the front, so that the interior space of the roof box 1 is exposed to the user who can load and unload the roof box 1. The floor of the roof box 1 is advantageously formed by the roof surface 28 (see FIG. 20).

To fold, the displayed and described procedures occur in reverse sequence. All the procedures can transpire automated and pneumatically, or automated by means of servomotors.

Figure 20:
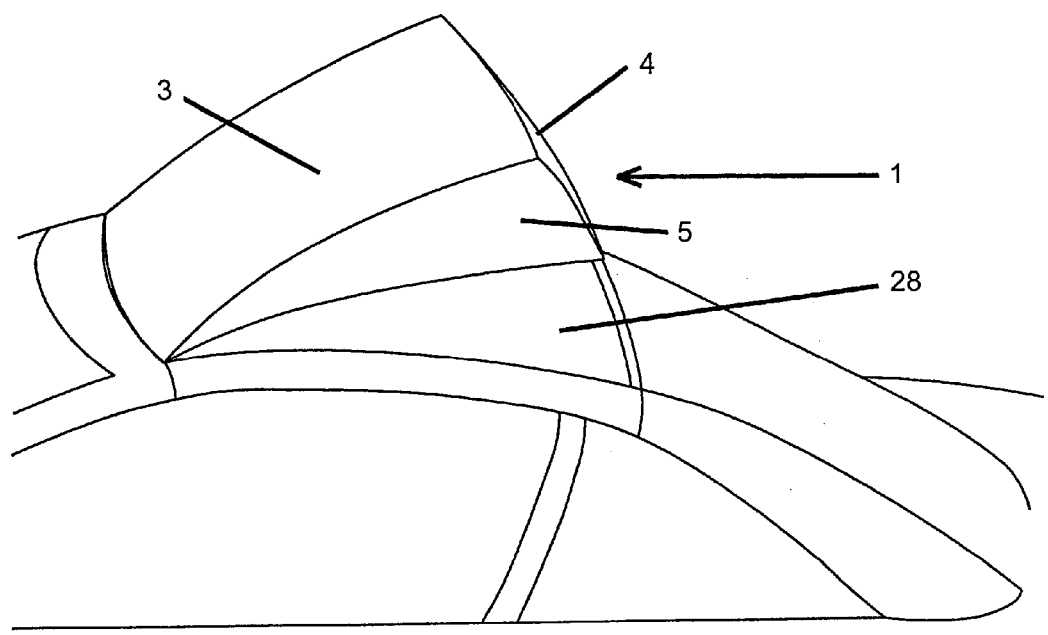
FIG. 20 The roof box from FIG. 15 in the extended and open state.
Figure 21:
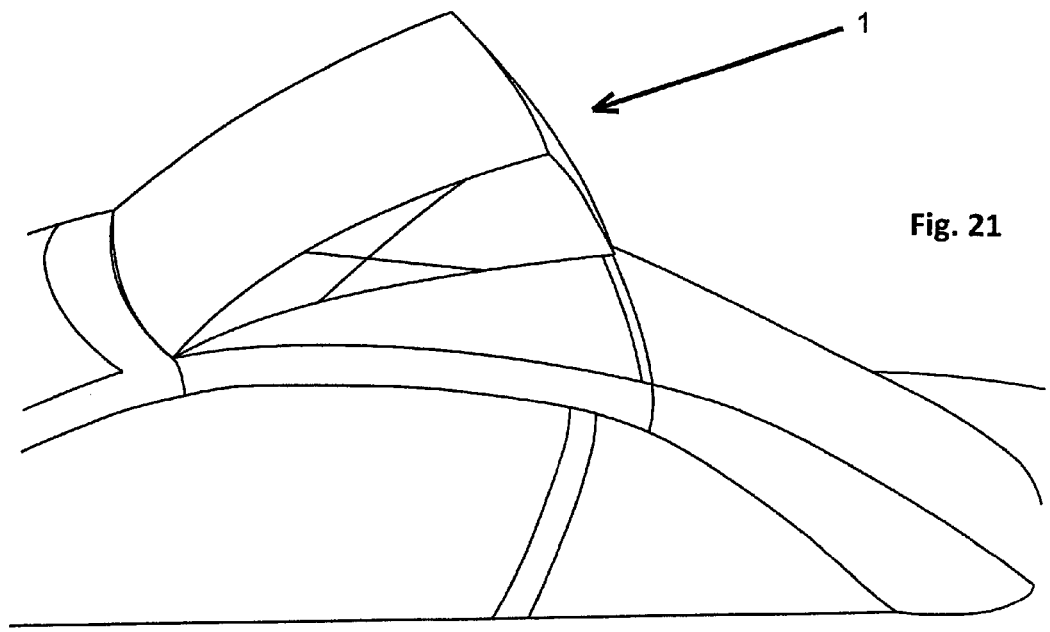
FIG. 21 The roof box from FIG. 15 in the extended and open state.

FIG. 18 shows the roof box 1 in a completely unfolded state, wherein the roof box 1 is closed. FIGS. 20 and 21 show the unfolded roof box 1 that is folded upward, i.e., opened, by means of the front articulation 26. The roof box 1 can be loaded in this state.

Figure 19:
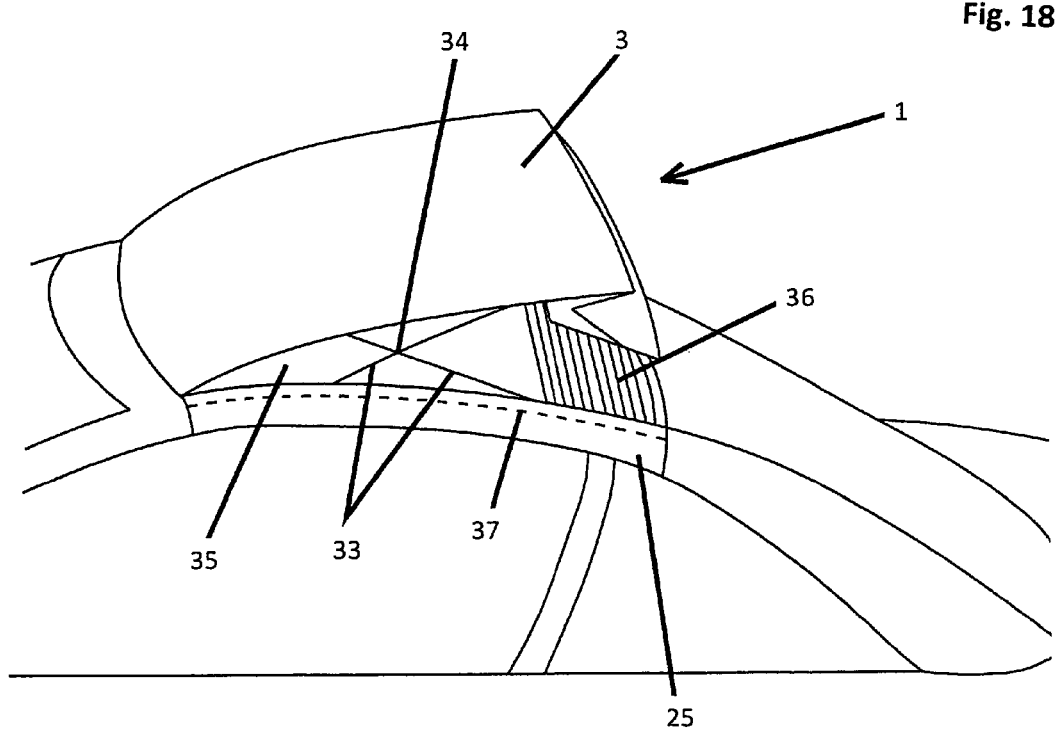
FIG. 19 Another view of the roof box from FIG. 15 for a motor vehicle with a sunroof.

FIG. 19 shows an embodiment in which direct sunlight can enter the interior space of the vehicle through the roof when the vehicle roof is closed despite the installed roof box 1. In this case, the cover element 3 is fabricated from a transparent material, especially glass. It is also possible for only a section of the cover element 3 to consist of this transparent material. A vehicle roof opening 35 is provided in the vehicle roof 25 and can be opened and closed by means of an integrated soft top 36. The soft top 36 can be opened and closed by means of a cable 37. In particular, the soft top 36 can be designed as a type of roller blind or Venetian blind. It is particularly useful for the material from which the soft top is formed to possess sufficient strength or stability since objects are placed directly on the soft top 36 when the roof box 1 is in a loaded state. If there is no load in the cover box 1, the soft top 36 can be retracted in order to expose the opening 35 through which sunlight can then enter the interior space of the motor vehicle due to the transparent cover element 3.

Figure 22:
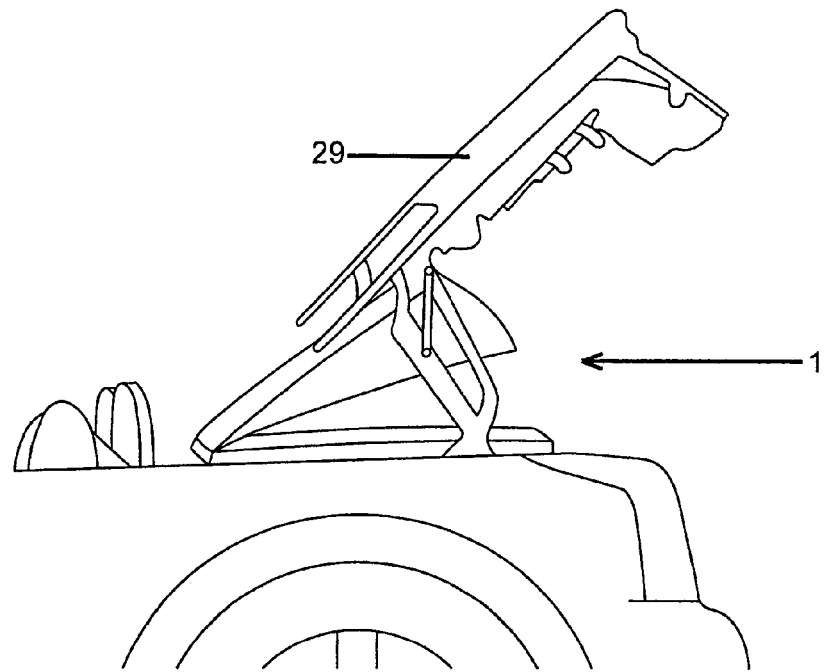
FIG. 22 The roof box from FIG. 15 in the extended and open state, wherein the roof of the convertible is retracted.
Figure 23:
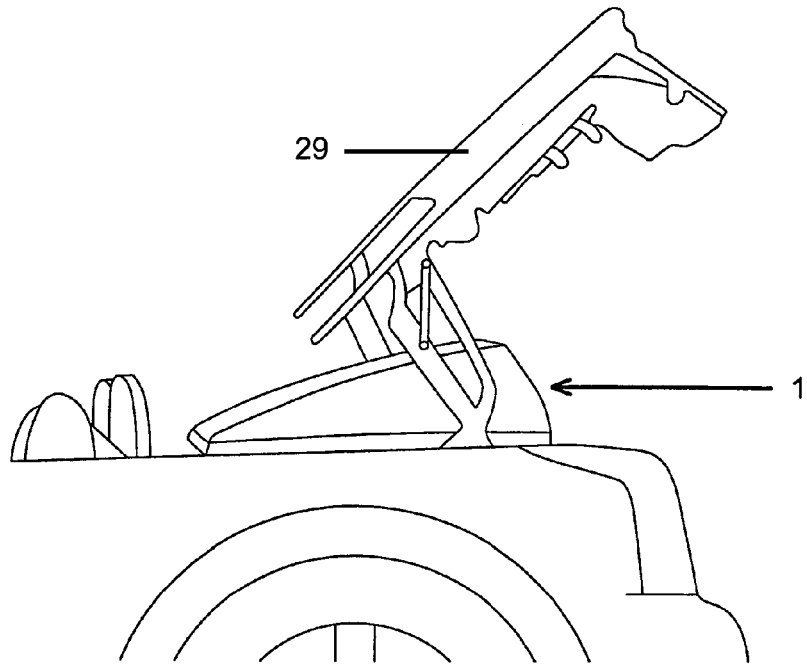
FIG. 23 The roof box from FIG. 15 in the extended and open state, wherein the roof of the convertible is retracted.

Since the roof box 1 is arranged on the folding roof 25 of the convertible or is integrated therein, comfortable loading is enabled by partially retracting the folding roof 25 when the luggage compartment cover 29 is open as depicted in FIGS. 22 and 23. FIG. 22 shows that the roof box 1 is then arranged lower and can be easily opened and loaded. After loading, the roof box 1 is closed as shown in FIG. 23. Then the folding roof 25 is moved further upward or closed. The folding roof 25 can thus be advantageously used as a lifting device for the roof box 1.

Figure 24:
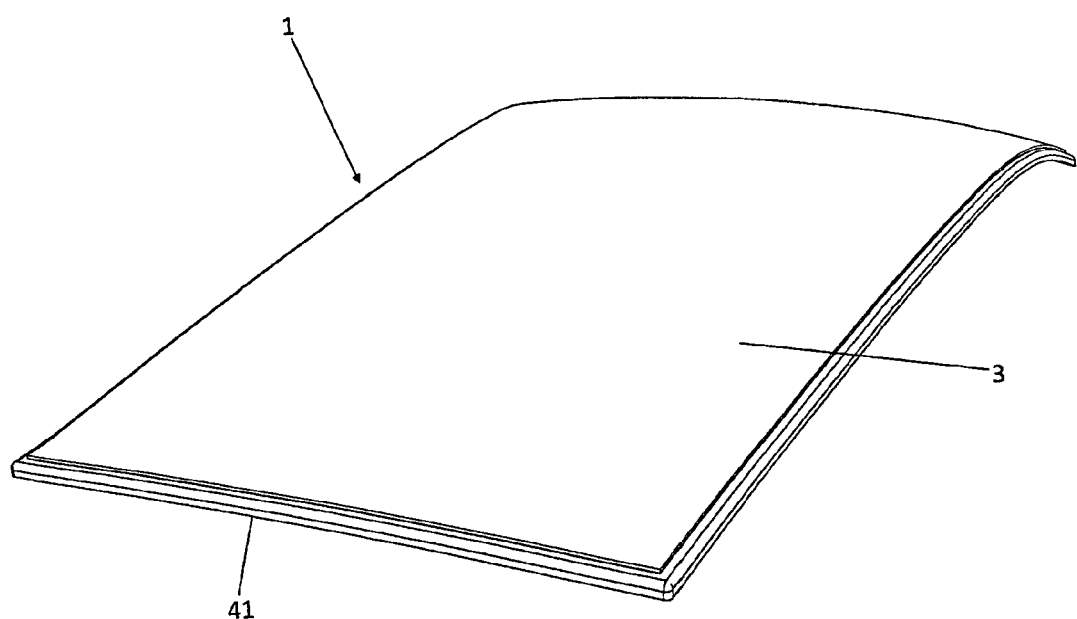
FIG. 24 A perspective view of a vehicle roof with an integrated roof box in the retracted state.

FIG. 24 shows a perspective view of a vehicle 41 of a passenger car (not shown). A roof box 1 is integratively arranged in the vehicle roof 41. The roof box 1 is in the retracted state in which no load is transported in the roof box 1. In this state, given the integrative design, the roof box 1 is substantially visually indiscernible. From the outside, only the cover element 3 of the roof box 1 is discernible and is designed as a flat panel that conforms to the shape of the vehicle roof 41. Furthermore, the cover element 3 substantially covers the entire roof surface of the vehicle roof 41.

Figure 25:
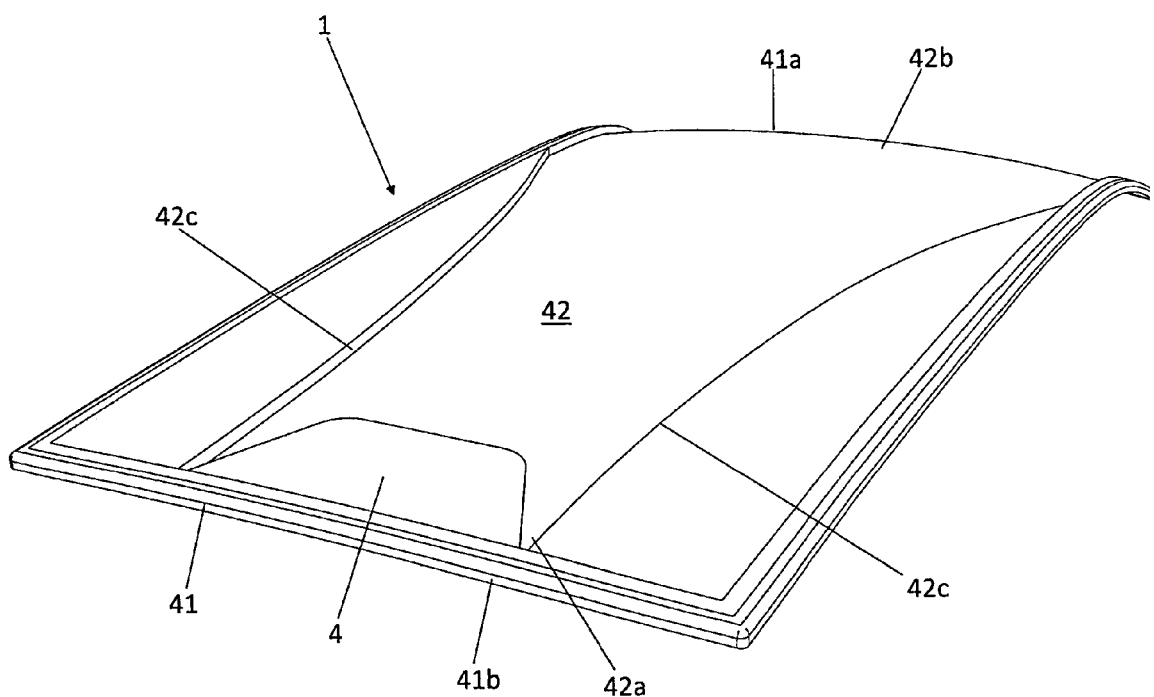
FIG. 25 The representation from FIG. 24 without a cover element.

The vehicle roof 41 from FIG. 24 is depicted in FIG. 25, and the cover element is omitted. The vehicle roof 41 simultaneously forms the floor element for the roof box 1 and has a recess 42 that when the roof box 1 is in an extended state together with the cover element 3 and a rear wall 4 defines or respectively surrounds the interior space of the roof box 1. The recess 4 possesses its widest point in the region of the front edge 41a of the vehicle 41 that is aligned toward the front of a passenger car (not shown). The narrowest point of the recess 42 is located in the region that faces the rear edge 41b of the vehicle roof 41. The rear wall 4 is arranged in the region of this narrowest point and is folded down on the recess 42 and abuts it plane in the depiction in FIG. 25. The rear wall 4 has a trapezoidal shape, and the longer of the two long sides lies flush against a rear edge 42a of the recess 42. The side edges 42c of the recess 42 run slightly oblique to the outside from the rear edge 42a of the recess 42 to the front edge 42b of the recess, wherein the side edges 42c basically do not have a straight path but rather a slightly curved path.

Figure 26:
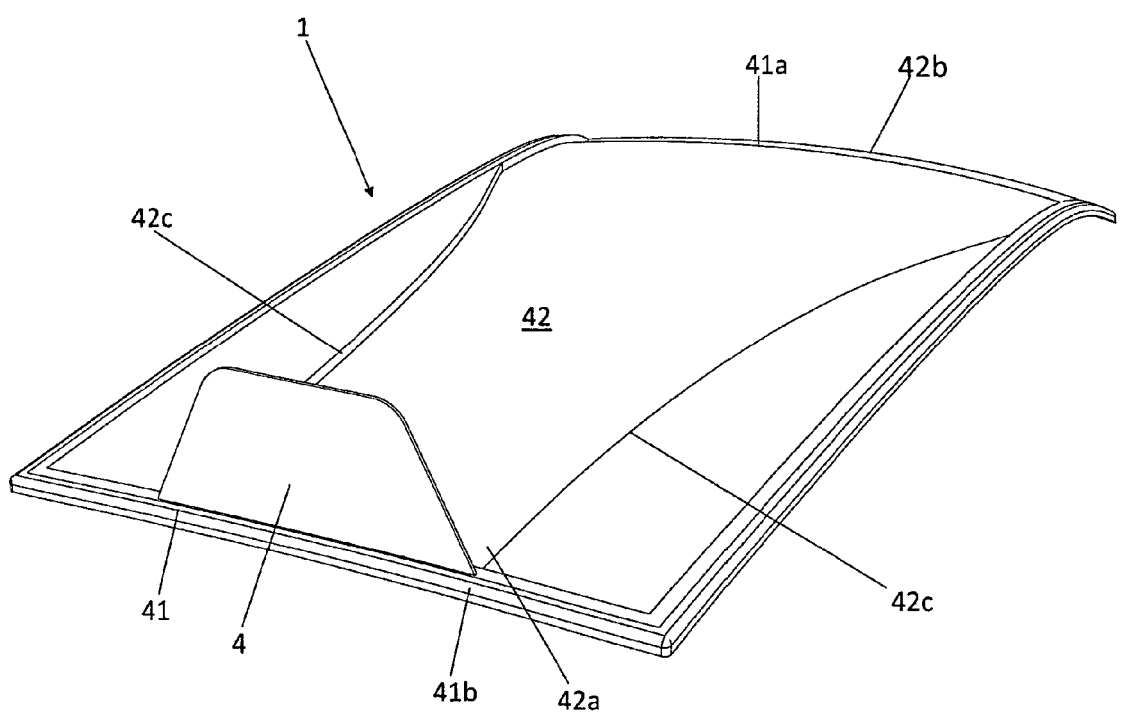
FIG. 26 The representation from FIG. 5 with a folded up rear wall.

FIG. 26 shows a depiction similar to FIG. 25, and the rear wall 4 is folded up in FIG. 26. In order to fold up, the rear wall 4 is pivoted on its bottom longitudinal side at the rear edge 42 lying against the recess 42. Corresponding hinges (not shown) are provided for this.

Figure 27:
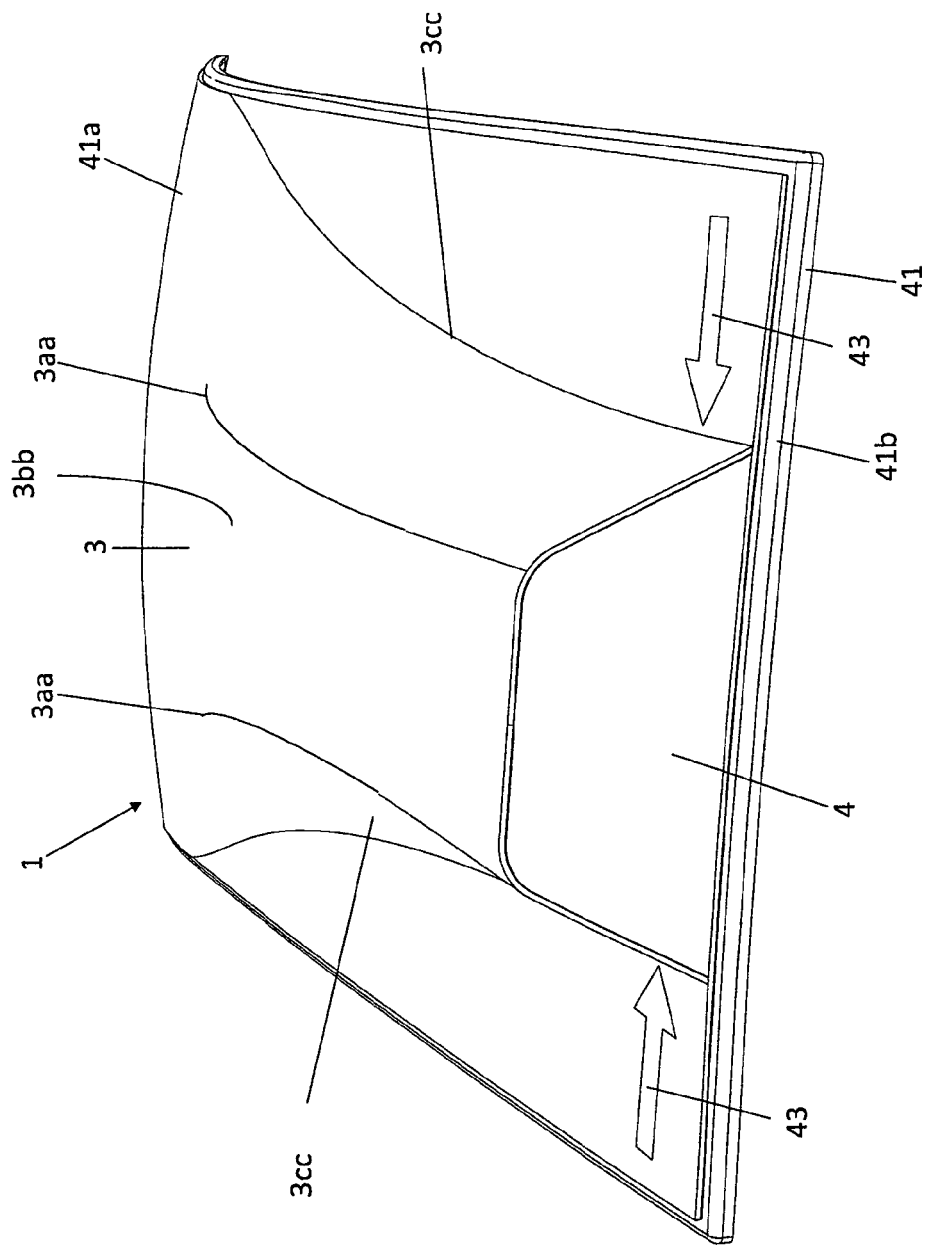
FIG. 27 A perspective view of the vehicle roof from FIGS. 24 to 26 with an integrated roof box in the extended state.

FIG. 27 shows another depiction of the roof box 1 from FIGS. 24 to 26, again with the cover element 3 and with the roof box 1 in the extended state. In contrast to the depiction from FIG. 24, the region of the cover element 3 facing the rear edge 41 of the vehicle roof 41 is displaced inward in the direction indicated by the arrow 43. This curves the cover element 3 upward so that a chamber arises between the vehicle roof 41 functioning as a floor element and the cover element 3, the chamber being usable as a storage space for transporting objects. The opening to the chamber which is thereby created is covered by the rear wall 4 which is folded up to create a closed storage space. The material of the cover element 3 is designed to change its shape in a predetermined manner when correspondingly activated. When activated, the cover element 3 is thereby pushed together to generate an extended state of the roof box. In particular, the deformation occurs along two (designated) bending lines 3aa running in the longitudinal direction of the vehicle roof 41 so that, when in an extended state, a top section 3bb of the cover element 3 forming the top side of the storage space results along with two side sections 3cc. The region of the cover element 3 facing the front edge 41a of the vehicle roof 41 remains undeformed so that a relatively aerodynamic shape of the roof or the roof box 1 results even in the extended state in the direction of travel of the passenger car.

Figure 28:
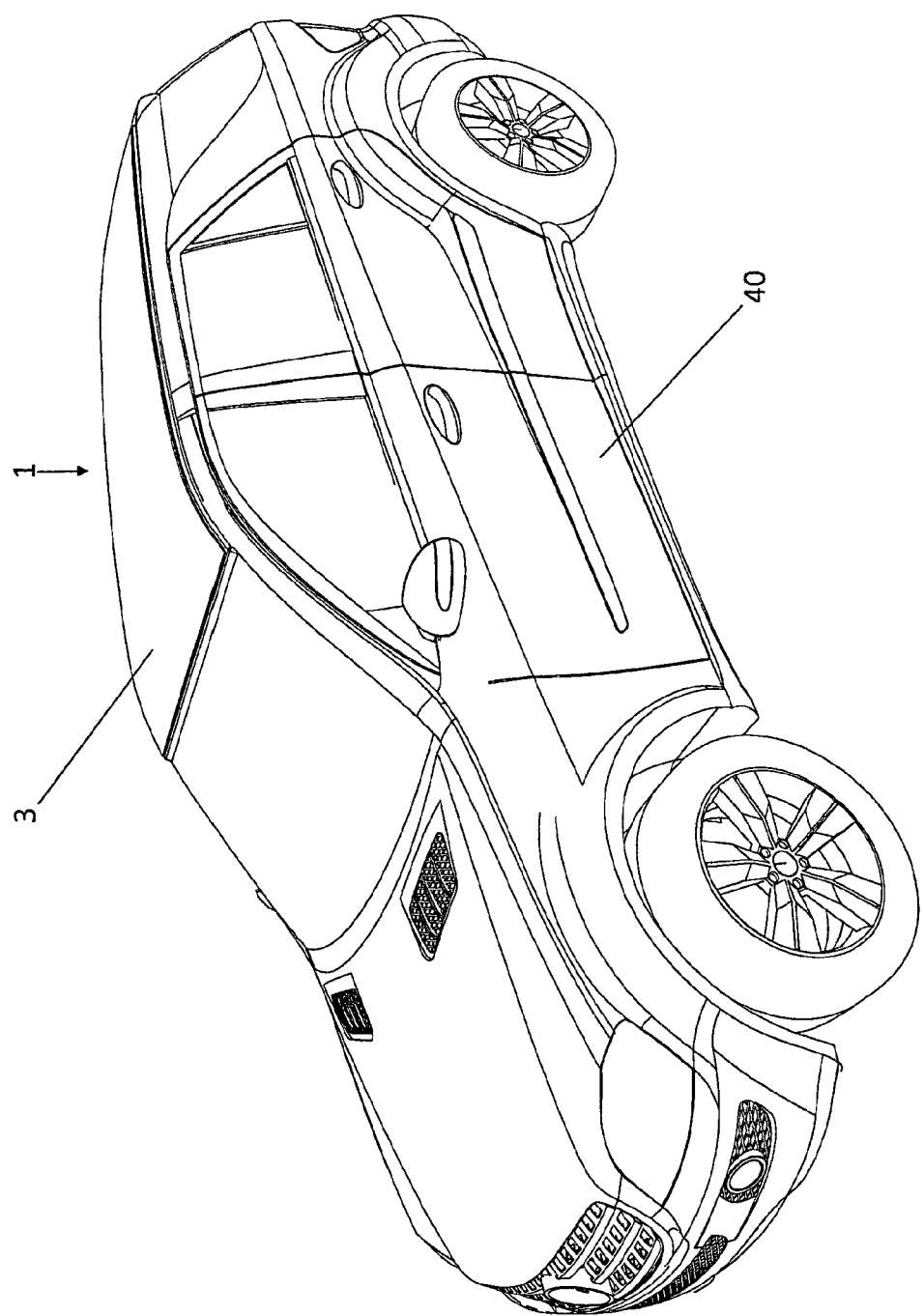
FIG. 28 A perspective side view of passenger vehicle with the integrated roof box in a retracted state.
Figure 29:
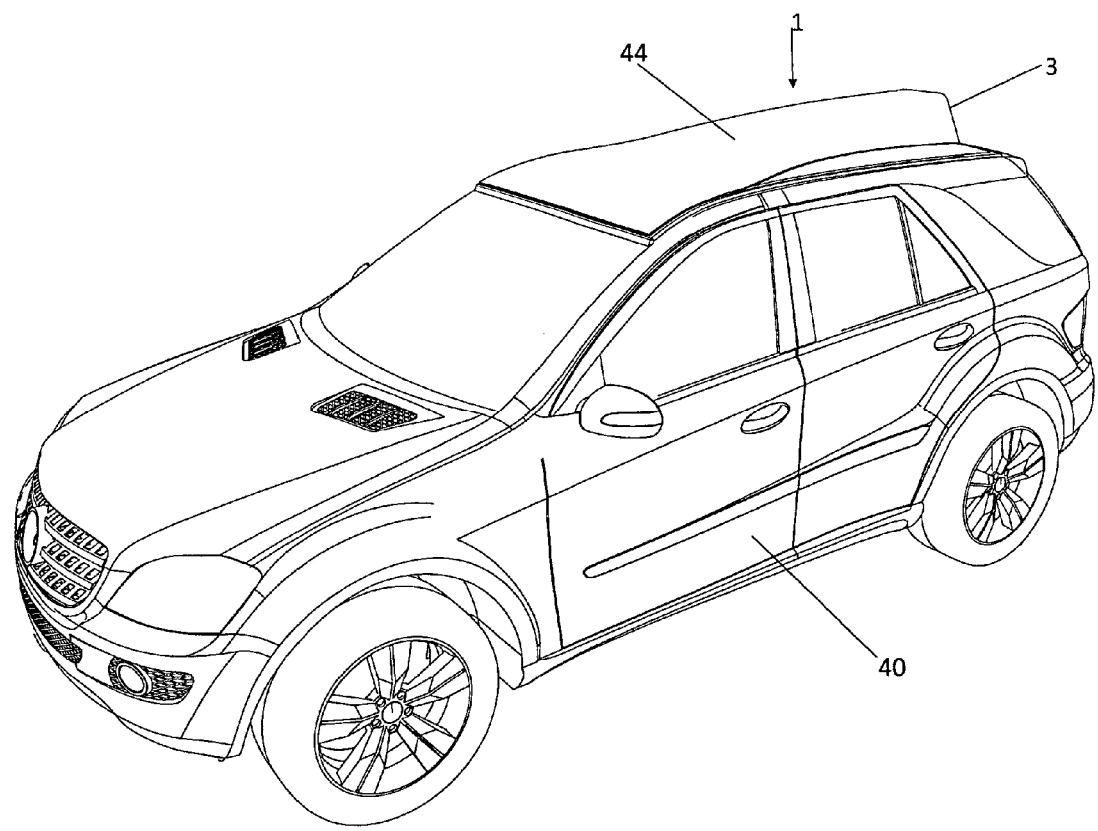
FIG. 29 The representation from FIG. 28 with a roof box in the extended state.
Figure 30:
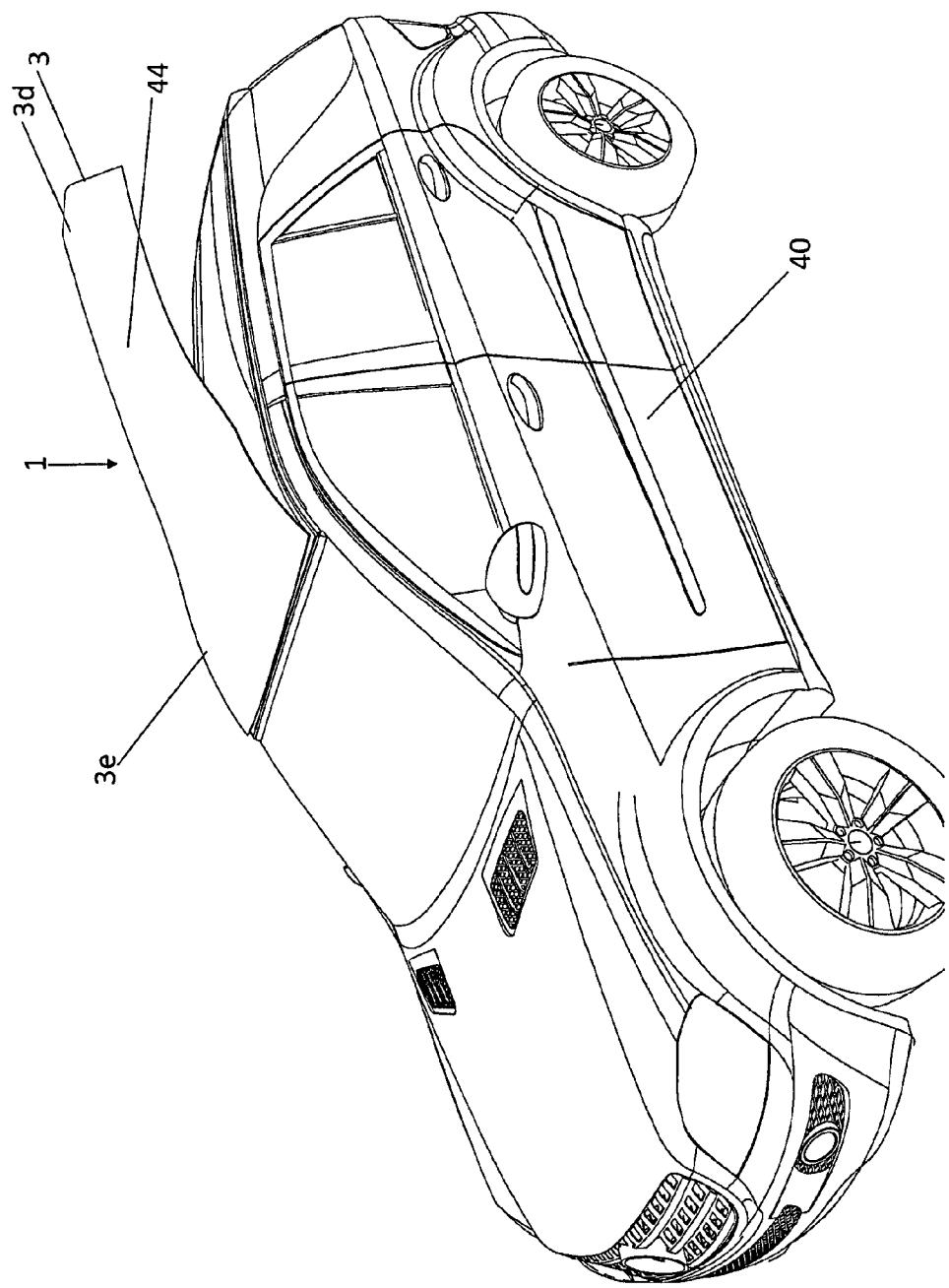
FIG. 30 The representation from FIGS. 28 and 29 with the roof box in the extended and unfolded state.

FIGS. 28 to 30 each show a perspective side view of a motor vehicle 40 with a roof box 1 integrated therein. The roof box 1 is designed similar to FIGS. 24 to 27. In FIG. 28, the roof box 1 is shown in the retracted state, whereas the extended state is depicted in FIG. 29. In FIG. 30, the roof box 1 is in the extended state, i.e., the cover element 3 bends down along bending line 3aa, and the rear region 3d of the cover element 3 is also folded up relative to the vehicle roof. The front region 3e of the cover element 3 still lies on the vehicle roof 41 and is securely connected thereto. The partial folding up of the cover element 3 can also be realized by deformation of the cover element 3 triggered by activation means. Alternately, the deformed cover element 3 can also be pivoted on one or more pivoting means arranged on the front edge of the cover element. The roof box 1 can be loaded in the folded up state. Alternately, the rear wall 4 can also be folded down in the extended state, wherein the roof box 1 can be loaded or unloaded through the opening in the rear side. It is then unnecessary to fold up the cover element 3. In the extended state, the cover element 3 bends into a predetermined shape such that in its outer regions it terminates flush with the side edges 42c of the recess 42.

The cover element is designed in principle so that, when activated, e.g. when power is applied to the cover element 3 through power lines (not shown) running in the roof box 1, it bends, namely into a predetermined shape. When reactivated, it bends back into its initial position. A roof box which can be folded and unfolded can thereby be achieved without articulations, hinges or the like. The roof box, and/or the cover element, and/or the floor element can preferably be designed from a transparent material.

Figure 31:
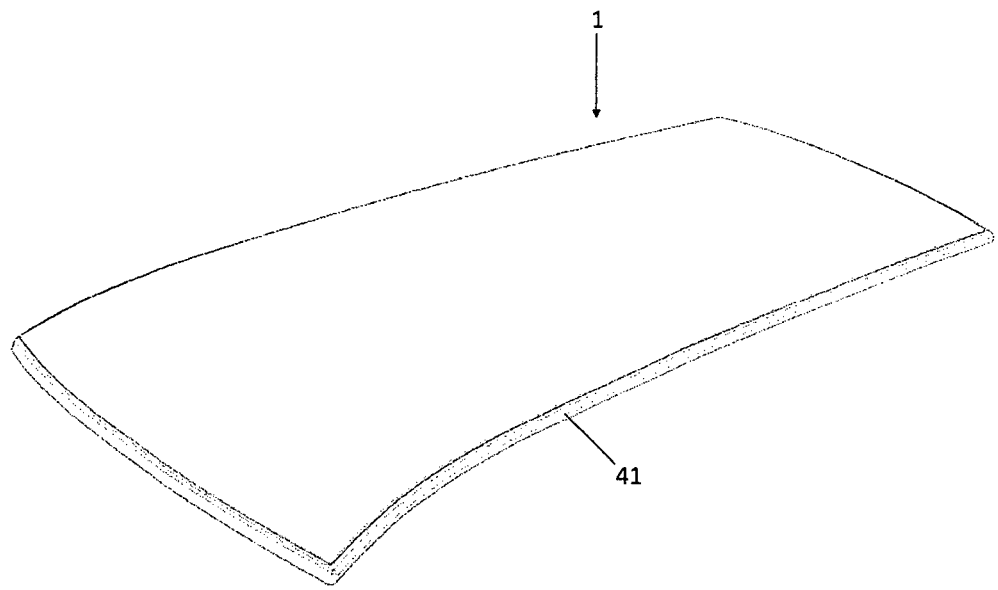
FIG. 31 A perspective view of a vehicle roof with an additional embodiment of an integrated roof box in the retracted state.

FIGS. 31 to 36 show another embodiment of a roof box 1 according to the invention. FIG. 31 shows a perspective view of a vehicle 41 of a passenger car (not shown). A roof box 1 is integratively arranged in the vehicle roof 41. The roof box 1 is in the refracted state in which no load is transported in the roof box 1. In this state, given the integrative design, the roof box 1 is substantially visually indiscernible. From the outside, only the cover element 3 of the roof box 1 is discernible and conforms to the shape and dimensions of the vehicle roof 41. Furthermore, the cover element 3 substantially covers the entire roof surface of the vehicle roof 41 and lies flat on the vehicle roof 41. The cover element 3 comprises a fabric consisting of a suitable stretch material that is elastically deformable. Preferably another layer consisting of a more robust yet foldable material, especially a plastic film or the like, can be provided under the layer of stretch fabric visible to the outside.

Figure 34:
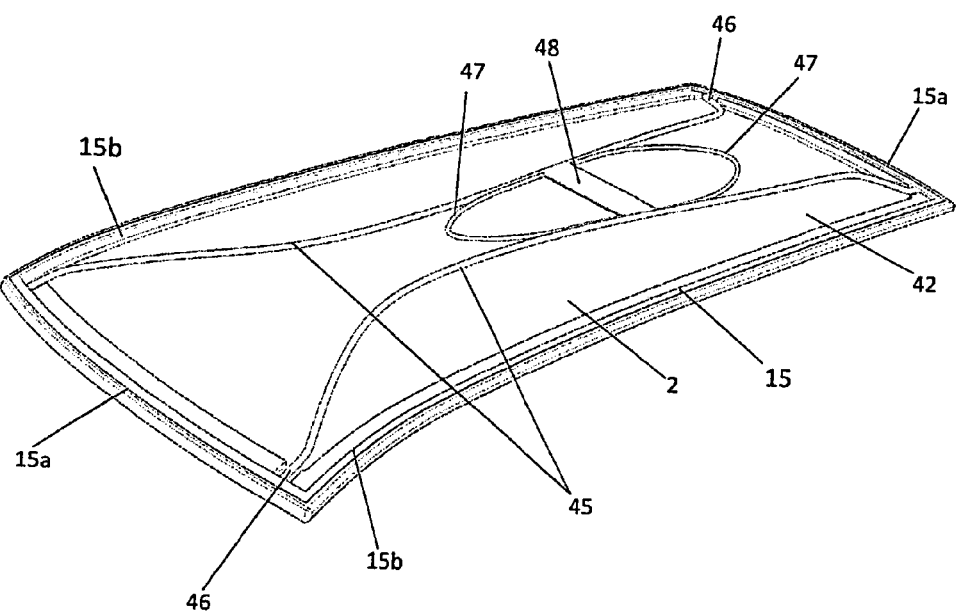
FIG. 34 The view from FIG. 31 without a cover element.

FIG. 34 shows the roof box 1 in a retracted state without the cover element. The floor element 2 is formed by the roof surface which in turn has a recess 42. The roof box furthermore has a frame 15. Between the shorter cross bars 15a of the frame 15b run two spaced swivel bows 45 that are arrange substantially parallel to each other, and each of their two ends are connected by means of a swivel bow articulation 46 to the cross bars 50a. The swivel bows therefore run generally parallel to the longitudinal bars 15a of the frame 15. Both swivel bows 45 lie flat on the floor element 2 and are swung inward viewed from the perspective of their swivel bow articulations 46. Between the two swivel bows 45, there are two elastic bows 47 that are pretensioned in the state shown in FIG. 34. Between the two elastic bows, a stretchable retaining strap 48 is provided which is relaxed in the state shown in FIG. 34.

Figure 32:
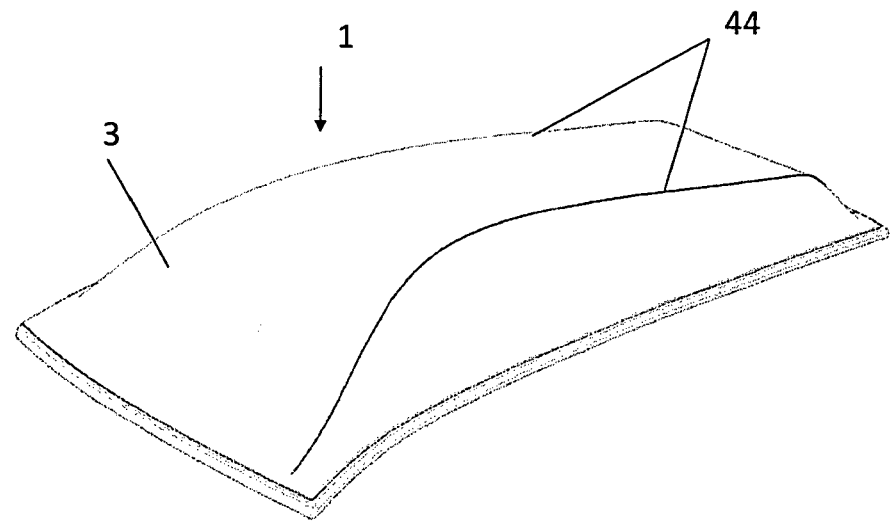
FIG. 32 The roof box from FIG. 31 in the extended and closed state.
Figure 35:
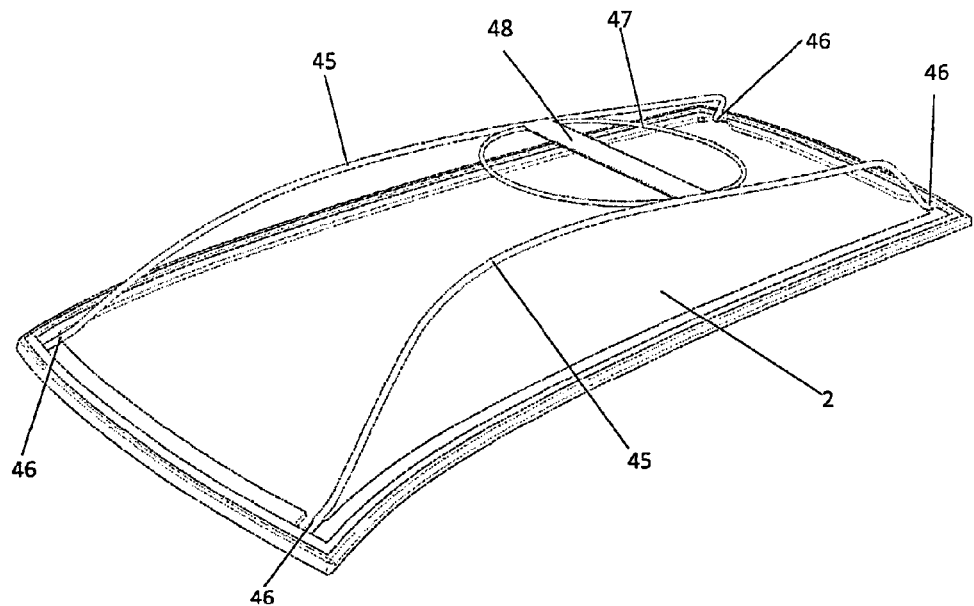
FIG. 35 The view from FIG. 32 without a cover element.

In FIG. 35, the swivel bows 45 are swung or rotated upward, in particular by an angle of 45° to 90°, relative to the position in FIG. 34. The elastic bows 47 are relaxed, and the retaining strap 48 is in a stretched state. The swinging of the swivel bows 45 is achieved by the pretension of the elastic bows 47. FIG. 32 shows the same situation as in FIG. 35, although FIG. 32 depicts a cover element 3 so that the swivel bows are not discernible. The roof box 1 is in an extended state. The material of the cover element 3 is in a stretched state, and the cover element is erected in contrast to the retracted state (FIG. 31) and has a curved surface, the strongest curves arising along the bending lines 44 that correspond with the erected swivel bows 45. The extended roof box 1 (FIGS. 32 and 35) is closed.

Figure 33:
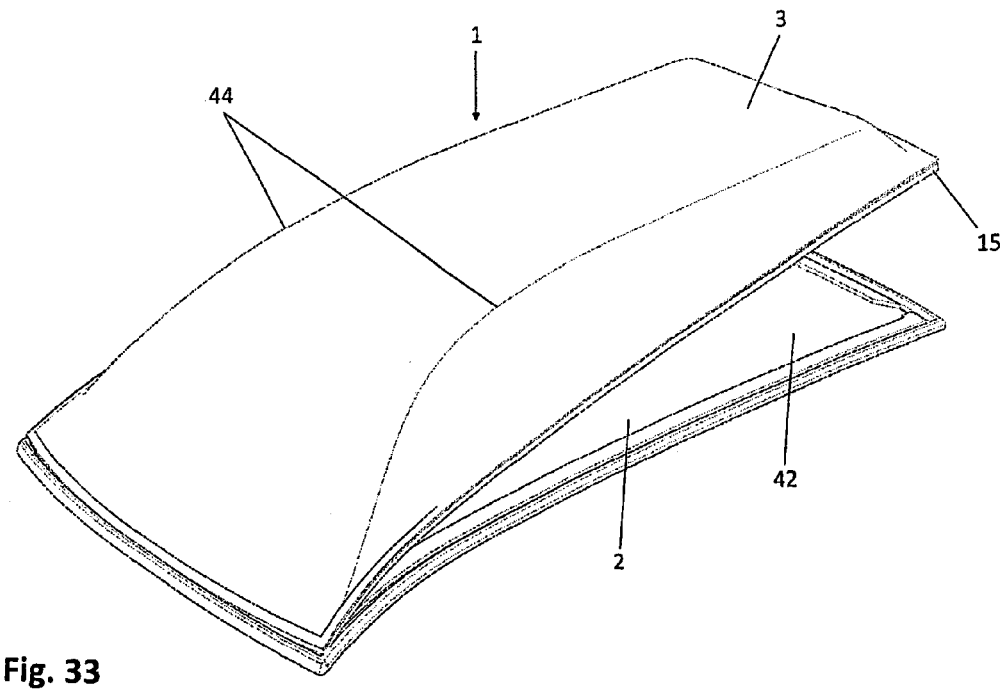
FIG. 33 The roof box from FIG. 31 in the extended and open state.
Figure 36:
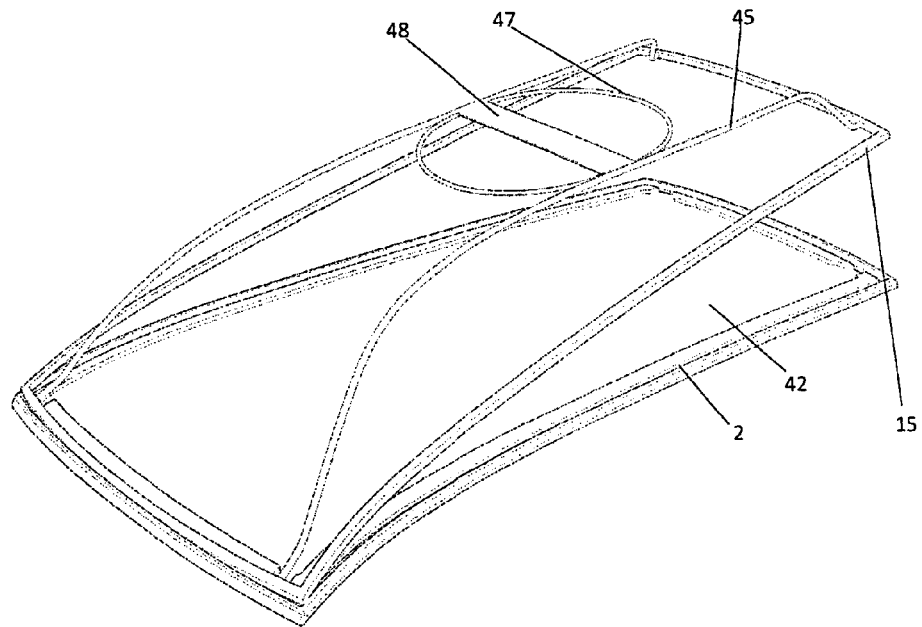
FIG. 36 The view from FIG. 33 without a cover element.

FIGS. 33 and 36 show the roof box 1 in an extended and opened state. The opening occurs on articulations (not shown) arranged between the front cross bar 15a and floor element 2 so that the roof box 1 can in particular be loaded from the rear in an open state. The entire frame 15 pivots together with the cover element 3 arranged thereupon on the articulations arranged on the front cross bar 15a.

Figure 37:
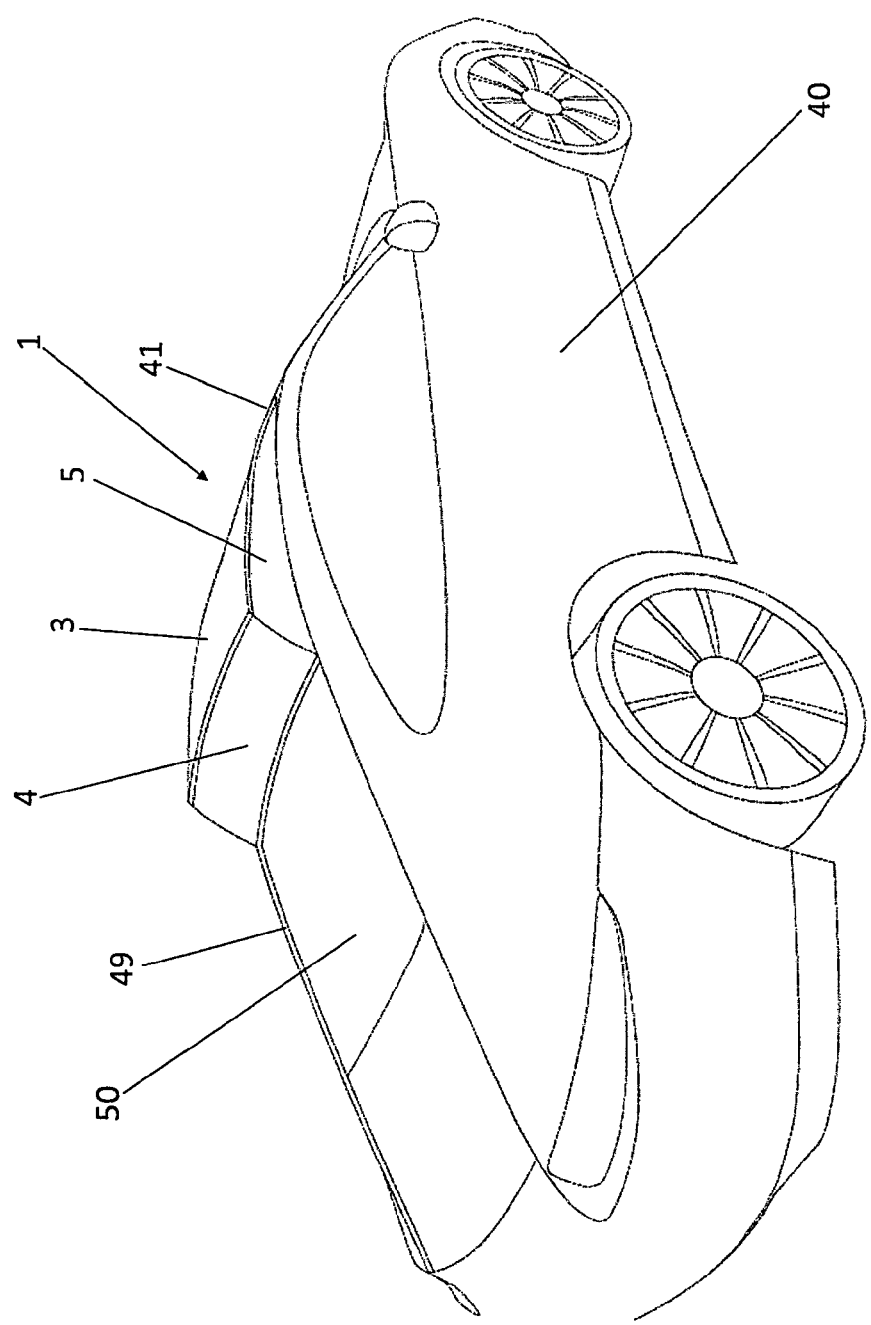
FIG. 37 Another embodiment of a roof box installed on a coupe in the extended state and in a driving position.

FIG. 37 shows a motor vehicle 40 designed as a convertible with a motor vehicle roof 41 that, in this case, includes the hatchback of the motor vehicle 40. On the roof 41 of the motor vehicle 40, a roof box 1 is arranged that can be moved between a driving position (on the top region of the roof) and a loading position (on the bottom region of the roof, in particular on the bottom region of the hatchback). In the depiction in FIG. 37, the roof box 1 is in the extended state and driving position. In particular, the roof box 1 has two side walls 5, one rear wall 4, and one cover element 3. In its contour from a top section to a bottom and rear section, the motor vehicle roof 41 has a guide that comprises rails 49 which are arranged opposite each other and are aligned substantially parallel to each other. These rails 49 are embedded in the longitudinal sides of the edges of a roof recess 50 which extends over the entire hatchback of the motor vehicle 40. Profiles (not shown) are provided in the rails 49 and engage in profile counterparts (not shown) of the roof box 1 in order to be able to move along the rail 49.

Figure 38:
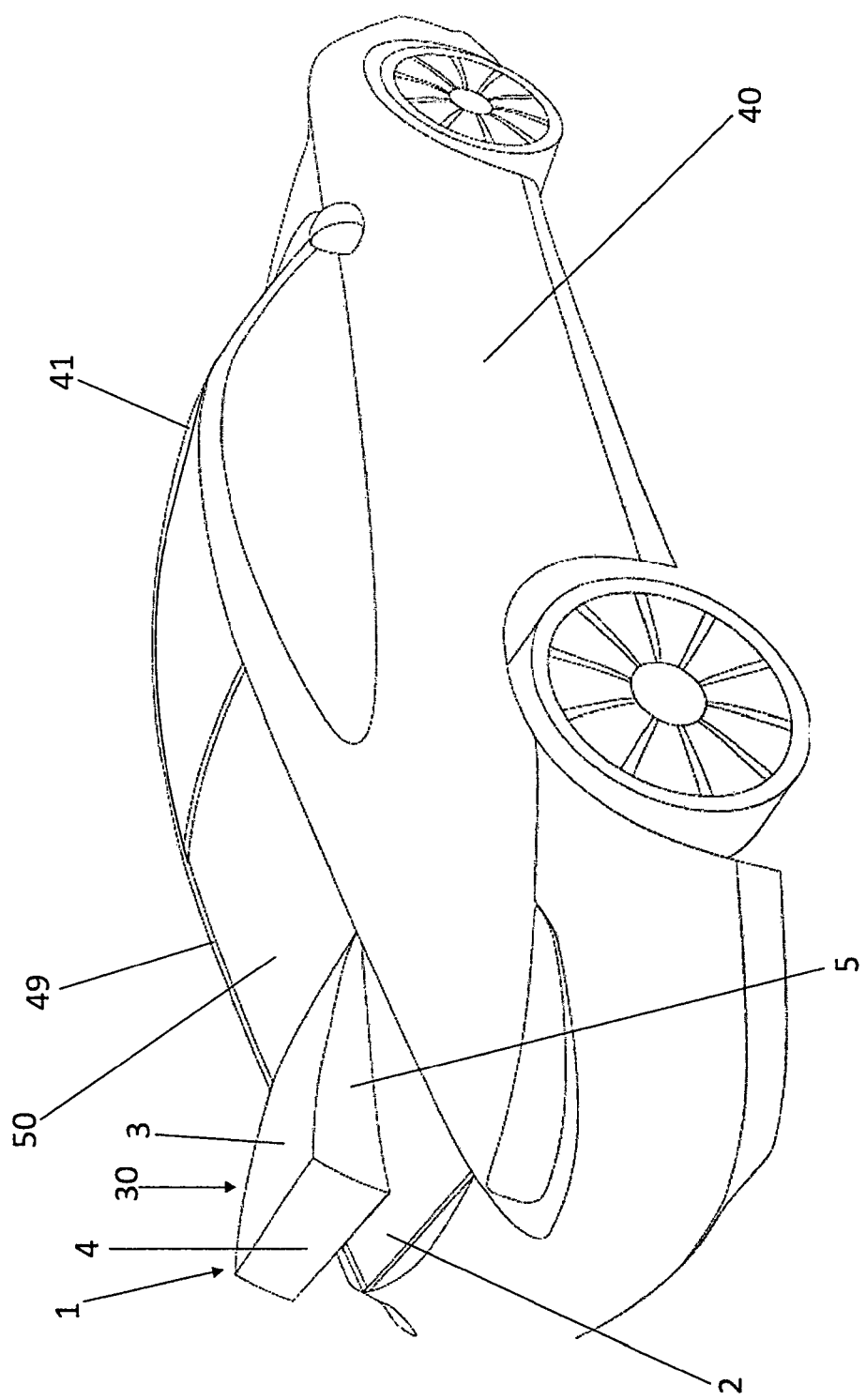
FIG. 38 The view from FIG. 37 with the roof box in the open state and in a loading position.

In comparison to the depiction from FIG. 37, the roof box 1 in FIG. 38 has been moved into the loading state i.e., downward along the rails 49. It can also be seen that, in addition to the cover element 3, the rear wall 4 and the side walls 5, the roof box 1 has a floor element 2 with which it lies on the roof 41 of the vehicle 40. Together, the side walls 5, the rear wall 4 and the cover element 3 form a top part 30 of the roof box 1 that is open in the state shown in FIG. 38. That is, the top part 30 is pivoted upward on a front pivot joint (not shown) relative to the floor element 2 so that the interior space of the roof box 1 is exposed, and can be comfortably loaded in the loading position by a user. The roof box depicted in FIGS. 37 and 38 can be folded together into a retracted state as in the above-described exemplary embodiments.

Figure 39:
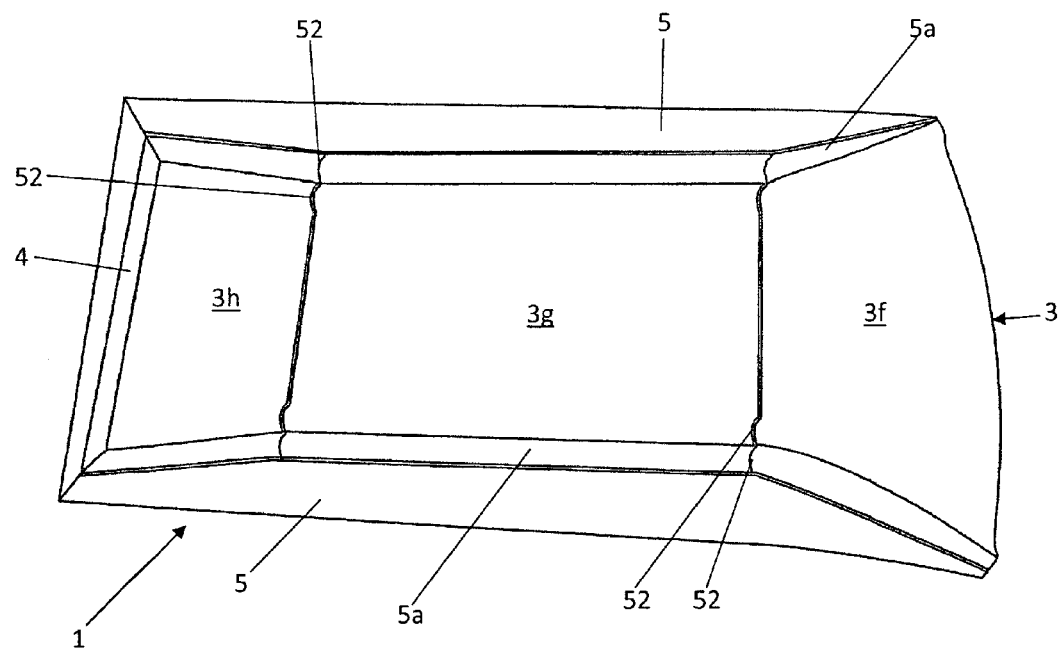
FIG. 39 Another embodiment of a roof box.

FIG. 39 shows a plan view of an additional embodiment of a roof box 1 in an extended state. The roof box 1 comprises a cover element 3 that consists of three cover segments 3f, 3g, 3h which are sequentially arranged in the longitudinal direction of the roof box 1. The roof box 1 furthermore has two side walls 5 which each are designed as one piece or consist of a single segment. On their side facing the cover element 3, the side walls 5 have a flange 5a that overlaps the individual segments 3f, 3g, 3h of the cover element 3 up to a certain depth. A rear wall 4 is also provided.

Figure 40:
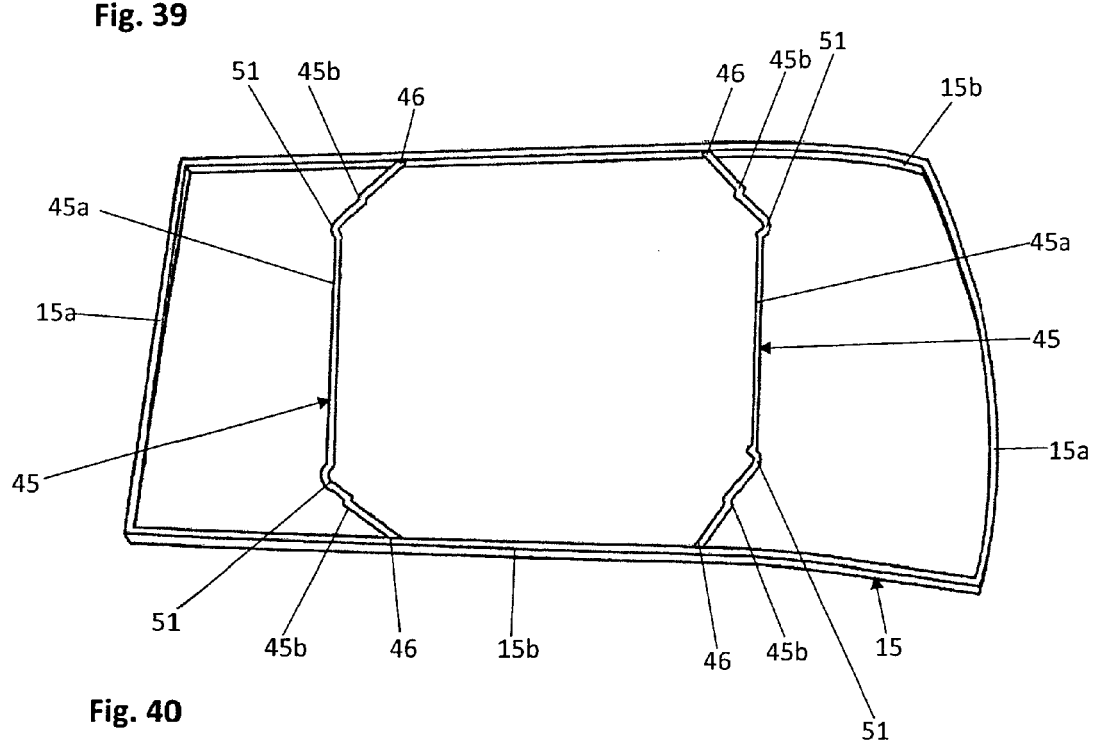
FIG. 40 A frame of the roof box from FIG. 42 with a rod assembly.

FIG. 40 shows a frame 15 of the roof box 1 from FIG. 39 on which the rear wall 4, cover element 3 and the side walls 5 lie or which they border (not shown). Arranged between the two longitudinal bars 15b of the frame 15 are two swivel bows 45 aligned substantially parallel to each other that have a swivel bow articulation 46 on each of their free ends by means of which they are pivotably arranged on the frame 15, or the longitudinal bars 15b of the frame 15. In the state shown in FIG. 40, the swivel bows 45 are swung to the side and lie on the vehicle roof with the floor element of the roof box (not shown). The roof box 1 is in a retracted state. When the swivel bows 45 are swung so that they stand erect, the roof box 1 is brought into the extended state. The swivel bows 45 have a middle bar 45a that is aligned substantially parallel to the cross bars 15a of the frame 15. Bordering each side of the middle bar 45a is an outer bar 45b that runs at an angle in comparison to the middle bar 45a, and the outer bars each terminate in a swivel bow articulation 46. Latching elements formed as upwardly projecting beads 51 are provided at the connecting sites between the middle bar 45a and the outer bar 45b. Accordingly, each swivel bow 45 has two such beads 51. These beads 51 can engage in corresponding mating recesses 52 in the cover element 3, or in the flanges 5a of the side walls 5 (when the roof box 1 is in the extended state) in order to effect a latching. A stable state 1 of the extended state of the roof box is thereby achieved.

Figure 41:
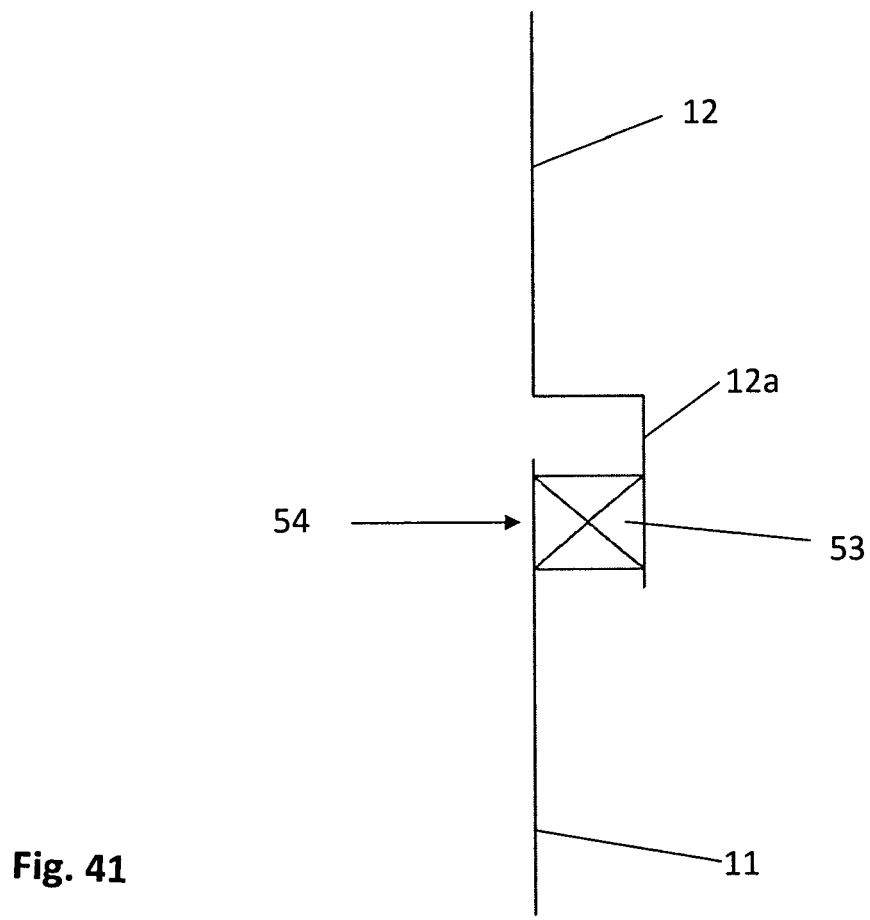
FIG. 41 Detailed view of an overlapping region of two wall segments with a sealing element.

FIG. 41 shows a detailed cross-sectional view of a region in which two side wall segments 11, 12 border each other. The side wall segments 11, 12 are in an extended state. A beveled region 12a projecting inward and downward is provided at the bottom end of the upper side wall segment 12. The bottom side wall segment 11 is parallel in regions to this beveled region 12a so that an overlapping region 54 is formed in this region. In the overlapping region 54, a seal 53 is provided that on the one hand lies against the inside of the bottom side wall segment 11 and, on the other hand, lies against the outside of the beveled region 12a and seals the overlapping region 54.

Figure 42:
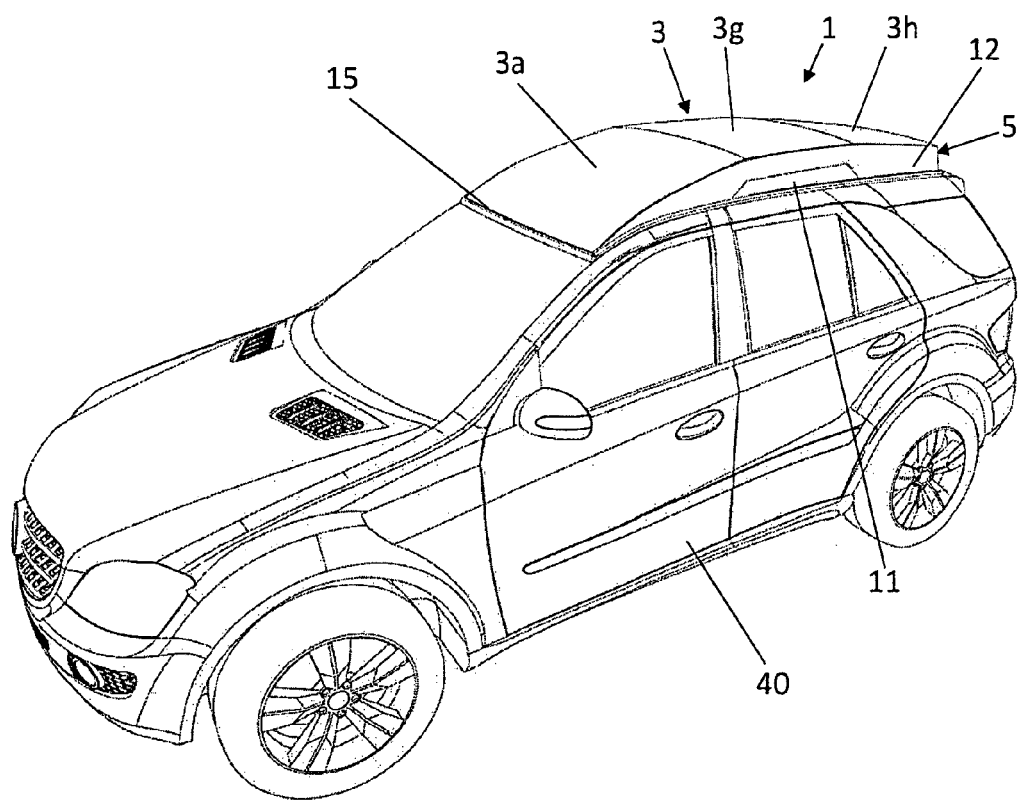
FIG. 42 Perspective view of a motor vehicle with an extended roof box.
Figure 43:
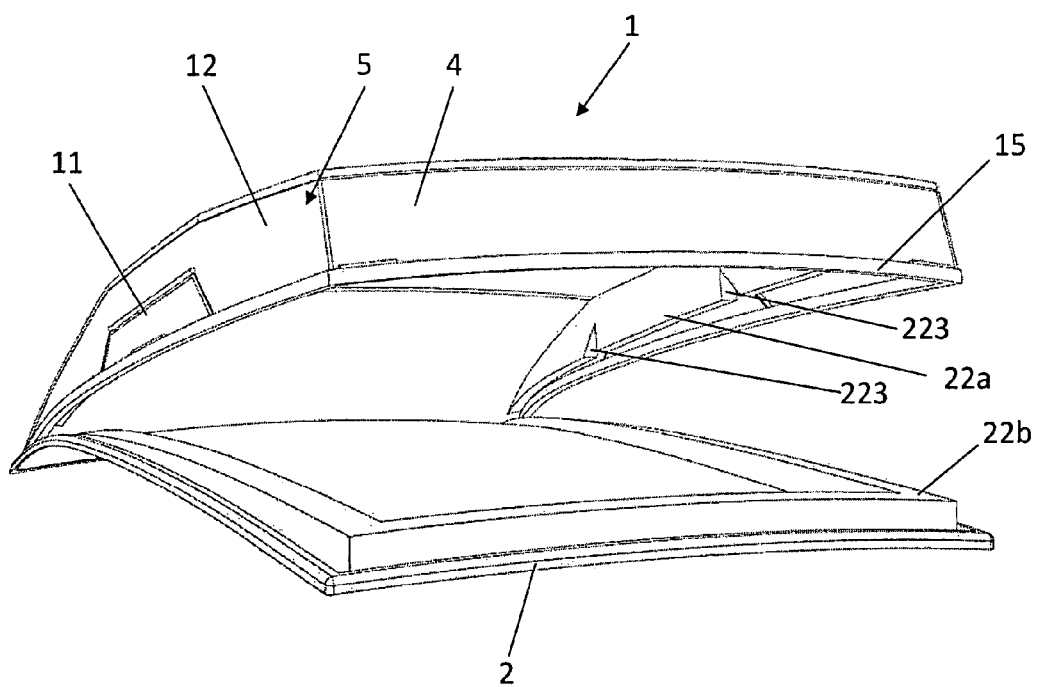
FIG. 43 Perspective view of the roof box from FIG. 42 in the open state.
Figure 44:
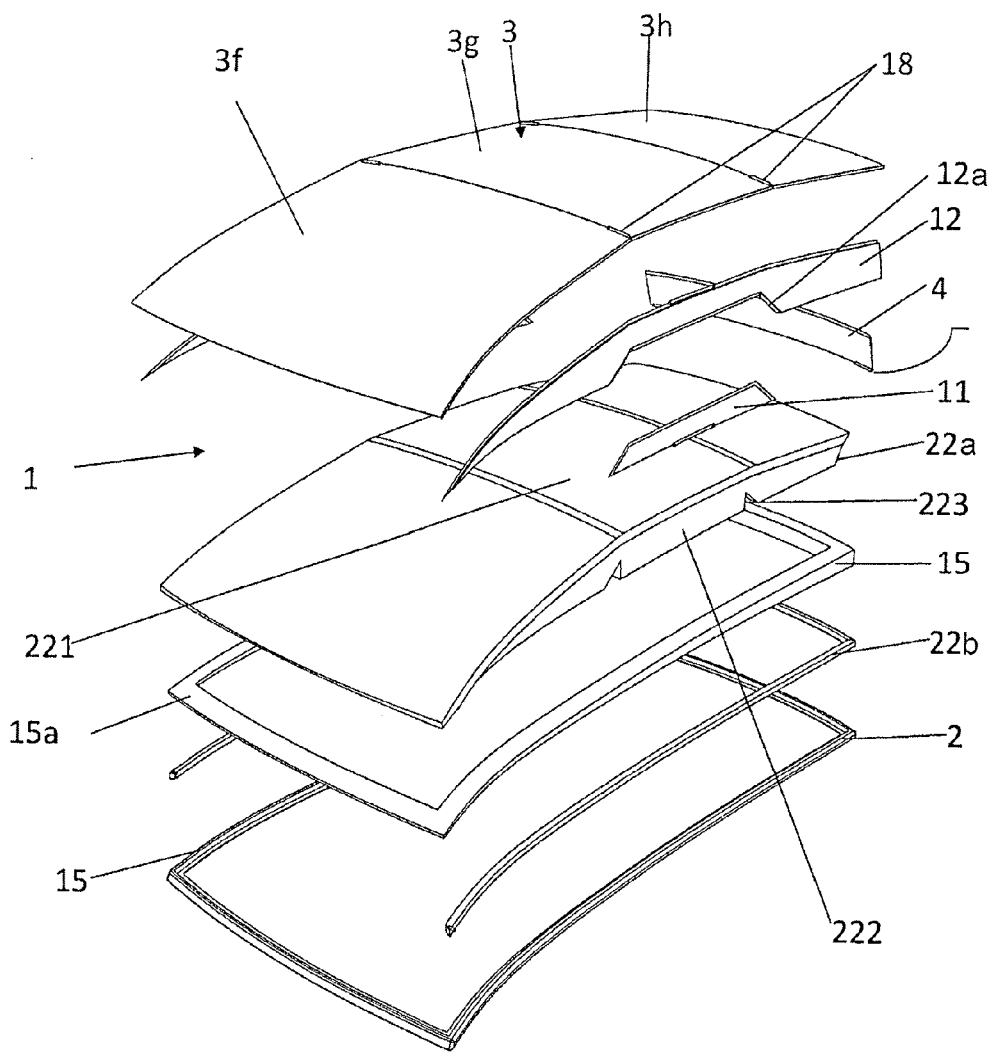
FIG. 44 Exploded view of the roof box from FIGS. 42 and 43.

FIG. 42 shows a perspective view of a motor vehicle 40 designed as an SUV. Arranged on the roof of the motor vehicle 40 is a roof box 1 that is in the extended state. The construction of the roof box 1 and the principle of folding and unfolding the roof box 1 substantially corresponds to the embodiment of a roof box depicted in FIGS. 1 to 7. FIG. 43 shows the roof box 1 from FIG. 42 without the motor vehicle and in an extended and open state, whereas the roof box 1 in the depiction in FIG. 42 is closed. FIG. 44 shows the same roof box 1 in an exploded view. The roof box 1 has a cover element 3 that consists of three cover segments 3f, 3g, 3h sequentially arranged in the longitudinal direction and pivotably connected to each other by means of cover segment hinges 18. The two side walls 5 each comprise a top side wall segment 12 that runs the entire length of the side wall, and a bottom side wall segment 11 that is designed in the shape of a trapezoid and is only arranged in a middle region of the side wall 5. Furthermore, the bottom side wall segment 11 only extends over approximately one-half and not the entire height of the side wall 5. Furthermore, the roof box 1 additionally comprises a rear wall 4, a floor element 2 and a frame 15 to which the rear wall 4 is pivotably fastened by means of rear wall hinges 9 so that the rear wall 4 swings downward toward the floor element 2 when folding. In the extended state, the segments 11, 12 of the side walls 5 also abut the frame 15. The frame 15 can be swung upward and above the floor element 2 by means of hinges or other pivoting means arranged on the front edge of the roof box 1 so that the front cross bar 15a of the frame 15 always remains in contact with the floor element 2 even when the roof box 1 is in the open state. In the open state, the roof box 1 is correspondingly usefully loaded from the rear. Furthermore, the roof box 1 comprises a top air cushion 22a and a bottom air cushion 22b. The bottom air cushion 22b is designed in a U-shape and has two long U-legs that each run along and lie against the longitudinal edges of the floor element 2, and has one shorter transverse leg that runs along the rear edge of the floor element 2. In the inflated state, the air cushion 22b is arranged slightly offset to the inside relative to the outer edges of the floor element 2 (see FIG. 43). The top air cushion 22a has a top side 221 that, when in the inflated state, basically lies flush against the inside of the cover element 3 and covers substantially the entire inner surface of the cover element 3. At the outer edges of the longitudinal sides of the roof box 1 and to the rear of the roof box 1, an edge 222 projects downward from the top side 221 of the air cushion 22a. Two notches 223 that are open at the bottom are provided in each of the longitudinal sides of this edge 222. The notches 223 are located where the beveled regions 12a of the top side wall segment 12 are located which lie in the border region between the top side wall segment 12 and the bottom side wall segment 11. These beveled regions 12a overlap a section of the bottom side wall segment 11 when the roof box 1 is in an extended state to ensure protection at this location against the penetration of undesirable particles, gases, liquids, etc. into the interior of the roof box 1. These beveled regions 12a running inward abut the region of the notch 223 so that they cannot damage the top air cushion 22a.

Figure 45:
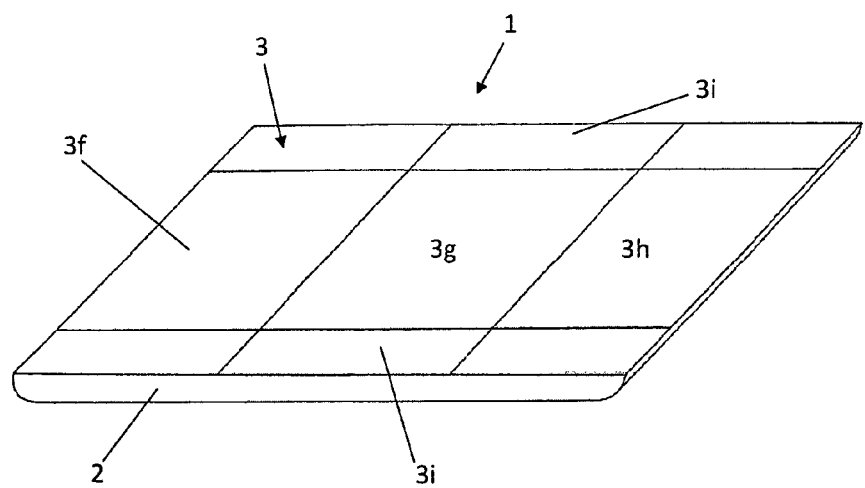
FIG. 45 An embodiment of a roof box for motor vehicles with a sunroof in the retracted state.

An additional embodiment of a roof box 1, or individual components of this roof box 1, is depicted in FIGS. 45 to 48 and is designed for a motor vehicle with a sunroof or with other openings in the motor vehicle roof through which sunlight and/or fresh air can enter into the interior of the vehicle. FIG. 49 depicts the roof of such a vehicle for which the roof box 1 is designed. FIG. 45 shows the roof box 1 in the folded or retracted state. The cover element 3 comprises three middle, sequentially arranged cover segments 3f, 3g, 3h, as well as cover segment side parts 3i that are arranged on each side of these middle cover segments 3f, 3g, 3h and extend across the entire length of the roof box 1. Furthermore, the floor element 2 can be discerned in FIG. 45.

Figure 46:
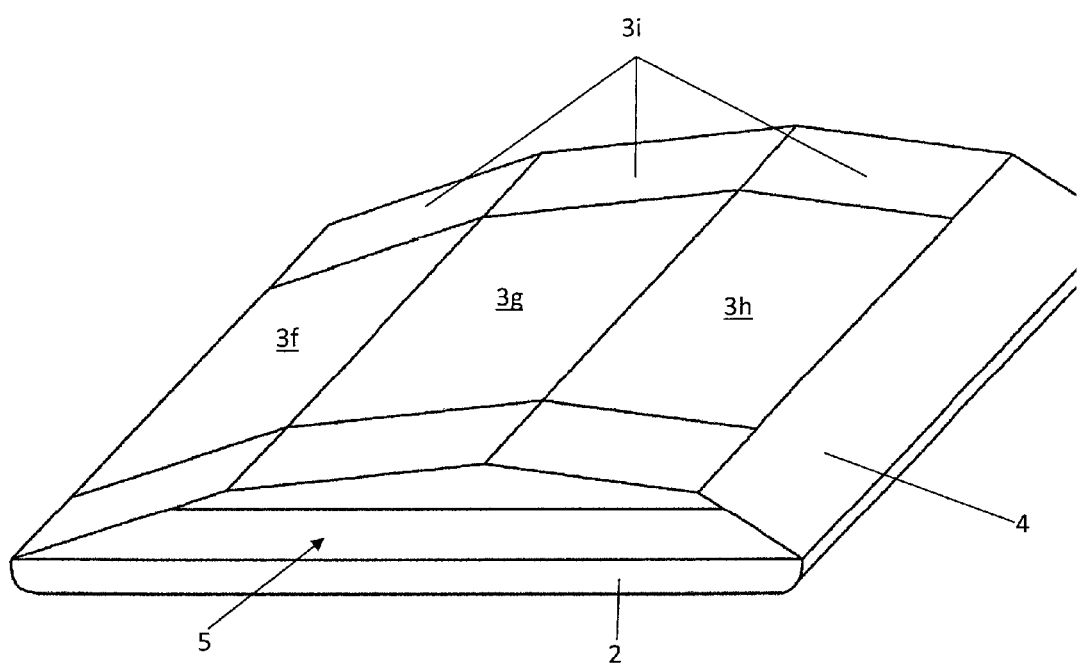
FIG. 46 The roof box from FIG. 45 in the extended state.

FIG. 46 shows the roof box from FIG. 45 in the extended state, the rear wall 4 and the side walls 5 being additionally discernible, wherein the side walls 5 have two side wall segments which can be folded on each other.

Figure 47:
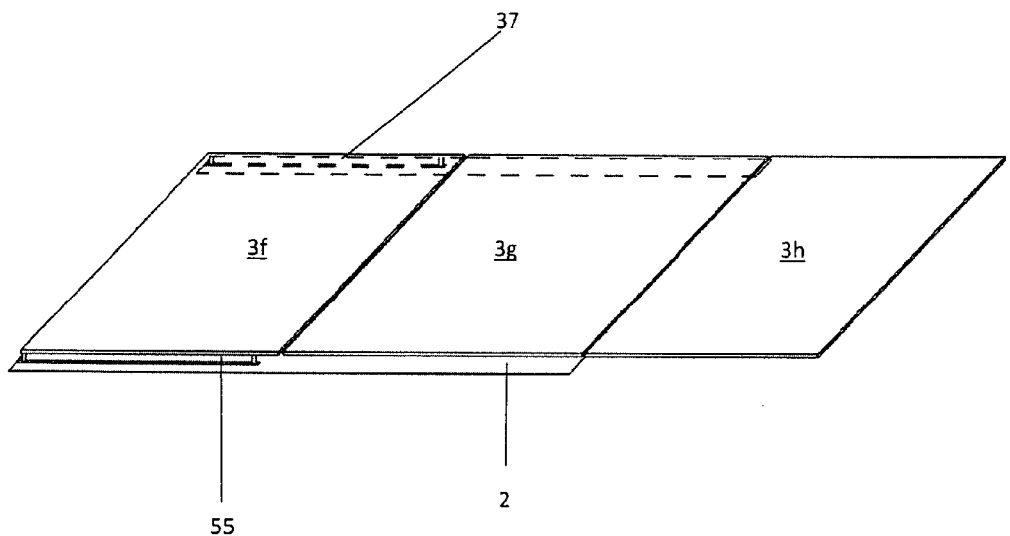
FIG. 47 The middle cover segments of the roof box from FIG. 45.

FIG. 47 shows the middle cover segments 3f, 3g, 3h isolated without the laterally adjacent cover element side parts 3i. The floor element 2 is only depicted by way of suggestion. The front and middle cover segment 3f, 3g are made of a transparent material, especially glass. The rear cover segment 3h can in contrast be fabricated from a non-transparent material such as sheet metal or the like. If a user of a motor vehicle with a sunroof or another opening in the vehicle roof wishes to let fresh air through the roof into the motor vehicle interior, he can move the middle cover segments 3f, 3g to the rear when the roof box is in the retracted state. To this end, a skid 55 is located below the cover segment 3f by means of which the cover segment 3f can be moved on the floor element 2. The middle cover segment 3g can also have such a skid 55 (not shown). Depending on the embodiment, the front cover segment 3f can be shifted to the rear over or under the middle cover segment 3g, wherein the cover segments lie substantially flush against each other in the shifted state in terms of a parallel shift. Spacers, air cushions or the like may be provided so that the glass is not scratched or otherwise damaged. In order to move the cover segments 3f and possibly 3g, a drive is provided that, in the present exemplary embodiment, is designed as a cable and is identified by reference number 37. However, other suitable drives are alternately conceivable. By moving the cover segments 3f and possibly 3g, it is possible to create free access to the outside through an opening in the motor vehicle roof and through the opening in the cover element 3 of the roof box 1 created by the shifted cover segments 3f, 3g, even though the roof box 1 is installed.

Figure 48:
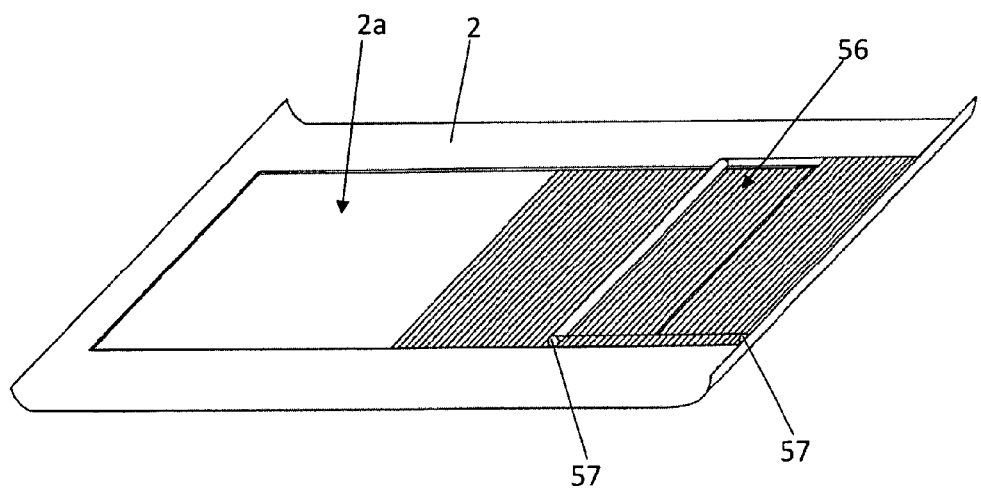
FIG. 48 The floor element of the roof box from FIG. 45 with an opening and covering means.
Figure 49:
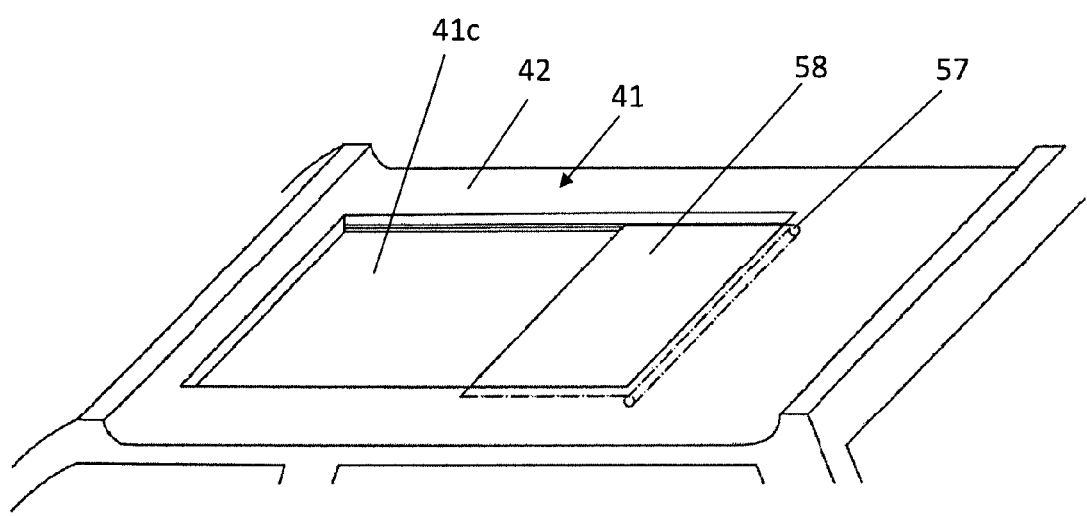
FIG. 49 Vehicle roof with an opening for the roof box from FIG. 45.

Since such a free access to the outside through the roof box 1 is possible, an opening 2a is also usefully provided in the floor element 2 depicted in FIG. 48. The dimensions of this opening 2a correspond to the area assumed by the two middle cover segments 3f, 3g and can also be covered and optionally exposed by covering means designed as Venetian blinds 56. The Venetian blinds 56 can be rolled up and down by means of suitable drive means (not shown) and rollers 57. The Venetian blinds 56 are usefully designed from such a material so that they are stable enough for the objects and the like, which are to be transported on them, to be put down without damaging the Venetian blinds, or without the objects breaking through the Venetian blinds into the interior of the motor vehicle.

In FIG. 49, a vehicle roof 41 of a motor vehicle is provided that has a recess 42 in which the roof box 1 engages in a form fit. An opening 41c is also provided in the vehicle roof 41, and its dimensions correspond to the opening 2a in the floor element 2, or the area assumed by the two middle cover segments 3f, 3g. The opening 41c can be covered or exposed by covering means designed as roller blinds 58. The roller blinds 58 can be rolled up and down by means of a roller 57. If the roller blinds 58, the Venetian blinds 56, and the middle cover segments 3f and possibly also 3g are moved into a released position, free access to the outside is establish from the interior of the vehicle through the openings 41c, 2a and the released opening in the cover element 3. Optionally, the cover elements 3f and 3g can also be closed so that sunlight but not outside air can penetrate through the aforementioned openings into the interior of the vehicle.

FIGS. 50 to 56 show different views of an additional embodiment of a roof box 1, or respectively components thereof, suitable for use in a motor vehicle with a sunroof, or another opening in the motor vehicle roof.

Figure 50:
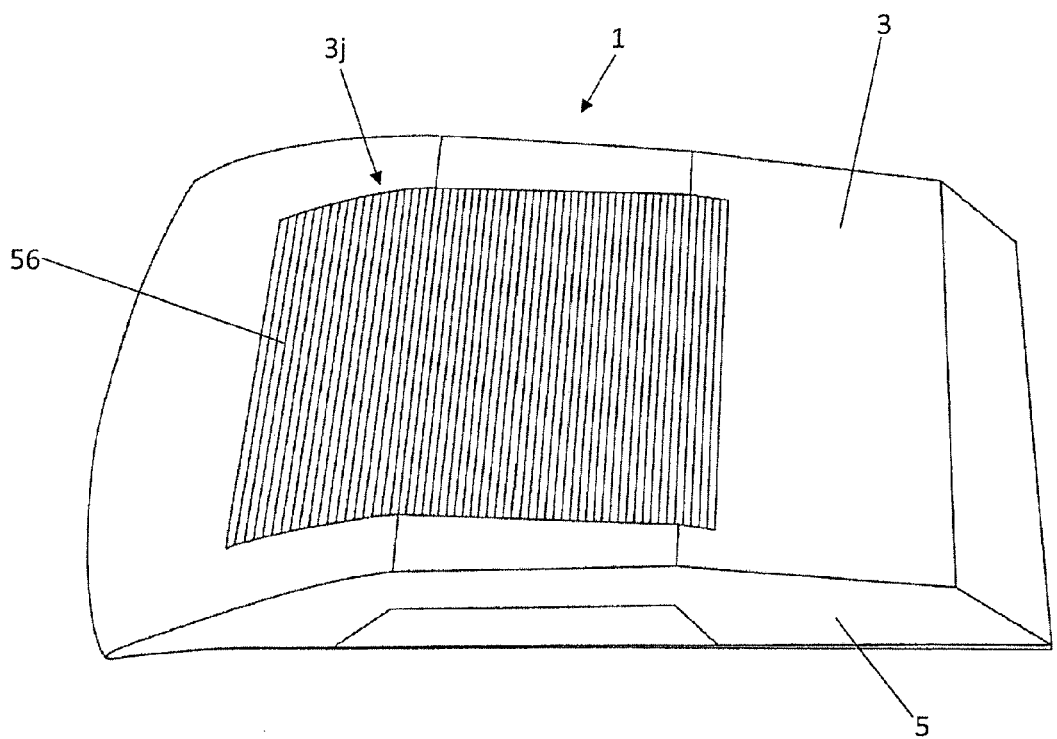
FIG. 50 Another embodiment of a roof box for motor vehicles with a sunroof in the extended state.

FIG. 50 shows a perspective view of the roof box 1 in an extended state. It can be seen that an approximately rectangular opening 3j is provided in the cover element 3. In the depiction in FIG. 50, this opening 3j is covered with Venetian blinds 56. This Venetian blinds 56 function as covering means for the opening 3j and can be optionally closed or opened. In particular, the Venetian blinds 56 can be rolled up like roller blinds.

Figure 51:
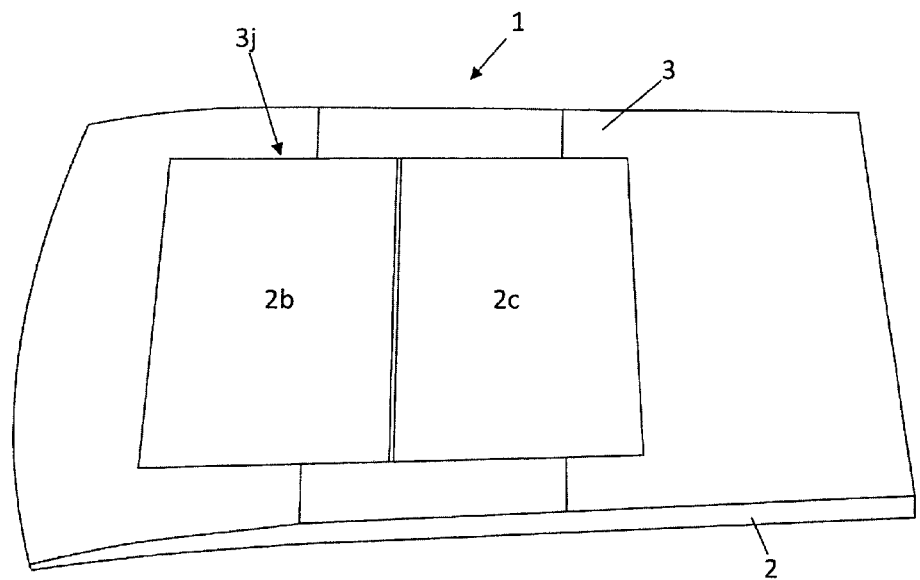
FIG. 51 The roof box from FIG. 50 in the retracted state.

FIG. 51 shows a perspective view of the roof box 1 in the retracted state. Furthermore, the Venetian blinds 56 are rolled up or opened so that they expose the opening 3j in the cover element 3. Two transparent floor segments 2b, 2c of the floor segment 2 can be discerned through the opening 3j that are usefully formed of glass. An opening is provided in the vehicle roof (not shown) below the floor segments 2b, 2c, and it can also be usefully covered or exposed by suitable covering means. If the roof box 1 in the state shown in FIG. 51 is mounted or installed on the vehicle roof and the opening is exposed in the vehicle roof, sunlight can pass through the transparent floor segments 2b, 2c into the interior of the vehicle. Optionally, the transparent floor segments 2b, 2c can also be moved back into a released position so that an opening in the floor element 2 arises by means of which there is free access from the outside to the inside of the vehicle in conjunction with the opening 3j in the cover element and the opening in the vehicle roof.

Figure 52:
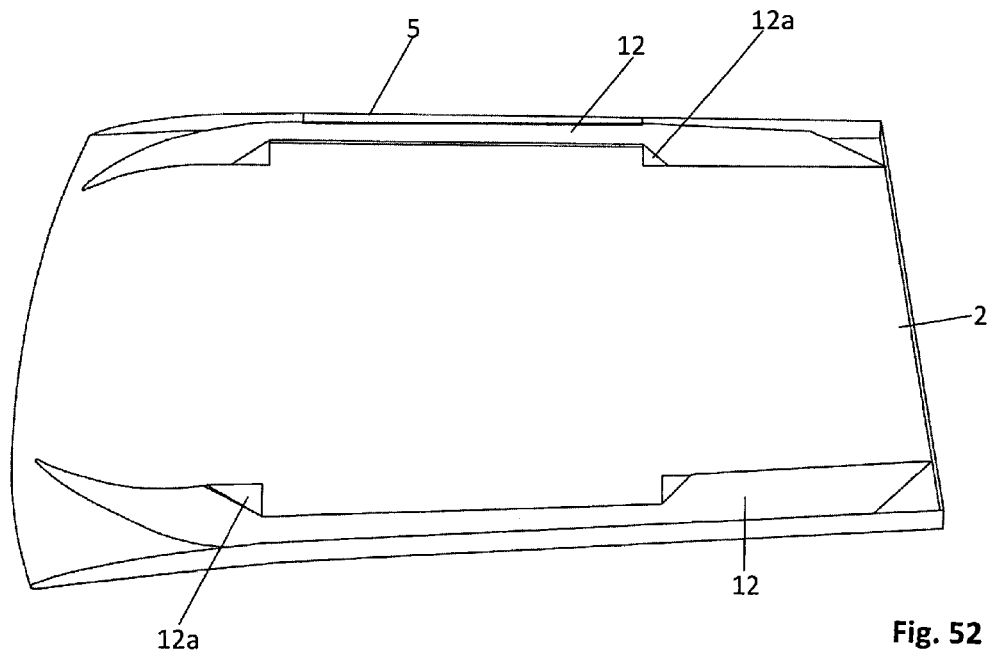
FIG. 52 View of the folded side walls of the roof box from FIG. 50.

FIG. 52 shows the floor element 2 with folded side walls 5 arranged thereupon, wherein in a folded stage, only the top side will segment 12 is discernible since the smaller, bottom side wall segments arranged in the middle of the side wall 5 lies below the side wall segment 12, or respectively between the floor element 2 and the side wall segment 12. In the corner regions of the notch in the top side wall segment 12 for accommodating the bottom side wall segment 11, beveled regions 12a are discernible that project inward, i.e., upward in a folded state.

Figure 53:
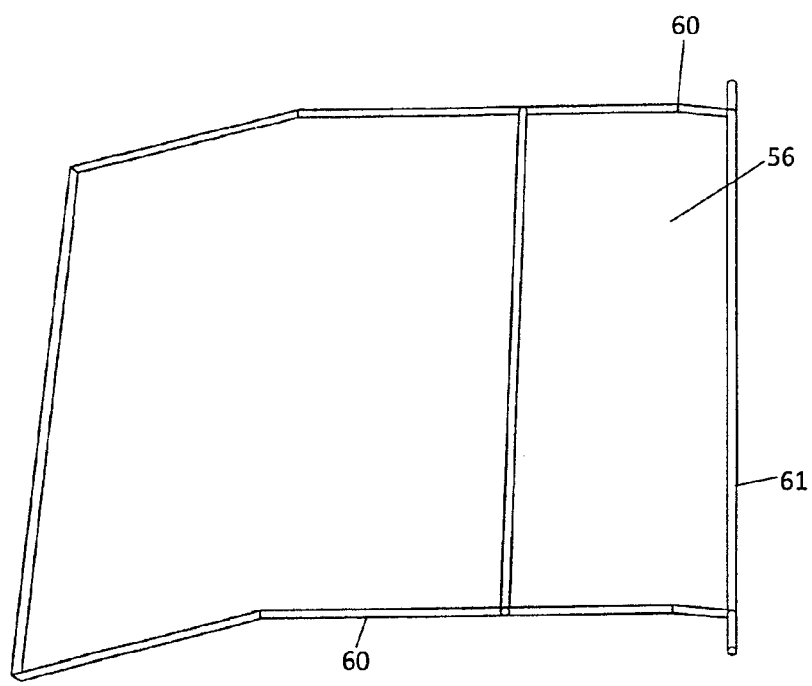
FIG. 53 View of support rods of the roof box from FIG. 50.
Figure 54:
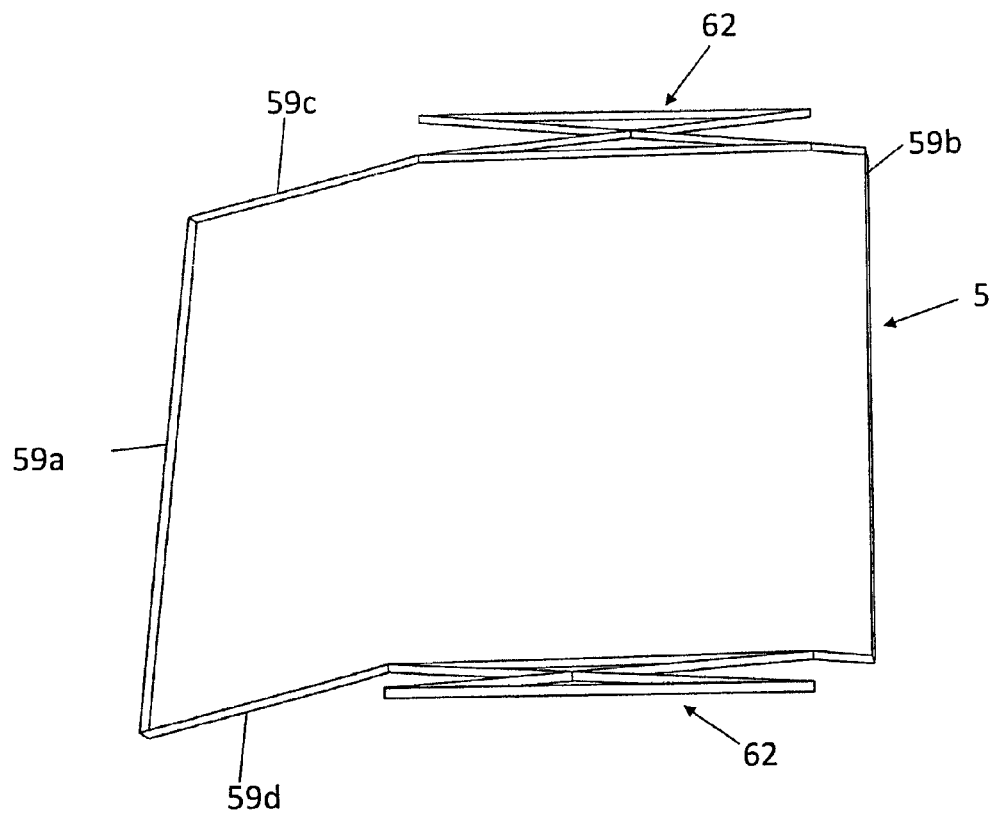
FIG. 54 The support rods from FIG. 53 in a moved state.

FIG. 53 shows a detailed view of a frame 60 for the Venetian blinds 56. The Venetian blinds 56 can be rolled up on a roller 61 fastened to a frame 60 and can move along the frame 60. The frame 60 is preferably arranged in the opening 3j of the cover element 3.

FIG. 4 shows a detailed view of support rods 59 that are arranged in the region of the opening 3j of the cover element 3, although below the opening 3j and the frame 60. The support rods 59 comprise a front cross bar 59a and a rear cross bar 59b, as well as two longitudinal bars 59c, 59d connecting them. The support rods 59 are in particular arranged on the inside of the cover element 3. Furthermore, it can be discerned that stabilizers 62 extend from the longitudinal rods 59c, 59d laterally to the outside and consist of rods 63 arranged crosswise, as well as an outer end rod 64 arranged parallel to the longitudinal rods 59c, 59d. The two crossbars 63 are articulated to each other at a middle articulation point 65.

Figure 55:
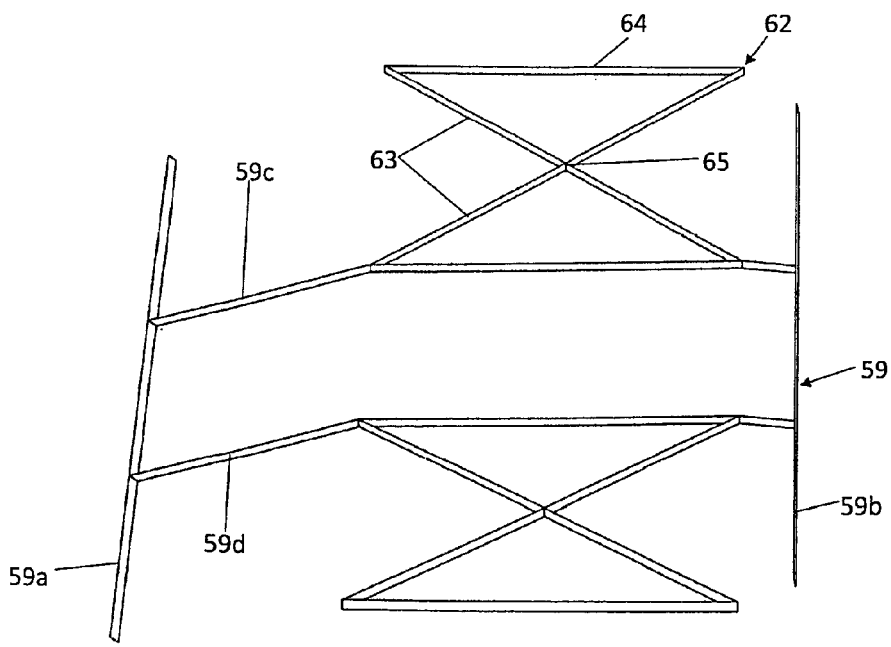
FIG. 55 The support rods from FIG. 53 in another moved state.

FIG. 55 shows another moving state of the support rods 59. It can be discerned that the longitudinal rods 59c, 59d move inward toward each other, wherein the free ends of the two longitudinal rods 59c, 59d move along the front and rear cross bars 59a, 59b. The stabilizers 62 are extended further out in comparison to the representation in FIG. 54. In this state, the support rods 59 in conjunction with the extended stabilizers and the shifted longitudinal rods 59c, 59d support the Venetian blinds 56 lying thereupon so that they can absorb a relatively large amount of force without becoming damaged.

Figure 56:
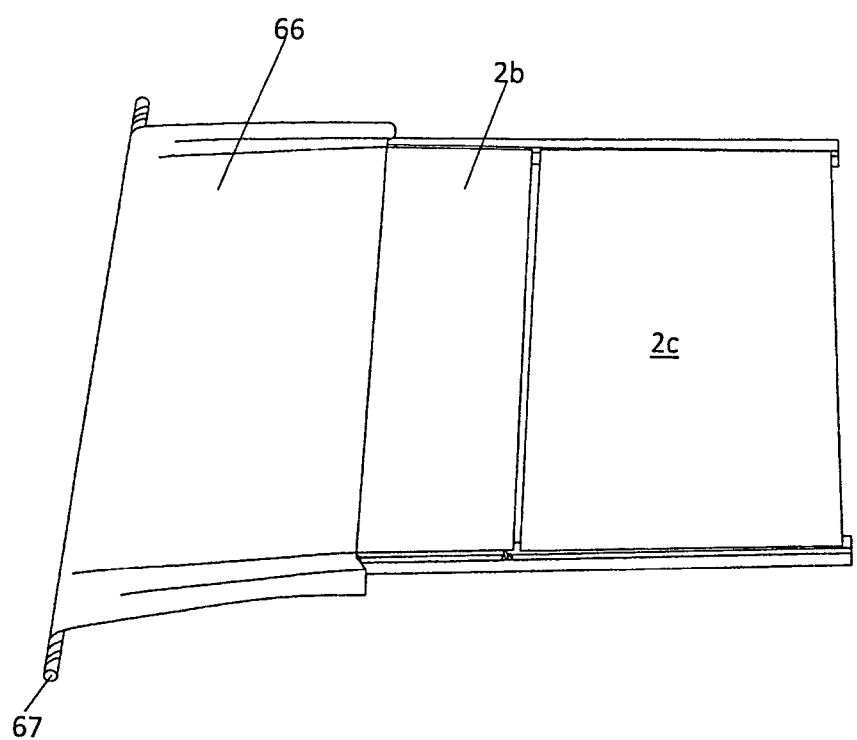
FIG. 56 A detailed view of the floor element of the roof box from FIG. 50.

FIG. 56 shows the two transparent floor segments 2b, 2c of the floor element 2. It is also shown that a protective cover 66 has moved over the left half of the floor segment 2b. The protective cover 66 winds off a roller 67 and can subsequently cover the entire floor segments 2b, 2c. The protective cover 66 can for example consist of a fabric or the like. Alternately or in addition, the protective cover 66 can consist of gas cushions or the like. It is especially useful to cover the floor segments 2b, 2c with the protective cover 66 when objects are introduced into the roof box to prevent the floor segments 2b, 2c consisting of glass from being scratched.

LIST OF REFERENCE NUMBERS

1 Roof box
2 Floor element
2a Opening in the floor element
2b, 2c Transparent floor segment
3 Cover element
3a Cover segment
3aa Bending line
3b Cover segment
3bb Top cover element
3c Cover segment
3cc Cover element side part
3d Rear region of the cover element
3e Front region of the cover element
3f, 3g, 3h Cover segment
3i Cover element side part
3j Opening in the cover element
4 Rear wall
5 Side wall
5a Flange
6 Interior space
7 Bottom side wall hinges
8 Top side wall hinges
9 Rear wall hinges
10 Middle hinges
11 Bottom side wall segments
12 Top side wall segments
12a Beveled region
13 Cross-members
14 Longitudinal members
15 Frame
15a Frame cross bar
15b Frame longitudinal bar
16 Front cover element hinges
17 Frame hinges
18 Cover segment hinges
19 Floor wall
20 Attaching means
21 Swivel joint
22 Air cushions
22a Top air cushion
22b Bottom air cushion
221 Air cushion top side
222 Air cushion edge
223 Notches in the air cushion
23 Hinge fasteners
24 Notches
25 Folding roof
26 Front articulation
27 Rear articulation
28 Roof surface
29 Luggage compartment cover
30 Top part
31 Lifting device
32 Articulation
33 Rods
34 Articulation point
35 Vehicle roof opening
36 Soft top
37 Cable
40 Motor vehicle
41 Vehicle roof
41a Front edge of the vehicle roof
41b Rear edge of the vehicle roof
41c Opening in the vehicle roof
42 Recess
42a Rear edge of the recess
42b Front edge of the recess
42c Side edge of the recess
43 Direction of movement 44 Bending line
45 Swivel bow
45a Middle bar
45b Outer bar
46 Swivel bow articulation
47 Elastic bow
48 Retaining strap
49 Rail
50 Roof recess
51 Bead
52 Bead counterpart
53 Seal
54 Overlapping region
55 Skid
56 Venetian blinds
57 Roller
58 Roller blinds
59 Support rods
59a Front cross bar
59b Rear cross bar
59c, 59d Longitudinal bars
60 Frame
61 Roller
62 Stabilizers
63 Cross bars
64 End rod
65 Articulation
66 Protective cover
67 Roller

What is claimed is:

1. A roof box for motor vehicles to form a useful interior space, wherein the roof box is designed such that the roof can be integrated in the roof of a motor vehicle and is only accessible from outside of the motor vehicle, characterized in that volume changing means for changing the volume of the interior space are provided.

2. The roof box according to claim 1, wherein a top part forming a cover of the roof box is formed by a frame, a rear wall, a cover element and side walls, characterized in that the roof box can be moved by means of the volume changing means between an extended state in which the interior space has a maximum volume, and a retracted state in which the interior space has a minimum volume, wherein in particular the minimum volume is less than 50%, preferably less than 25%, and particularly preferably less than 10% of the maximum volume.

3. The roof box according to claim 1, wherein the roof box comprises wall elements to form the interior space and wherein the wall elements preferably comprise a floor element a cover element, a rear wall and side walls characterized in that at least a portion of at least one of the wall element is formed of the roof of a motor vehicle; and the volume changing means comprise pivoting means, wherein the pivoting means are designed to pivot at least segments of individual wall elements to permit or respectively enable a translator movement between the wall elements or respectively the wall segments that they connect to each other.

4. The roof box according to claim 3, characterized in that the pivoting means comprise an articulation, in a hinge or at least one of an elastically and plastically deformable material section, and at least one of the rear wall and the side walls are connected by means of pivoting means with at least one of the roof element, the floor element, and the frame.

5. The roof box according to claim 4, characterized in that at least one of the rear wall, the side walls and the cover element have at least one of at least two rear wall segments, at least two side wall segments and at least two cover segments, wherein the at least one of the at least two rear wall segments, of the at least two side wall segments and the at least two cover segments are connected to each other by pivoting means, wherein preferably the at least one of the rear wall, the at least two segments of the rear wall, and the at least two segments of the side walls, can be folded inward.

6. The roof box according to claim 5, characterized in that the pivoting means pivot between the at least one of the at least two side wall segments, the at least two rear wall segments, and the at least two cover segments about a substantially horizontally aligned pivoting axis; and the side walls each have at least two side wall segments wherein viewed in the longitudinal direction of the side wall a first side wall segment extends up to a front region of the side wall that faces the front side of a motor vehicle when the roof box is in the mounted state, and a second side wall segment does not extend into the front region of the side wall, wherein in particular the front region of the side wall begins in the region in which the roof surface of the motor vehicle begins to curve outward so that the surface curvature of the motor vehicle roof and the curvature of the first said wall segment in the region of the front region of the side wall run in the same direction so that the two curved surfaces lie on each other in a type of form fit.

7. The roof box according to claim 6, characterized in that, when viewed in the longitudinal direction of the side wall, the front region of the side wall borders a middle region of the side wall, and the middle region borders a rear region of the side wall, wherein the side wall consists of the front region, the middle region, and the rear region, and at least one of the second side wall segment is arranged in at least one of the rear region and the middle region, preferably only in the middle region, and the first side wall segment is arranged in at least two of the front region, the middle region and the rear region, preferably in the front region and in the middle region, and in the rear region.

8. The roof box according to claim 3, characterized in that the roof box has a frame, preferably comprising two cross members and two longitudinal members and the frame is connected by means of the pivoting means with at least one of the floor element, the rear wall, the side walls and the cover element; and the side walls taper in height toward the front side of the roof box such that together with the cover element which is designed curved corresponding to the shape of a motor vehicle roof, the side walls and the cover element form an approximately wedge-like aerodynamic shape.

9. The roof box according to claim 1, wherein the roof box comprises wall elements to form the interior space characterized in that the volume changing means have deformation means for reversibly changing the shape of a wall element, or a section of a wall element, from a first deformation state corresponding to a retracted state of the roof box into a second deformation state corresponding to an extended state of the roof box, wherein an activation device is provided to activate the deformation means.

10. The roof box according to claim 9, characterized in that the deformation of the wall element, or respectively the section of the wall element, comprises a bending of the wall element, or respectively the section of the wall element, wherein designated bending sites or designated bending lines are provided in the wall element, or in the section of the wall element, at which the bending occurs; and the interior space is formed by a floor element and a cover element, wherein the deformation means are provided in the cover element.

11. The roof box according to claim 10, characterized in that the activation means comprise at least one of pneumatically controllable gas cushions, especially air cushions, electric motors, especially servomotors, springs, magnets and electromagnets that are in particular connected to a control device in order to automatically move the roof box between a retracted and an extended state, wherein the activation means are preferably provided on the pivoting means and/or the wall elements, and wherein it is particularly preferable to provide one air cushion, one electromagnet and one spring per each pivoting means; wherein the roof box comprises a top part, wherein the top part is formed by at least one of the cover element, the rear wall, and the side walls, wherein a lifting device is provided to move the top part between an open position and a closed position of the box, wherein the top part can preferably be pivoted by a pivoting means about a pivot axis when moving between the two positions, and wherein it is particularly preferable to provide a frame, especially a closed frame, that forms a bottom termination for the top part and by means of which the top part when in a close state, lies on a bottom part of the roof box.

12. The roof box according to claim 11, characterized in that the top part has an interior volume of at least 40%, preferably at least 60%, and particularly preferably at least 80% of the overall interior volume of the roof box.

13. The roof box according to claim 3, characterized in that support elements are provided on one or more of the wall elements to support adjacent wall elements when the roof box is in an extended state, wherein the support elements preferably simultaneously form a stop when swinging the wall elements.

14. The roof box according to claim 2, characterized in that locking means are provided to lock the roof box in at least one of the retracted state and the extended state, wherein the locking means are preferably arranged on the support element, and furthermore the locking means preferably comprise electromagnets.

15. The roof box according to claim 3, characterized in that the base surface of the floor element is not a polygon and is in particular not a rectangle, and/or the shape of the base surface of the floor element substantially corresponds to the shape of the roof surface of the motor vehicle; the volume changing means for at least one of moving individual wall elements and individual sections of wall elements do not comprise at least one of rods and electromechanical or mechanical cylinders, and the volume changing means comprise at least one rod assembly, in particular one swivel bow, that is designed to move the roof box between the retracted state and the extended state, wherein the rod assembly preferably has latching means to be snapped into place when the roof box is in at least one of an extended state and a retracted state.

16. A roof of a motor vehicle, characterized in that a roof box according to claim 1 is arranged integrated in the roof.

17. The roof according to claim 16, characterized in that the roof has a roof recess to accommodate the roof box; the roof box covers at least 80%, preferably at least 90%, particularly preferably at least 95% of the entire roof surface of the roof, and a vehicle roof opening is provided in the vehicle roof that is designed to be complementary with at least one of the opening in the floor element and in the cover element of the roof box.

18. A motor vehicle, having a roof, wherein a roof box according to claim 1 is arranged integrated in the roof.

19. The roof box according to claim 1, characterized in that parts of the roof box consist of plastic, metals including aluminum and titanium, carbon, or composite materials.

20. The roof box according to claim 1, characterized in that the roof box is connected to at least of a power system and to an integrated solar module.

21. The roof box according to claim 1, characterized in that the roof of the motor vehicle is a folding roof of a convertible made of metal.

22. The roof box according to claim 1, characterized in that the roof box is connected to at least one of an onboard computer of the motor vehicle, a remote control or radio control and a data bus of the motor vehicle.

23. The roof box according to claim 19, characterized in that sensors are provided for the roof box that transmit a stat of moving parts of the roof box via the data bus of the motor vehicle.

24. The roof box according to claim 1, characterized in that one or more sensor elements are provided to determine at least one of a retracted or extended state of the roof box, the position, especially open position or closed position, of the roof box, the state of fullness of the roof box, and that lighting means are provided to illuminate the interior space of the roof box, wherein the lighting means are actuated on the basis of at least one of an evaluated signal and an input from the one or more sensor elements.

25. The roof box according to claim 1, characterized in that at least one of at least one wall element and at least one segment of a wall element, is designed substantially transparent.

26. the roof box according to claim 2, characterized in that the roof box comprises activation means to activate the volume change means.

* * * * *

UNITED STATES PATENT AND TRADEMARK OFFICE
CERTIFICATE OF CORRECTION

| | | |
|---|---|---|
| PATENT NO. | : 9,193,306 B2 | Page 1 of 1 |
| APPLICATION NO. | : 14/157204 | |
| DATED | : November 24, 2015 | |
| INVENTOR(S) | : Serle Espig | |

It is certified that error appears in the above-identified patent and that said Letters Patent is hereby corrected as shown below:

IN THE CLAIMS

Column 29, line 32, "space, wherein the roof box is designed such that the roof can" should read --space, wherein the roof box is designed such that the roof box can--.

Signed and Sealed this
Twenty-ninth Day of March, 2016

Michelle K. Lee
*Director of the United States Patent and Trademark Office*